United States Patent
McNeill

(10) Patent No.: US 10,819,669 B2
(45) Date of Patent: *Oct. 27, 2020

(54) UNIFIED COMPUTING DEVICE INTERFACE FOR ASSEMBLY OF A PLURALITY OF TYPES OF DIGITAL CONTENT FOR TRANSMISSION TO A PLURALITY OF TARGET DESTINATIONS

(71) Applicant: Charles Russell McNeill, Silver Spring, MD (US)

(72) Inventor: Charles Russell McNeill, Silver Spring, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/563,103

(22) Filed: Sep. 6, 2019

(65) Prior Publication Data
US 2019/0394149 A1    Dec. 26, 2019

Related U.S. Application Data

(63) Continuation-in-part of application No. 15/955,077, filed on Apr. 17, 2018, now Pat. No. 10,574,136,
(Continued)

(51) Int. Cl.
*G06F 3/00* (2006.01)
*H04L 12/58* (2006.01)
(Continued)

(52) U.S. Cl.
CPC .......... *H04L 51/046* (2013.01); *G06F 3/0482* (2013.01); *G06F 3/0488* (2013.01);
(Continued)

(58) Field of Classification Search
CPC combination set(s) only.
See application file for complete search history.

(56) References Cited

U.S. PATENT DOCUMENTS 8,869,068 B2 * 10/2014 Primiani ............. G06F 3/04883
715/834
2009/0300121 A1 * 12/2009 Bartlett ................ G06Q 10/107
709/206

(Continued)

*Primary Examiner* — Hien L Duong

(57) ABSTRACT

Disclosed herein is a unified graphical user interface for computing devices, enabling assembly of digital content for transmission to a plurality of network-based target destinations. The process may be initiated using content newly created or stored on the device, or using content accessible to the device by network connection. Destinations may be any communications services or upload destinations to which the device has access, and for some types of communication may be customized for singular recipients or groups of recipients. Icons representing content and one or more destinations are associated by user actions in the interface to establish the transmission to be executed. Methods are presented for handling of content that is non-compliant with destination requirement or limits in order to achieve compliance. The interface also enables launching of applications accessible from the device that are represented by the target destination icons. Embodiments described include those suited to both cursor-controlled devices and touchscreen-controlled devices.

48 Claims, 39 Drawing Sheets

Related U.S. Application Data which is a continuation of application No. 15/646,029, filed on Jul. 10, 2017, now Pat. No. 10,019,133.

(60) Provisional application No. 62/480,519, filed on Apr. 2, 2017.

(51) Int. Cl.
| | |
|---|---|
| *G06F 3/0481* | (2013.01) |
| *H04L 29/08* | (2006.01) |
| *G06F 3/0488* | (2013.01) |
| *G06Q 50/00* | (2012.01) |
| *G06F 3/0482* | (2013.01) |
| *H04M 1/725* | (2006.01) |

(52) U.S. Cl.
CPC ......... *G06F 3/04817* (2013.01); *G06Q 50/01* (2013.01); *H04L 51/18* (2013.01); *H04L 51/32* (2013.01); *H04L 51/36* (2013.01); *H04L 67/36* (2013.01); *H04M 1/72552* (2013.01); *H04M 1/72555* (2013.01)

(56) References Cited

U.S. PATENT DOCUMENTS

| | | | | |
|---|---|---|---|---|
| 2010/0058216 A1* | 3/2010 | Yoon | ................. | G06F 3/0482 715/769 |
| 2011/0060793 A1* | 3/2011 | Wheeler | ................. | G06Q 10/00 709/203 |
| 2011/0150362 A1* | 6/2011 | Mitra | ................. | H04N 1/00228 382/286 |
| 2011/0158252 A1* | 6/2011 | Birdsall | ................. | H04L 51/16 370/417 |
| 2011/0179378 A1* | 7/2011 | Wheeler | ................. | G06Q 10/107 715/780 |
| 2011/0231478 A1* | 9/2011 | Wheeler | ................. | G06F 16/951 709/203 |
| 2012/0036196 A1* | 2/2012 | Patel | ................. | G06Q 10/107 709/206 |
| 2012/0131496 A1* | 5/2012 | Goossens | ................. | G06F 3/0483 715/784 |
| 2013/0132904 A1* | 5/2013 | Primiani | ................. | G06F 3/048 715/834 |
| 2014/0282114 A1* | 9/2014 | Walkin | ................. | H04L 51/32 715/758 |
| 2015/0046988 A1* | 2/2015 | Suzuki | ................. | H04L 63/08 726/6 |
| 2016/0134571 A1* | 5/2016 | Lindley | ................. | H04L 51/08 709/206 |
| 2016/0269329 A1* | 9/2016 | Willis | ................. | H04L 51/08 |
| 2017/0054790 A1* | 2/2017 | McCubbin | ................. | H04L 69/04 |
| 2017/0063777 A1* | 3/2017 | Ekberg | ................. | H04L 51/36 |
| 2018/0004723 A1* | 1/2018 | Eldredge | ................. | G06F 3/0482 |
| 2018/0322138 A1* | 11/2018 | Chang | ................. | H04N 1/32309 |

\* cited by examiner

Noncompliant Content Handling Preferences
Configure preferences for handling content when noncompliant with target destination requirements 85 — ☒ No intervention, just enter any compliant portion of content and allow app to display discrepancies

86 — ☐ Provide noncompliance intervention with needed fields and suggested alternatives for content compliance 87 —
*Overlimit text*
◎ Highlight overlimit text for editing
◎ Split into separate messages
◎ Upload to designated server and provide link*
◎ Let me decide for each instance 88 —
*Overlimit file size or incompatible file type*
◎ Downsample to fit/convert format
◎ Upload to designated server and provide link*
◎ Let me decide for each instance 89 —
* Configure designated server
[server URL...]
[login name...] [password...]

90 —
Optionally configure URL shortening service
[server URL...]
[login name...] [password...]

( Save )    Cancel

*Fig. 16*

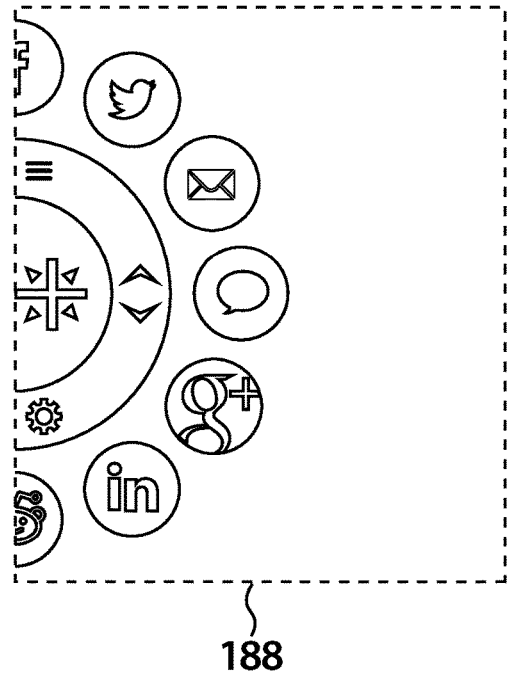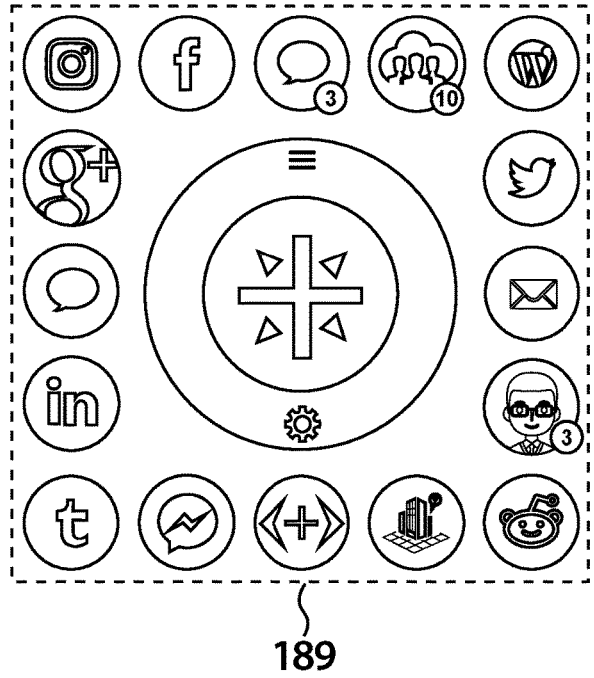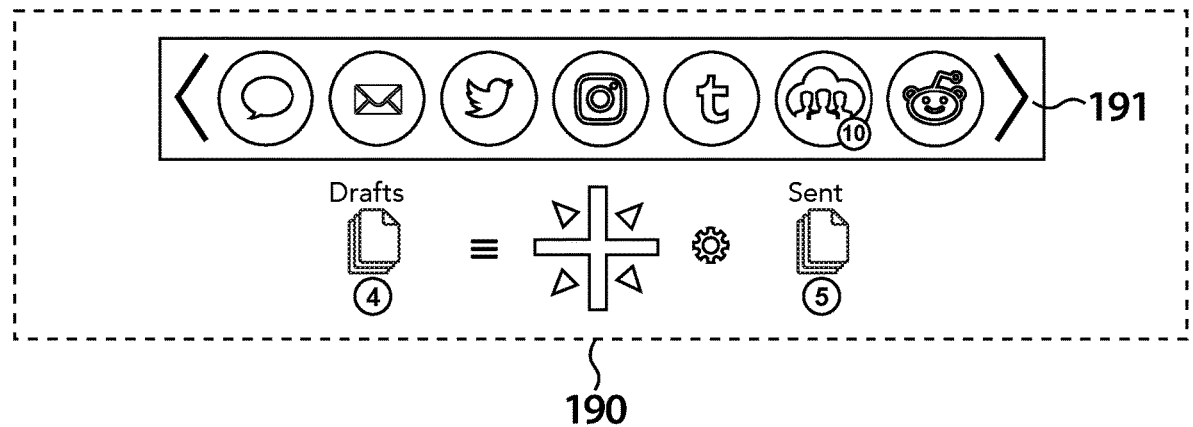
Fig. 28

UNIFIED COMPUTING DEVICE INTERFACE FOR ASSEMBLY OF A PLURALITY OF TYPES OF DIGITAL CONTENT FOR TRANSMISSION TO A PLURALITY OF TARGET DESTINATIONS

RELATED APPLICATIONS

This application is a Continuation-in-Part of application Ser. No. 15/995,077, filed May 31, 2018, which is a continuation of application Ser. No. 15/646,029, filed Jul. 10, 2017 and now granted patent 10,019,133B1, both entitled "Unified Computing Device Interface for Assembly of a Plurality of Types of Digital Content for Transmission to a Plurality of Target Destinations," and claims priority to Provisional Application No. 62/480,519, filed Apr. 2, 2017 entitled "Unified Computing Device Interface and Method for Creation and Transfer of Digital Content from a Plurality of Sources to a Plurality of Target Destinations." All of the foregoing applications are incorporated herein by reference in their entirety.

FIELD

The embodiments of this disclosure are in the technical field of computing devices, encompassing both devices controlled by touchscreen input and devices controlled by moving cursor input. More specifically, the embodiments are in the technical field of interface design for initiating Internet and network messaging and data transfer involving a plurality of source data types and a plurality of transmission destinations.

BACKGROUND

The use of Internet-connected computers as tools of communication and work implementation is now the norm worldwide across a broad range of activities and endeavors. In recent times this adoption has most significantly been due to increased availability of mobile computing options such as phones and tablet devices. In addition to growth in types of devices, there has been an increase in the types of digital content that users can create, access, upload, and share with different communities of users, and an increasing number of services available for doing so. Concurrently there has been a rapid increase in Internet-connectable or network-connectable "smart" devices, often referred to as the "Internet of Things." There is a growing number of applications, notably for mobile phones and tablets, for connecting to and analyzing the output of various sensing, monitoring, and measurement devices for the purpose of health management ("mHealth") and for scientific and engineering purposes. There are also applications capable of transmitting to more than one network destination, sometimes combined with the capability to monitor response activity on the services involved.

RELEVANT PATENTS

Among granted U.S. Patents or published U.S. Patent applications, there are several appearing by title, description, or specifications to be addressing a subset of functions related to those of the current disclosure.

| Pat. No. | Issue Date | Name of Patentee or Applicant of cited Document |
|---|---|---|
| U.S. Pat. No. 9,154,605B2 | 2015 Oct. 6 | Thomas Jan Stovicek, Henry Yao-Tsu Chen, Andrew Philip Cundill |
| U.S. Pat. No. 5,742,286A | 1998 Apr. 21 | Jonathan Sc Kung, James Lee Lentz |
| U.S. Pat. No. 9,508,059B2 | 2016 Nov. 29 | Ming Ligh, Paulo S. T. Chow, Valerie Goulart, Anthony Giardini, Georgiana Gormley, Jeff Gough, Patrick Carney |
| U.S. Pat. No. 9,280,264B2 | 2016 Mar. 8 | Viktors Berstis, Danny Yen-Fu Chen, John W. Dunsmoir |
| U.S. Pat. No. 7,281,049B2 | 2007 Oct. 9 | Manoj Verma, Ashutosh Gijare, Vikas Dogra, George Koppich, Sanjay Wangoo |

NON-PATENT REFERENCES

Related to the simultaneous transmission of text and other content to multiple destinations, there is partial convergence with the field of social media management and what are variously called social media dashboard tools, platforms, hubs, or aggregators. These can be grouped into two general types:

Social media presence management: Such software tools enable simultaneous posting of messages to several of the most widely used social media, and also facilitate scheduling of automatic message posting. Other functions include analytics such as number of responses to postings and the frequency of mentions across multiple social media of terms of interest such as an organization, company or product name. Examples include Hootsuite™, Everypost™, Buffer®, SmartPost™, and CoSchedule™.

Social media integration applications for personal use: Applications in this group of applications share some of the features of social media presence management applications but focus more on integration of access to an individual's preferred social media services into a single user space. Some allow simultaneous postings whereas others only bring access to several social media into a single interface, but still require visiting each one separately to post a message. Examples include Doubletap™, Pyxsee™, and Social Stream™. There are also individual social media applications that allow simultaneous postings to a limited range of other social media, one example being Instagram™ which allows linking to Facebook™, Twitter™, and Tumblr™ for such simultaneous transmission.

Comments and Conclusions: Basic capability to transmit message content simultaneously to multiple destinations is well established. Some potentially useful but apparently missing extensions and enhancements of this capability are:

a) A graphical user interface bringing the message content and transmission destinations together in a way that maximizes ease of association of the two, and can be adapted to the interaction methods of both cursor-controlled and touchscreen-controlled devices;

b) Flexibility to configure a wide range of network destinations as transmission targets, including not only standard personal communications services and social media but also specialized destinations for data storage or for communication with devices;

c) Flexibility to configure a wide range of input data types, which may include not only common message content such as text and images, but also sensing data from specialized capabilities internal or external to the device;

d) Flexibility to create customized combinations of recipients as individual targets, operating in a similar manner as email groups but also allowing selection of a subset of a group for a particular transmission;

e) Methods for accommodating differing data acceptance requirements and limits of different communications services, so that a single message composition interface may be adaptable to a maximal number of services;

f) Options for automatically generating solutions for situations where desired content to be transmitted is not in compliance with the data acceptance requirements and limits of different communications services;

g) Capability to operate in an overlay mode, providing access to its functions while allowing other screen content of the device to remain displayed.

SUMMARY OF THE DISCLOSURE

A. Features of Parent Application Disclosure

Presented herein is a unified graphical user interface for assembly of digital source content and subsequent transmission to at least a subset of a plurality of network-based target destinations. The interface offers intuitiveness and ease-of-use while enabling highly configurable transmission of information for purposes of communication, data storage or data processing. The process may be initiated from the computing device using content newly created or stored on the device, or content accessible to the device via Internet or any form of network. The target destinations may be any connections accessible via Internet or any form of network to which the device has access, and may utilize the device's installed applications dedicated to specific communications services. Target destinations may be customized to associate at least one recipient with at least one, or a plurality of specific communication services. The proposed interface also serves as an alternate launcher for certain compatible types of applications installed on, or accessible from the same device.

The invention may be most easily understood in the context of messages being sent as standard email, phone text messages, postings to social media, blogs, "micro-blogging sites," or forum-type services. However its utility is not limited to those purposes and should be considered more broadly. The interface could be implemented not only in desktop computers and common forms of mobile devices such as phones and tablets, but also in kiosks and specialized data collection and communication devices with a graphic display or monitor. Therefore in addition to various social and other personal uses, it could have utility in fields of health IT, industrial processes, environmental science and other field data collection, law enforcement, and military communications.

The interface presents an option to display a message content window for user input. Upon completion of entry of all desired message content and upon confirmation of such, a source content item is then represented graphically by an icon or thumbnail image. This graphic representation of the source is subsequently used to make associations of the source content with at least one, or a plurality of transmission targets. There are multiple methods of making these associations, all involving selection or activation of the source item followed by selection or activation of at least one representation of a target destination. As described in the Detailed Description below, different methods of making the association of source and target may be concurrently available, or may be selectable as the default method in a Settings or Preferences menu. Different methods of making the association of source and target will also be partially constrained by inherent characteristics of certain devices or operating systems. For example, devices allowing touch-screen interaction allow different forms of interaction than devices relying on a moving cursor displayed on a monitor.

When the source content has been prepared and target choices have been made, the system displays a prompt to execute a transmission mode to process all requested actions. If the data acceptance standards of the target destination require any additional input in order to complete the action, such as entry into a required field, a screen is presented for each of such cases in order to prompt for any additions or corrections or to accept defaults. Following the completion of any such required fields, if any, the transmission process proceeds.

The ultimate result of the transmission action will be a message of confirmation of successful action. In cases where a source and target association allows data to be returned, an indication of response will be displayed.

As mentioned in the section Non-Patent References, the invention described in this disclosure has some functional similarities to applications designed for management of social media presence, due to its capability for simultaneous transmission of text and other content to multiple social media destinations. The interface presented herein is not primarily intended to be this type of tool, however it is quite conceivable this invention could augment those types of applications and thus some embodiment of the presented interface could be integrated into them.

B. Features of Current Disclosure Vs. Parent Application Disclosure

The original concept can be summarized as providing a multi-purpose input interface for composition of text messages and associated other data such as image media, which then could be routed to a variety of destinations with intuitive drag-drop interaction or other selection means, depending on the device type.

Included was a conditional intermediate step wherein any discrepancies in destination-specific required information are flagged, then providing an opportunity to correct them. The system would then "feed" all the message data into the appropriate fields for each destination's application, invisibly, and execute the transmissions. This would be followed by a notification of transmission results, an opportunity to go directly to the application's interface to verify presence of the message, and to respond to any feedback within that application's environment.

In the current disclosure, an extended concept is presented which includes a means by which some types of non-compliant content could be intermediated and made compliant, thus eliminating or reducing the need to modify content on a destination-by-destination level before it can be transmitted. Central to the difference is a user preference for how messages should be handled upon execution of a request to transmit to desired destinations:

1. Make no evaluation of compliance with destination specific requirements; input the message data into the best-match fields of the relevant communications application, and allow that application to respond by its native means regarding any discrepancies; or 2. Make evaluations of compliance at some point in the process that precedes actual transmission, and notify user of message components needing modification; and optionally, with user permission, attempt to automatically correct the noncompliance.

The descriptions for FIG. 16 through FIG. 19, cover the details of how scenario "2" above is handled.

Definition of Terms Used in this Document

Computing device or computer refers not only to general-purpose desktop computers and mobile devices such as smartphones and tablets, but also to special-purpose devices based on typical computer components; most comprehensively, referring to any computing device having a display or monitor and capable of being controlled by a GUI (Graphical User Interface).

Application refers to stand-alone executable program code for communications or data transfer purposes and includes email, text, internet message posting programs such as for social media, and applications dedicated to communicating with a specific device or data receiving portal.

Programmed routine refers to code other than stand-alone programs, such as plug-ins, extensions, and add-ons that coordinate with stand-alone programs.

Digital content is referred to in different contexts as the "source," "source content," or "source item," and can be at least one of:
 a) text input via keyboard of any type, and including the option of speech-to-text if available on the device;
 b) data documents created by media acquisition technologies of a computing device, including but not limited to a camera with still image and/or video capability, or microphone with audio recording capability, and also including "live feed" use of the media acquisition technology as well as recordings made from them;
 c) specialized data sensing and recording functions, including the device's own geolocation and motion sensing capabilities if present, and including data from any peripheral devices connected by wired or wireless means;
 d) text or images created via touchscreen drawing or use of a stylus on a compatible display;
 e) existing documents of any data type stored in any location accessible to the computing device, including a connected storage device, network accessible device, or Internet "cloud storage;"
 f) data acting as a token that can be transmitted, for example a payment made from one account to another account.

Transmission of "source" or "source content" is to be understood as synonymous with the terms upload, transfer, submit, or send and meaning the source content is ultimately received on a device, or in a system external to the device where the interface described herein is operating.

Destinations for transmission of the source content are referred to as the target, the targets, target destination or the target destinations and can be at least one of:
 a) a digital content recording, publishing, or message delivery service such as an email or social media account, or a proprietary database or gateway;
 b) a storage location to which the computing device has access, for example Internet cloud storage;
 c) a customized association of at least one of a plurality of recipients with at least one of a plurality of communications services, such as text messaging or email to frequently contacted recipients;
 d) a device- or computer-based process to which data or instructions are being sent, for example sending a document to be printed in any form, sending instructions to an ordering system, or sending a command to control an automated process;
 e) a transaction involving a user account and a recipient account, for example payments or distributions of monetary units to at least one of a plurality of recipients or accounts; or
 f) a process to be performed on the source item's content, such as Internet searching or language translation, or media file analysis such as image or audio recognition.

Type of communication service refers to mode of message transmission by type of account, for example email services, text messaging by phone number, text messaging by internet chat or forum services, any other services generally called social media, or proprietary message channels.

Sender-to-recipient communication is in most cases synonymous with person-to-person communication, the only distinction being with communication initiated by a person but sent to a destination that is not necessarily identified as being received by a specific person.

Address(es) or addressing information for the recipient can refer to email addresses, phone numbers, or any alias name that can be interpreted as full addressing information by reference to an address book function of a device or communications service.

Destination-specific requirements are minimum requirements of information input, and/or any file size or file type limitations, that must be conformed to in order for transmission of data to be allowed to that specific communications service or portal.

Avatars and thumbnail images refer to representations of a user or user account, and may be either photo images or illustrated images that are uploaded or chosen from a list of options. They may also be default images that are automatically substituted until specifically overridden by a new choice.

Icons, buttons, and links are terms applying to any graphic element, including text, which is configured to execute a function when activated, with "activation" being defined in the section "Selection and activation."

Selection and activation of icons, text functioning as button objects, and the phrase graphical user interface means of selection are to be understood to include all forms of interaction for initiating actions from button or link elements of a computing device GUI (Graphical User Interface), including:
 a) for most touchscreen devices, interactions include touch contact and drag-and-drop actions;
 b) for some touchscreen devices, additional touch based actions such as multiple-tap touch, multi-point touch, and force touch technology (also known as "3D touch"), enable expanded options such as pluralities of functions from a single button object;
 c) for devices using any form of moving cursor control technology for user input (for example a mouse, touchpad, trackpad, trackball, or joystick) actions include double-click, click-drag and drop, and click with a modifier key or alternate button of a mouse or other control device;
 d) for either touchscreen devices or cursor control devices, some types of interaction involve successive activation of two or more elements of the GUI, for example selection of an icon by clicking while a cursor is positioned over it, or corresponding touch contact on a touchscreen-controlled device, followed by one or more additional selection actions of matching type on another icon or other interface element, in order create an association of the selected elements for processing a command;

e) for either touchscreen devices or cursor control devices, any form of assistive technology such as voice control (speech recognition) or eye-tracking control that links to the same control functions as described in a) through d) of this section.

Interceptor screens or intercept screens refers to intermediate windows that are displayed during a sequence of actions, the purpose of which is to prompt for missing information or out-of-range values as compared to the data acceptance requirements of a target destination.

BRIEF DESCRIPTION OF THE DRAWINGS

FIG. 16 depicts an embodiment of a preference settings dialogue where options can be specified for how to handle content when it may not be compliant with requirements or limitations of a target destination.

FIG. 28 depicts some but not all possible alternate layouts of the embodiment components that would also be covered under the claims.

FIG. 31a and FIG. 31b 27,—are the 2 parts of a process flow diagram providing an overview of the invention's functions from a user point of view.

DETAILED DESCRIPTION OF THE INVENTION

Organization of the Drawings

In FIG. 1 through FIG. 15, the drawings approximately follow the sequence of typical operation, from initial view of the graphical user interface and following through to the completion of an exemplary usage. Some of the options, variations, and clarifications are also introduced. FIG. 16 introduces a variant of the basic invention which can change how the system responds to message content that is non-compliant with a target destination. FIG. 17a through FIG. 20 further develop the features of this variant. In FIG. 21 through FIG. 30, reference is made to features introduced in earlier drawings but with explanation of additional details or optional embodiments. In the interest of providing clarity to those skilled in the art and developing from the concept, significant detail is provided that is outside the bounds of specific claims but which supports successful implementation of the suggested embodiment and minor variations thereof.

Full Description Following Sequence of Figures

Figure 1:
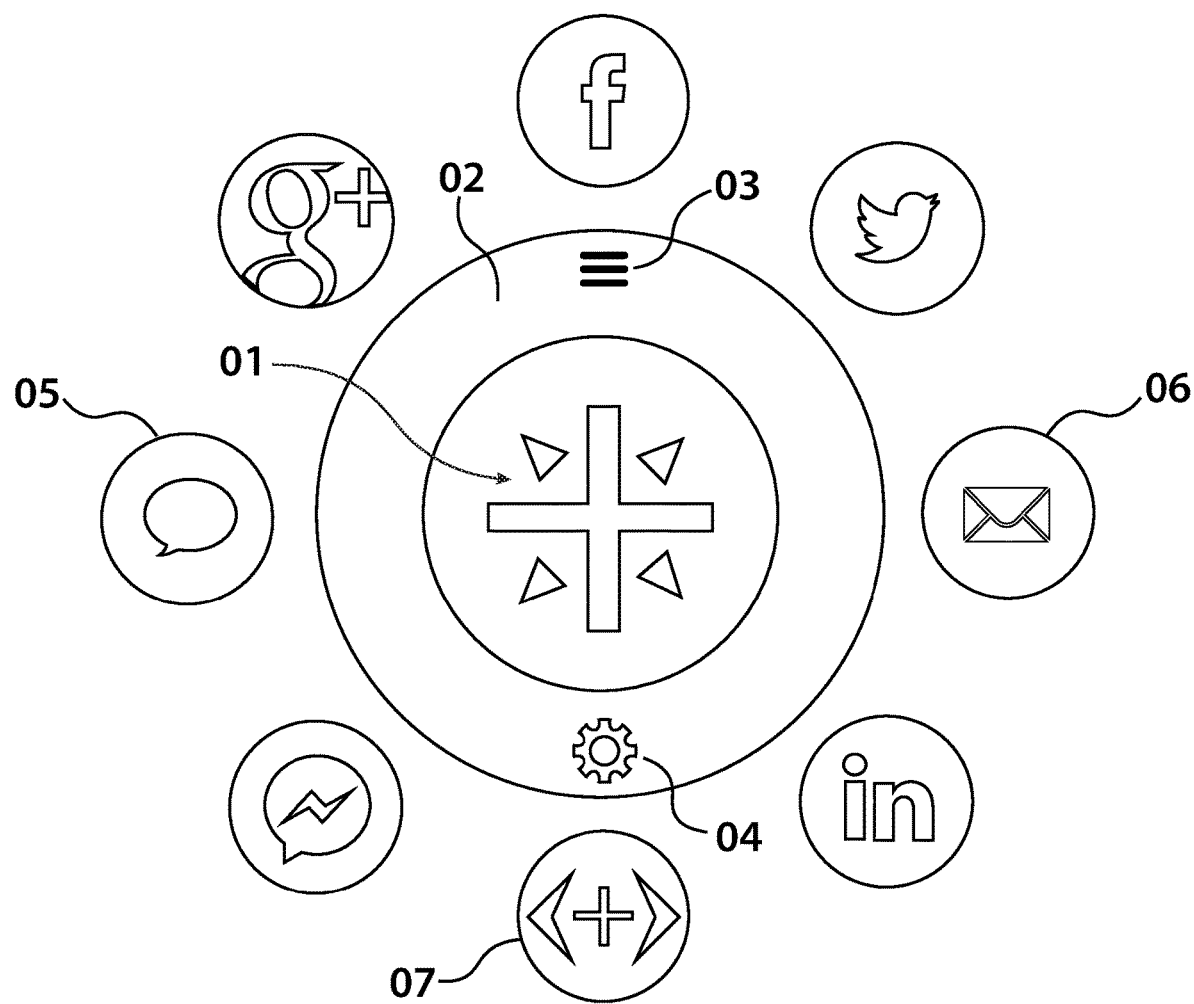
FIG. 1 depicts an embodiment of the invention in its default state, preceding interaction. The icons represent transmission destinations, but the specific icons shown are examples only and are not significant for the concept.
Figure 25A:
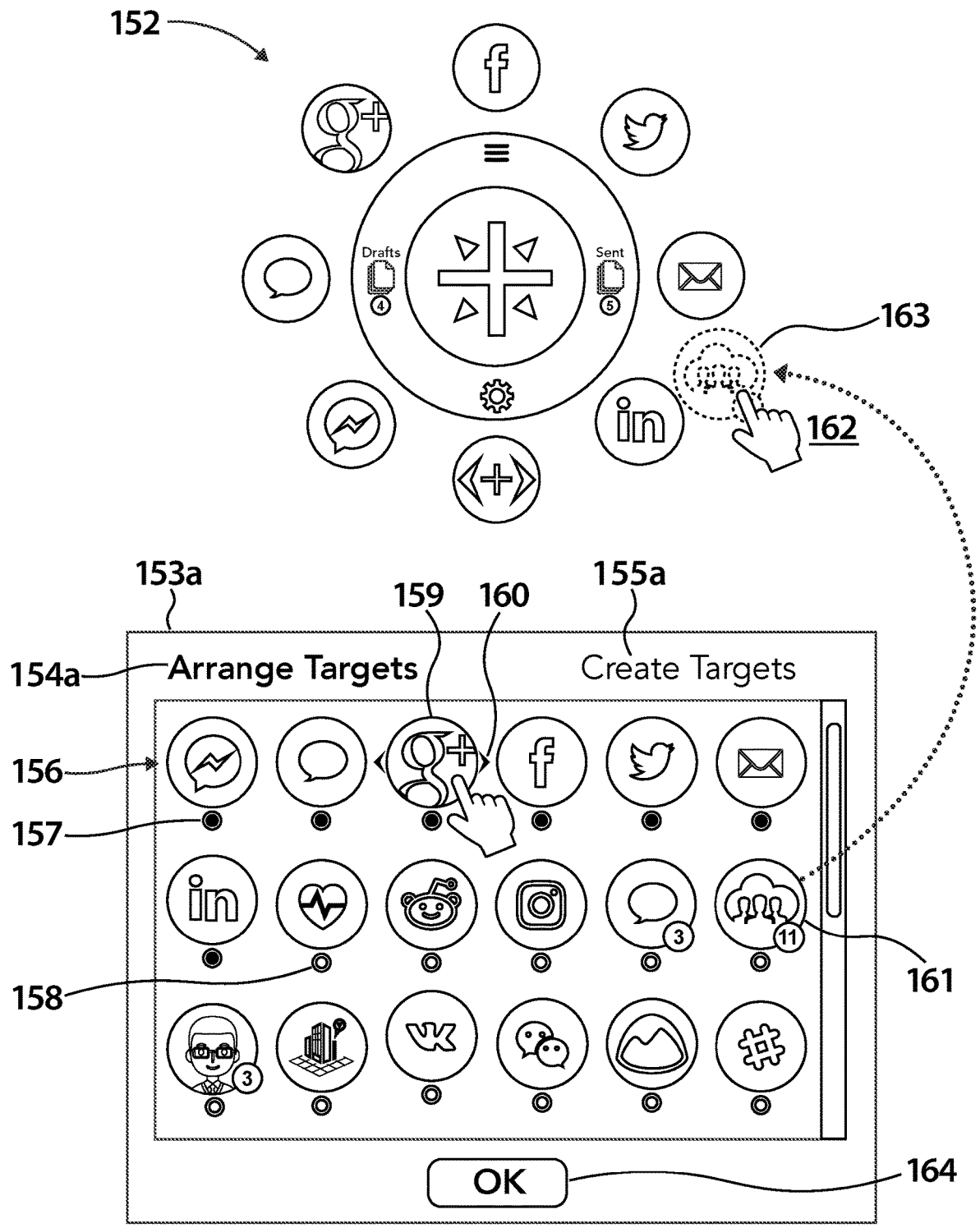
FIG. 25a and FIG. 25b show some options for how target icons could be added to and arranged within the interface, and how the customized target icons of FIG. 20 could be configured.

FIG. 1 depicts an embodiment of the invention in its default state, preceding user interaction. A graphic symbol 01 acts as a button to initiate the creation of new source content to be uploaded or transmitted as a communications message or as data. The button design is only a suggestion and may be implemented in any graphically appropriate manner, as appropriate to the device or operating system standards. Adjacent to this button function is an area 02 providing a configuration menu 03 and settings or preferences menu 04. The configuration menu 03 is envisioned to include such functions as addition of installed applications to the interface, and configuration of custom targets as will be described below. The settings or preferences menu 04 is envisioned to include such functions as user preferences for various display aspects of the interface, or specifying default choices among multiple interaction options. However, neither the specific content of these menus nor the existence of two types of menus is a relevant detail of the disclosure. In the implementation of the invention for particular devices or operating systems, UX designers and code developers may choose to group configurable functions differently, and may choose to group all configurable functions under a single menu. In this embodiment, the previously described components are surrounded by a ring-like array of icons that include target destinations such as text messaging 05 and standard email 06, and other icons shown only as examples of target options. A feature of the embodiment is that many target icons are aliases of applications linking to communications services, and target icons may also include custom-configured ones as explained for FIG. 2b below. The set of target icons displayed and its sequence in the array would likely be determined in a Preferences menu displaying compatible applications accessible on the device with the option to choose the ones to be included in this interface. A suggestion for how this could be implemented is shown in FIG. 25a. Compatible applications would be those for communication, or otherwise allowing uploading of files or data. The specific number of icons shown is not a characteristic of the invention, and may vary according to device display size and possibly also vary according to user preference settings. For reasons of clarity in the drawings of this disclosure, the arrangement of these icons is quite "loose" and could easily include more icons in the area shown. Also for reasons of clarity, the target icons are not identified by name. Although many target icons for commonly used communications services are easily recognizable to the frequent user, display of a text label may be desired and could be an option established in a Preferences menu. A multi-action graphic button 07 provides a means for displaying additional target icons that exceed the number of target icons displayable by this particular graphic layout. The action of this button is described more fully below.

Figure 2A:
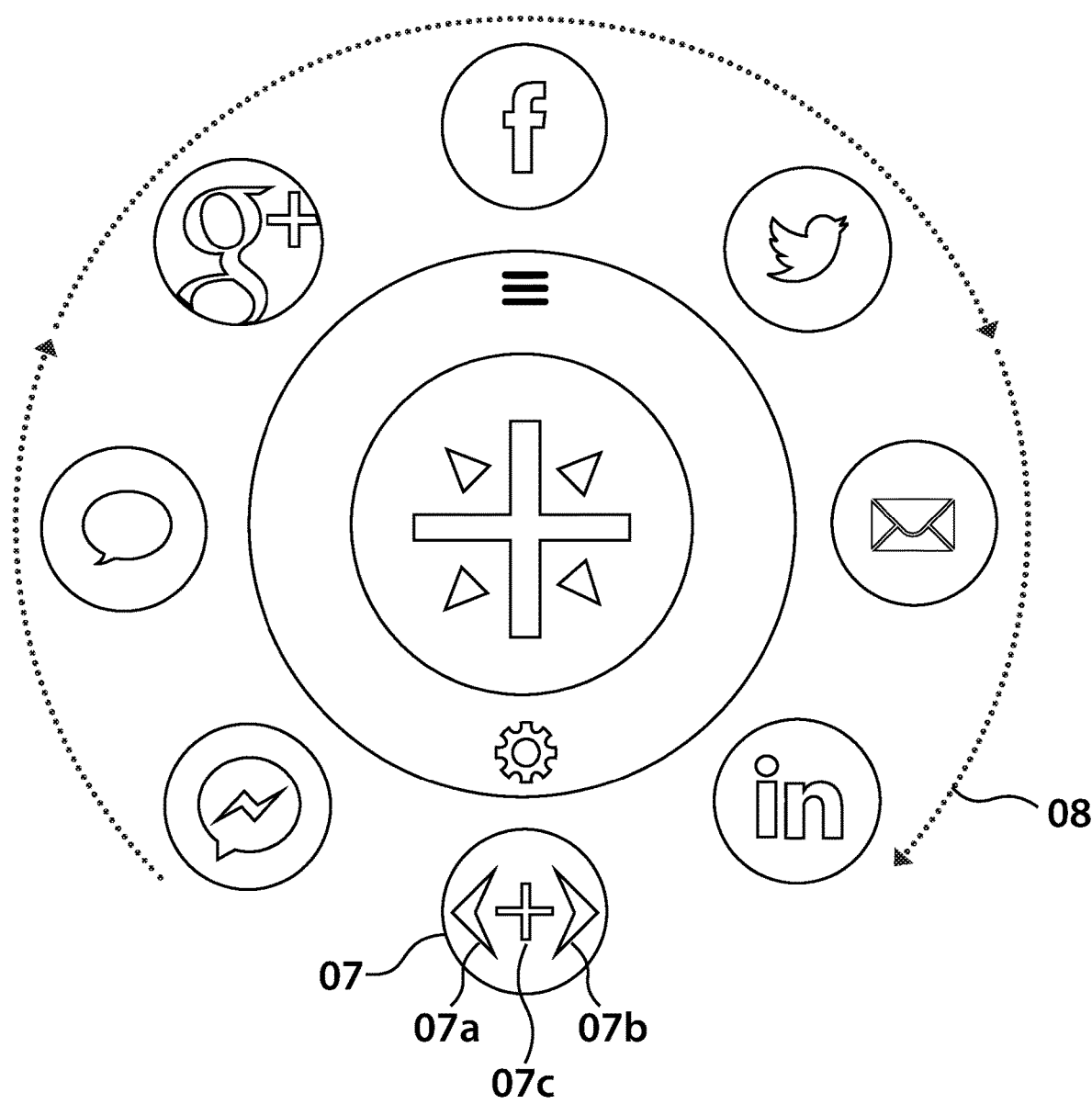
FIG. 2a depicts a set of icons representing target destinations that can be rotated in a scrolling or paging motion to reveal additional icons that exist in the interface but are hidden, as will be seen in FIG. 2b and FIG. 2c.

FIG. 2a repeats the overall layout of FIG. 01 but with emphasis on the method by which additional target icons can be brought into view when the total number of targets exceeds what can be displayed in the original graphic layout. The nature of the display change is either by a scrolling or paging action, or both provided as options. "Scrolling" is to be understood as the shifting of icons in a circular motion so as to reveal at least one additional, previously unseen icon stored in configuration memory, while simultaneously hiding one of the originally displayed icons. The newly displayed icon will be on one side of the semicircular array, adjacent to button 07, and the icon previously appearing on the other side of 07 will disappear. Thus if two new icons are moved into view, two of the original icons will disappear from view. The side on which the new icon appears depends on whether a clockwise or anti-clockwise motion is chosen. "Paging" is to be understood as displaying an entirely different, full set of icons in a single action. In the case of this embodiment, a full set would be the next 7 icons. Button 07 provides the option to "scroll" in either direction, clockwise or anti-clockwise, according to the orientation of the two arrowhead symbols 07a and 07b. A "paging" action is available by activating the central plus (+) symbol 07c. The semicircular directional line 08 indicates a full-rotation paging action resulting from activating the paging option of button 07c, the display result of which is represented in following FIG. 2b.

Figure 2B:
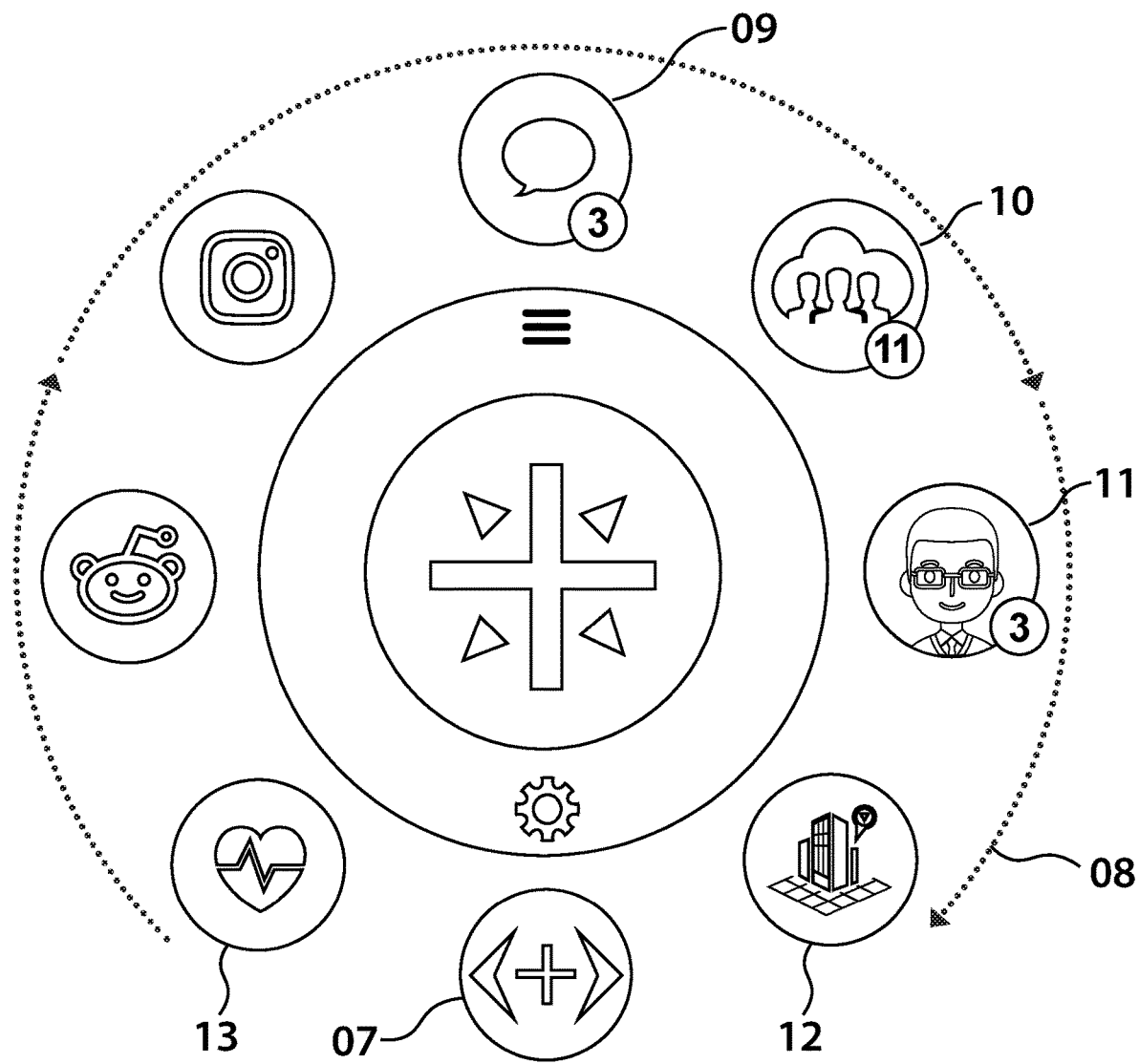
FIG. 2b depicts a second grouping of target destination icons that have been revealed by the scrolling or paging function. Specific icons are identified for discussion as examples of certain customizable features of the embodiment.

FIG. 2b shows the result of paging the target icons to a completely new set, with only the scrolling/paging button 07 remaining unchanged among the circular array of icons. As with the first set of icons in FIG. 01, this set and any subsequent set shown are only examples, and any actual set may be completely different and/or arranged in a different order. The set of target icons shown here include two established and recognizable social media destinations, and also several specialized targets as follows: 09, a text message target pre-configured with 3 recipients; 10, a group communication target pre-configured for 11 recipients wherein the types of contact may include a mix of methods, for example some by text message and some by email; 11, a single recipient who may have multiple means of contact, for example a phone number for text messages and 2 different email addresses; 12, a target configured for upload to a proprietary network or gateway such as a reporting system or database, or to a specific device addressable via wireless connection; 13, a health-IT related database to which vital sign measurements or other health statistics and information are transmitted. Additional details about these customized targets are described for FIG. 24. A suggested method for creation and configuration of such custom targets is shown in FIG. 25*b*.

Figure 2C:
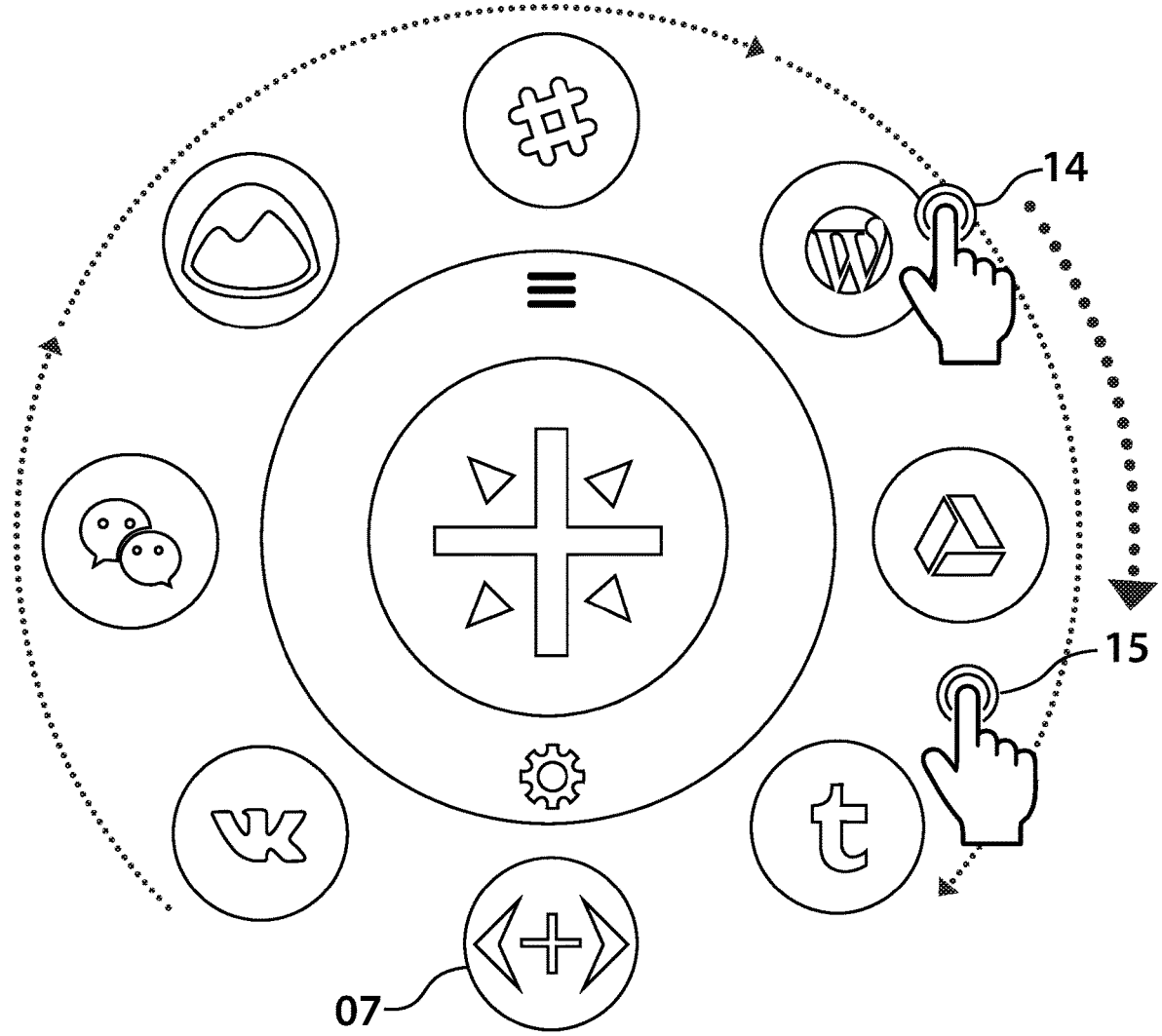
FIG. 2c depicts a third grouping of target destination icons revealed by another scrolling or paging action, and also suggests an alternate method of scrolling or paging among different groups of target icons.

FIG. 2*c* shows the result of another full-rotation paging action, resulting in display of a completely different set of target icons, with only the scrolling/paging button 07 remaining unchanged. This third set of target icons completes the demonstration of the concept of multiple sets of icons, however the number of targets is essentially unlimited and additional full or partial sets would be possible. In this figure also is the suggestion of an alternative method of paging, available on touchscreen devices, which bypasses the need to use scrolling/paging button 07. A gesture action beginning with touching the screen at any point within the circular array of icons, for example at position 14, then moving the finger in contact with the screen to a new position along this circular arc such as position 15, generally referred to as a "swipe," could also scroll the set of icons. In this case it would be a clockwise motion. As is common with established touchscreen interactions, a "swipe" that is either executed over a greater distance or executed more quickly could be interpreted to mean an intention to "page" to a completely different set of icons, and the action could have built-in constraints to permit only a single full rotation per swipe.

Figure 3:
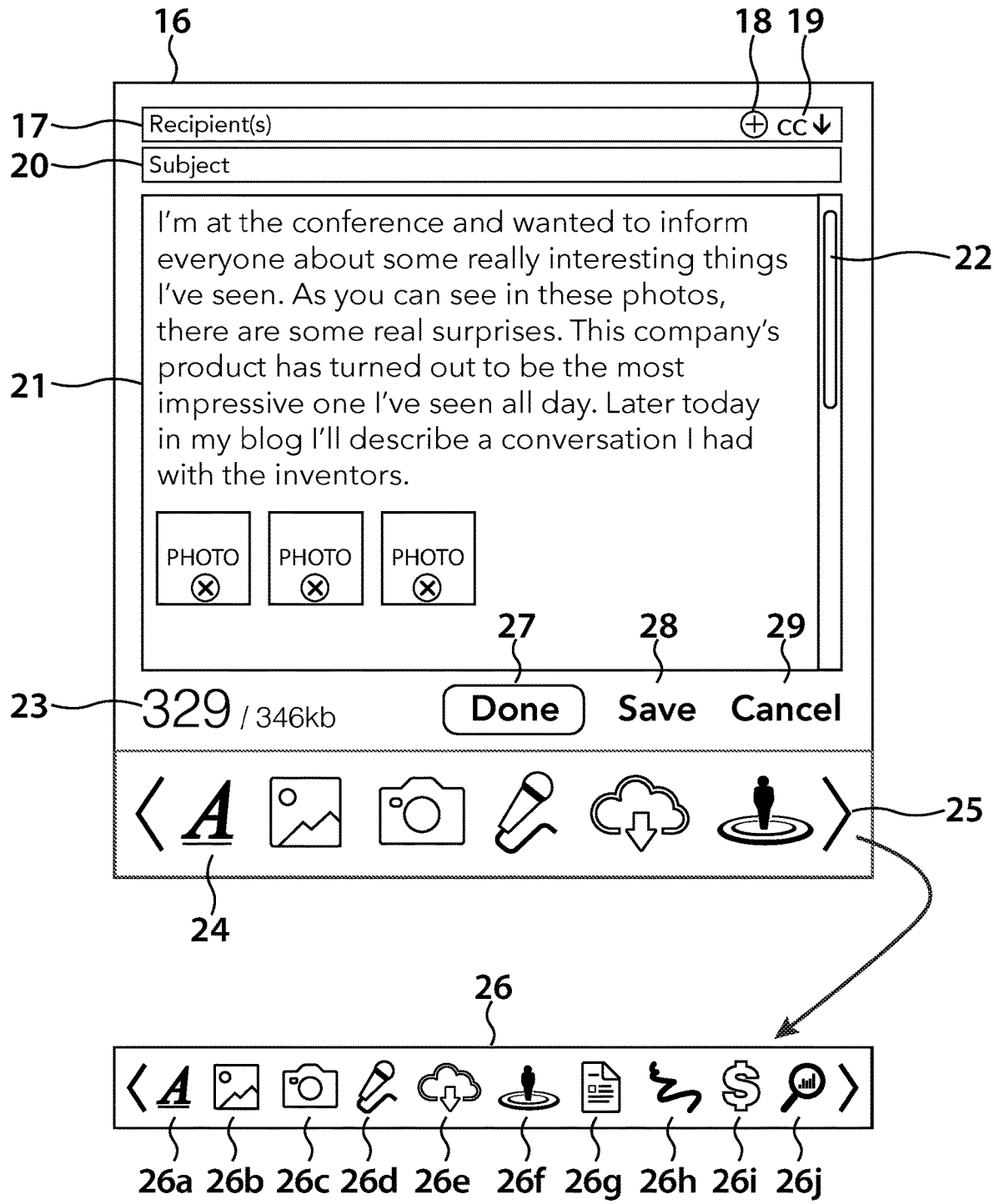
FIG. 3 depicts the source content creation and assembly interface and various options available for extending its versatility with different content types.

FIG. 3 provides details of the universal content creation window for entry of text and all other message content. In other contexts, this may also be referred to as the source content creation and assembly interface, or source content assembly interface. Referring back to FIG. 1, activating the central content-creation button 01 initiates display of interface window 16. Contained therein is an extensive range of options for composing or assembling of text and other content, including but not limited to a recipient line 17 and associated address book lookup function 18, and expandable cc and bcc functions 19, all of which are relevant primarily to direct-to-person communications; and a Subject line 20. The fields 17 and 20 contain default text that would be automatically deleted and replaced upon initiation of text entry. Furthermore, a text composition area 21 may also display attached documents such as images, the specific manner of displaying attachments being flexible and possibly following guidelines of a particular operating system or device; a scroll bar 22 which may be implemented on some computing devices but which would likely be omitted on touchscreen devices; a characters and spaces counting function 23 which may optionally report total data size of attached documents. A proposed feature of the embodiment is the flexibility to add program extensions to enable multiple types of data input as message components. A row of icons 24 allows choosing of various content input modes and content attachment types; buttons on left and right, 25, for scrolling to show additional options of 24 that may be out of view. Further expanding on feature 24, shown in 26 are suggestions for multiple input types including but not limited to: text input 26*a*, images to be attached from an image library in the device's storage or from any storage device connected by wired or wireless means 26*b*; access to a camera as part of the device or connected to the device, including all available imaging functions such as still images, video recordings, and live video feeds 26*c*; audio recording functions such as voice memos 26*d*; attachment of documents or data stored in an internet cloud storage account to which the device has access 26*e*; the current geolocation of the device, displayable optionally as raw coordinate data or as a map link, using location services data such as from a device's GPS receiver, mobile phone networks, or wireless networks 26*f*; an attachable existing document, mainly relevant for non-mobile devices with separate document storage 26*g*; an image-drawing function taking advantage of either a touchscreen device's pressure-sensitive characteristics or that of a special drawing tablet or screen utilizing a stylus 26*h*; a currency transfer function linked to a payment account, allowing payments or disbursements of money to specific recipients 26*i*; data from the measuring capability of the device, or from a peripheral device connected by any means to the device 26*j*. This feature of enabling multiple types of communications content is envisioned as having, at minimum, a core set of capabilities including a subset of the ones shown and allowing for developers to create more specialized ones that can be added in a modular form. This would involve implementation of API (Application Program Interface) code to either link to capabilities of existing, established applications, or to create extensions or plug-ins dedicated to specific data types. As will be understood by those skilled in the art, each of these input options will require its own unique dialogue window for executing the desired action and for choosing options, and those interfaces will vary widely according to operating systems, device standards, and what compatible applications can be accessed. As such, demonstration of these ancillary interfaces is beyond the scope of this invention's description. A "Done" button 27 is activated when all content is composed or assembled as desired. Optionally, a "Save" button 28 executes saving as a draft, or a "Cancel" button 29 deletes all current input actions.

Figure 4:
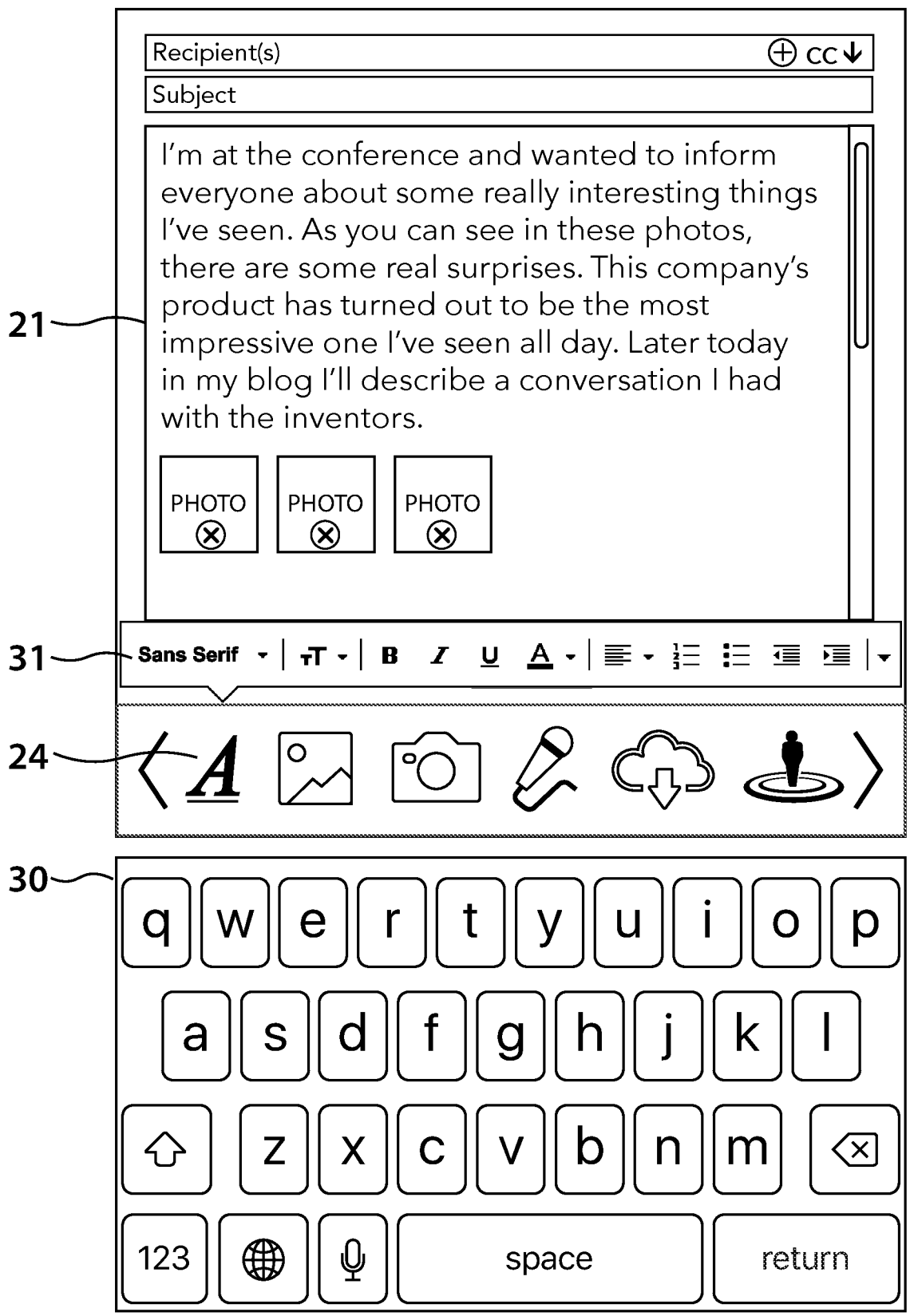
FIG. 4 depicts the same source content creation and assembly interface, focusing on text entry mode.

FIG. 4 is a repeat of the same content creation window as in FIG. 3, but with emphasis on text input. As text is likely to be the preferred default input type, the alphabetic icon 24 in the row of input types will be active when the window is first opened, or can be chosen again if another option in row 24 has been chosen previously. Activation of the text input area 21 by either mouse click or equivalent in the case of cursor-control devices, or by touch-tap in the case of touchscreen devices, will enable the device's keyboard input. In the case of touchscreen devices, an on-screen virtual keyboard of type similar to 30 will appear and become enabled for input. Such keyboards are common for touchscreen mobile devices, and as shown here may also provide options for foreign language character input and for speech-to-text interpretation. On some devices, a pop-up menu 31 could provide multiple options for text formatting. Some device operating systems may also enable implementation of spell- and grammar-checking.

Figure 5:
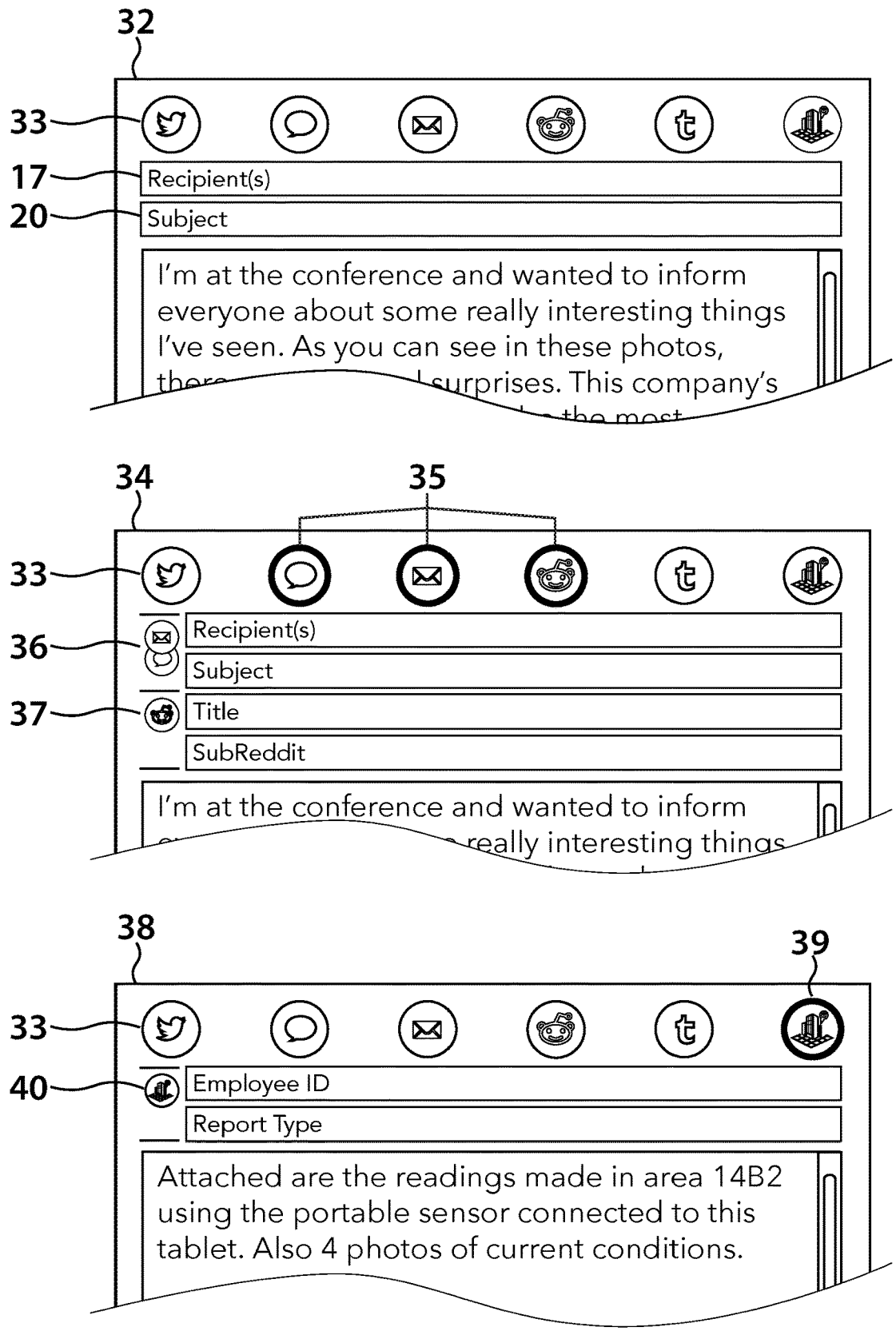
FIG. 5 depicts an alternate configuration for the content creation interface, wherein different metadata input fields required by some target destinations are accounted for at the time of initial content input.

FIG. 5 depicts a variation of the universal content input interface described for FIG. 3 and FIG. 4. The value of this modification will be more fully appreciated in connection with the discussion of FIG. 12 through FIG. 15, but in summary the issue being addressed is that target destinations vary in what fields of information may be required, and may also impose certain content limitations. The modified top area of the content input window 32 contains a row of icons 33 which are configured as a user preference to represent the most commonly used targets; optionally a system may conceivably be capable of pre-populating with icons based on analysis of a user's recent target choices. Such dynamic changes in display content, based on recent patterns of usage, are already established in some social media bookmarking and sharing "widgets," for example AddThis™. By selecting at least one of these icons, fields are configured according to those requirements and presented for entry of information. By default, the previously introduced Recipient(s) field 17 and Subject field 20 are displayed, as they are typical for email. In instance 34 of the modified input window, three target destination icons 35 have been selected. The result is a display of icons 36 to confirm that targets of email and text message have relevant fields of Recipient(s) and Subject. Additionally, the third icon selected for the service Reddit™ has resulted in display at 37 of fields specialized for that service. In instance 38 of the modified input window, the selected icon 39 is for a custom target destination such as access to the database of a proprietary reporting system. The resulting fields displayed at 40 represent that system's unique and required metadata types.

The predetermination of these fields is for convenience and efficiency and is neither a requirement for completion of the message composition process, nor a limitation on what target destinations are ultimately chosen. As will be described further in the discussion of FIG. 7 to FIG. 10, latitude is given to choose the target destinations at a later point, and as described in the discussion of FIG. 12 to FIG. 15, is prompted for any additional information or changes needed. The information in the extra fields is ultimately only transmitted to those target destinations that either require them, or at least accept them. For example, if a message set up with the fields shown in instance 34 is later also targeted to a service for which no additional fields are relevant, for example Twitter™, then in that one case the metadata fields information is ignored and only the content of the main message body is transmitted. Three other possibilities should be mentioned in connection with the modified input window of FIG. 5: Reiterating two points briefly mentioned earlier, (1) The display of this modified window could be optional as a user preference; (2) In addition to being user-configurable, the icon display could conceivably be automatically populated according to analysis of frequent target usage; and as a new point (3) the target icons chosen at this stage could automatically, but tentatively select targets for transmission—with those target choices being modifiable in a later step by additions or cancellations.

Figure 6:
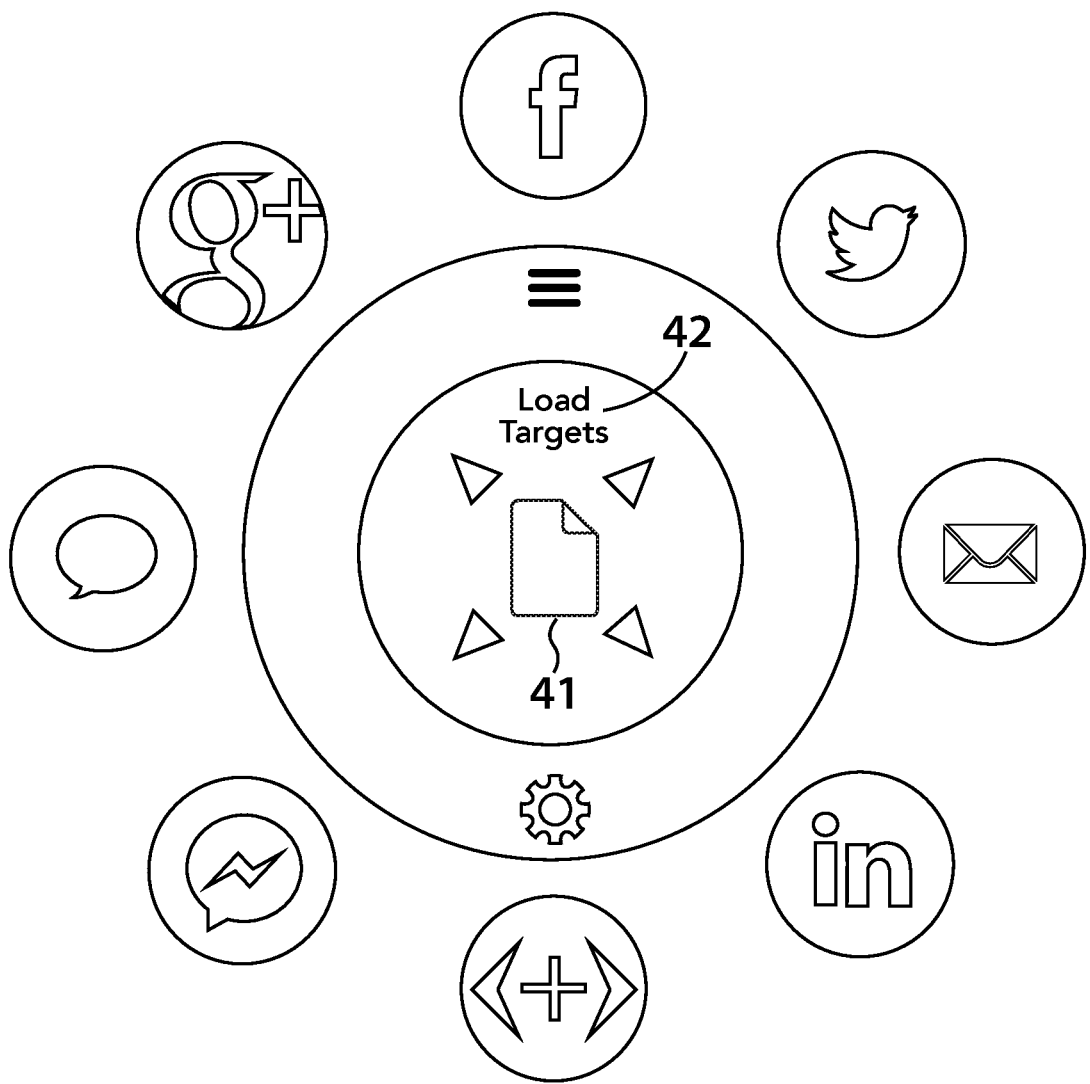
FIG. 6 depicts the main interface following completion of source content creation, with the content items ready for association with target destinations.

FIG. 6 depicts the result of activating the Done button 27 of FIG. 3. The actions taken in the content creation window shown in FIG. 3 and FIG. 4 are now displayed as a document icon 41 representing content prepared for transmission. A form of prompt is also displayed such as an on-screen text note 42, possibly in combination with graphic animation of the four arrowheads surrounding 41, suggesting that the source content item is now ready to associate with at least one, or a plurality of target destinations.

Figure 7:
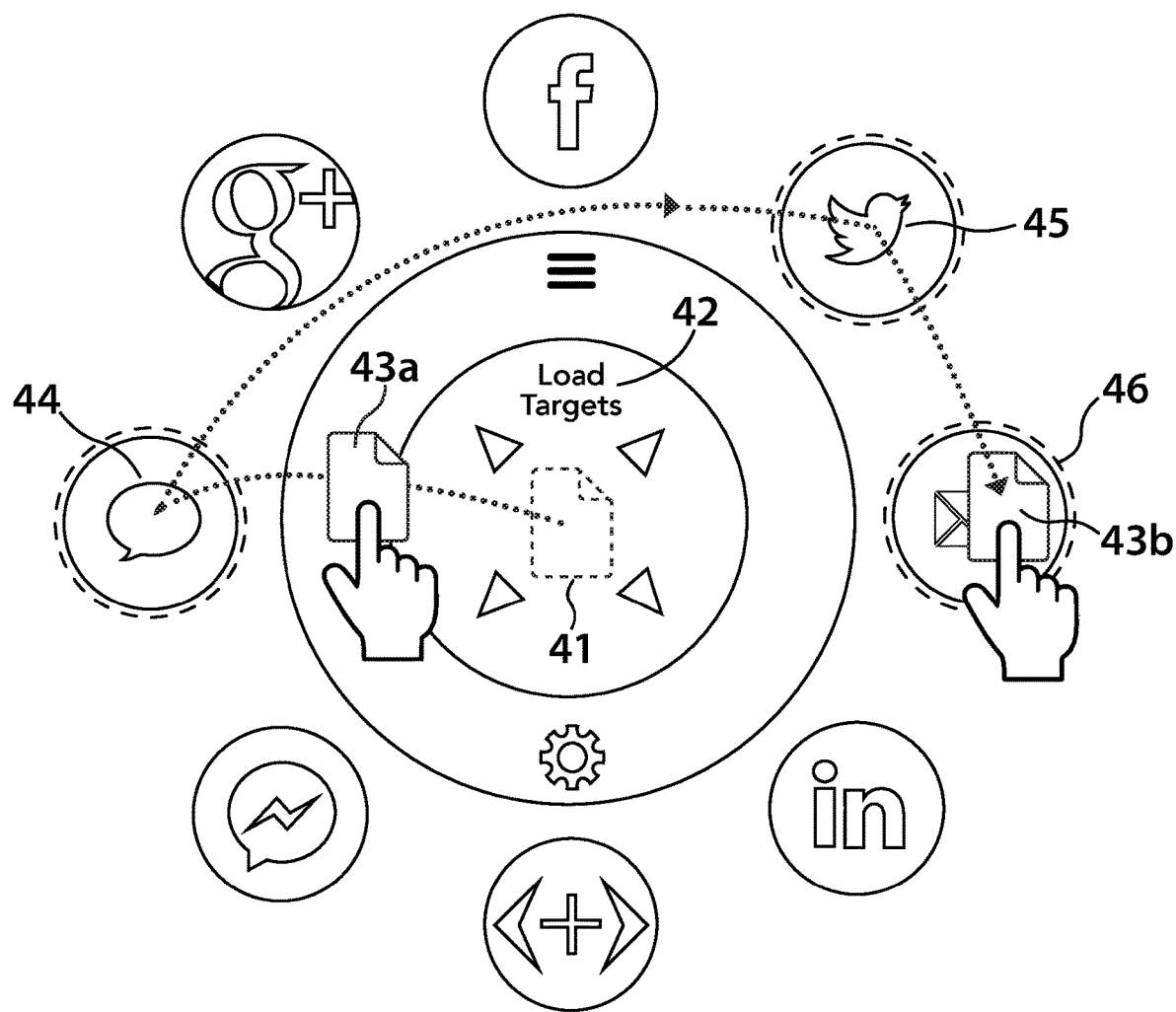
FIG. 7 depicts the path of one possible action for associating the source content with three different target destinations by dragging the source content icon over the target destination icons.

FIG. 7 depicts one of several methods by which the source item can be associated with multiple target destinations for transmission. The method shown here can be either a "drag-and-drop" for a single target destination, or "drag-hover-activate" followed by a final "drag-and-drop" action for a plurality of target destinations. The method is relevant to both cursor-control devices and to touchscreen devices, the differences being readily understood by those skilled in the art. In this depiction, a touchscreen method is implied. The prepared and ready source content item 41 of FIG. 6 is here shown as its original, central position 41 but represented as a dotted line shape because the icon is now in motion, in this case by touch contact and dragging. Because it is in motion, the source icon is thus renumbered 43a; it has been picked up and moved, in this case by touch-dragging, and positioned briefly over the desired target icons 44 and 45, the moving icon finally dropped at 46 as the last target chosen in this group and the icon renumbered 43b to represent a final position of what began at position 41. As a result of the drag-over and/or drag-drop actions, icons at positions 44, 45, and 46 show a form of graphic change to indicate that these targets have been selected, hereinafter referred to as "loaded," as transmission destinations. The condition of loading as a target is shown as a dotted line boundary that in some embodiments may be implemented as a color highlight, or by some other means making clear which targets have been loaded. The graphic change indicating the loaded state would ideally occur upon detection of the source icon being positioned over a target icon, but following a brief delay threshold. Some possible variations for displaying this state of being "loaded" are described in the discussion of FIG. 23.

Figure 8:
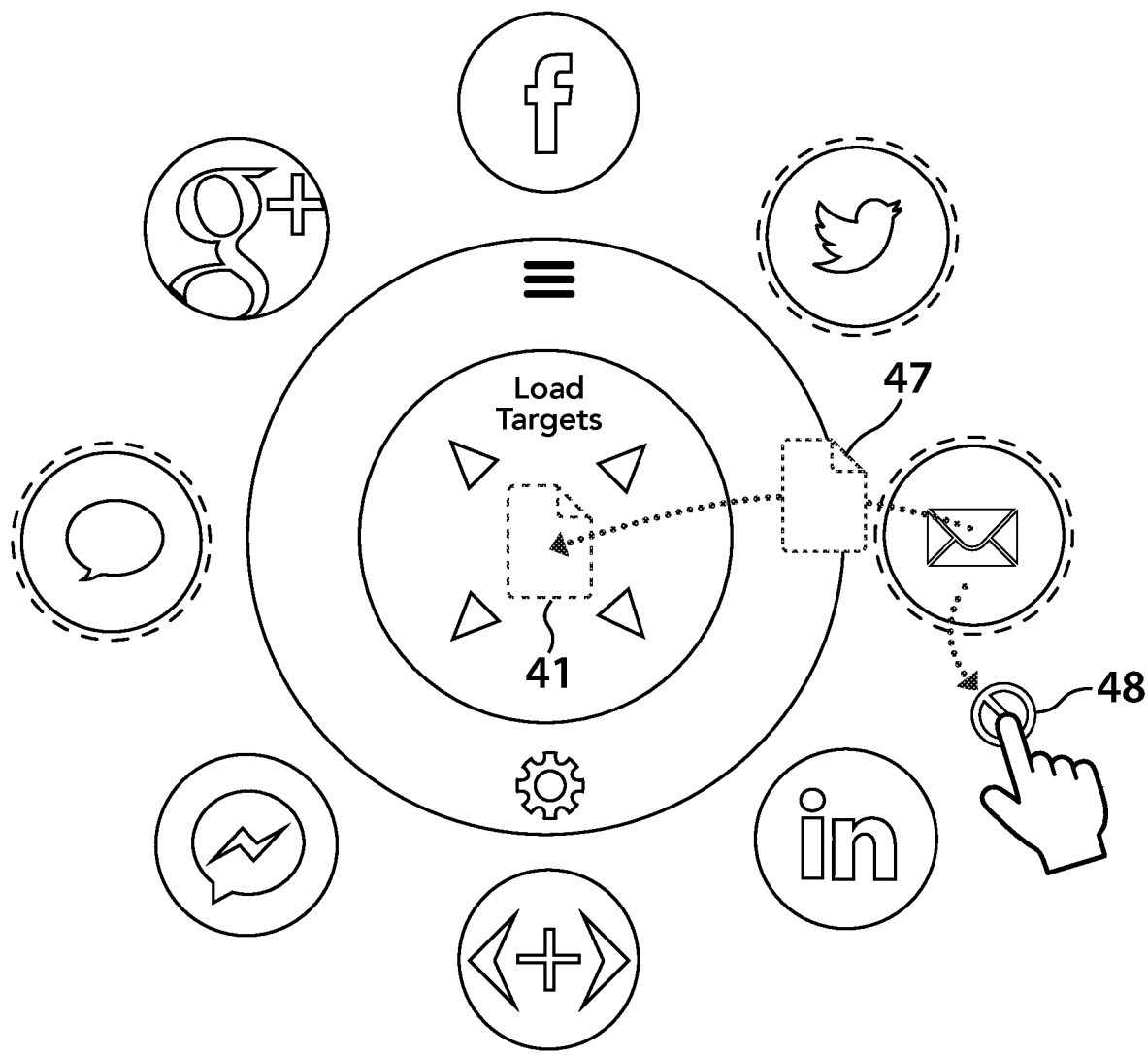
FIG. 8 depicts the automatic return of the source item icon to its original position upon release of touchscreen contact or cursor control of the source item.

FIG. 8 depicts the result of releasing control of the source icon 43b of FIG. 7, here renumbered as 47 because it is now in control of the system, not an icon being dragged. In this example the touchscreen-related action of releasing contact is implied, as indicated at 48. The icon is now returning to central position 41, exhibiting a motion as if attached by a spring. "Releasing control" here means releasing touch contact with the icon, or in the case of cursor-control devices would mean releasing the primary mouse button or its equivalent in other control devices. The idea of icons being movable but being able to return to a default position in this suggested "spring-loaded" fashion is well established in the field of graphical user interfaces. The implication in this case is that all target choices desired have been made among this particular group of targets. Description of the next figure will cover cases where targets in other groups of targets, currently not visible, are also desired to be included in the total set of transmission destinations.

Figure 9:
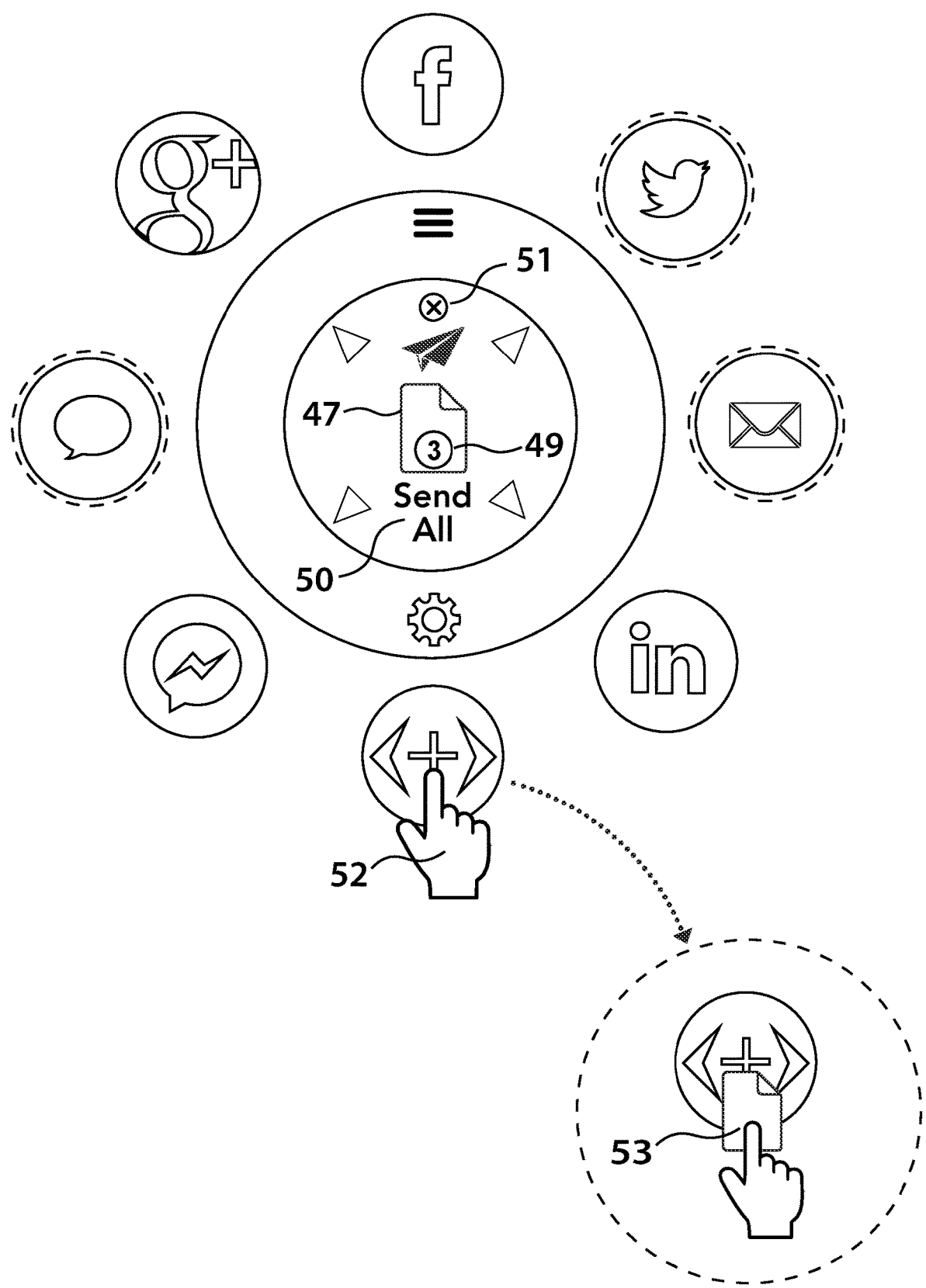
FIG. 9 depicts the source content item in a state of having been associated with multiple targets and readiness for final transmission to the selected target destinations. It also suggests methods of scrolling or paging to the next grouping of targets in order to add at least one more target destination, as detailed further in FIG. 10.

FIG. 9 depicts the next steps in the transmission preparation process. First, the result of releasing the source icon 47 and its return to position 41 as described for FIG. 8 is that the source icon records an updated value "3" for the number of targets loaded as seen at 49. This value could also, and preferably, be updated immediately upon activation of each target icon. At this point, the procedural logic assumes the source content may be ready for transmission to all targets, thus a "Send All" button or link is displayed at 50. As also shown, the display may include other elements to visually reinforce the idea that transmission is the next step, including animation of graphics or color but any other such elements are optional to the concept. Button or link 51 provides an option to cancel all transmissions previously configured. If all desired targets have been chosen, execution may proceed by activation of the "Send All" button or link 50. However, it may be desired to load additional targets in other target groups not visible in the default display. The additional selections are made by scrolling or paging to the next group of targets by touch or mouse-click action at 52, using either the full rotation action or the single item advance action as described in the discussion of FIG. 2a. Optionally and more efficiently, if there is an intention to immediately proceed to the next group of target icons and control of the source icon is not released as shown at 48 in FIG. 8, the icon could be positioned over the scrolling/paging button as in the inset detail 53 to execute the same action, with the source icon thus being immediately available to associate with additional targets in the next group.

Figure 10:
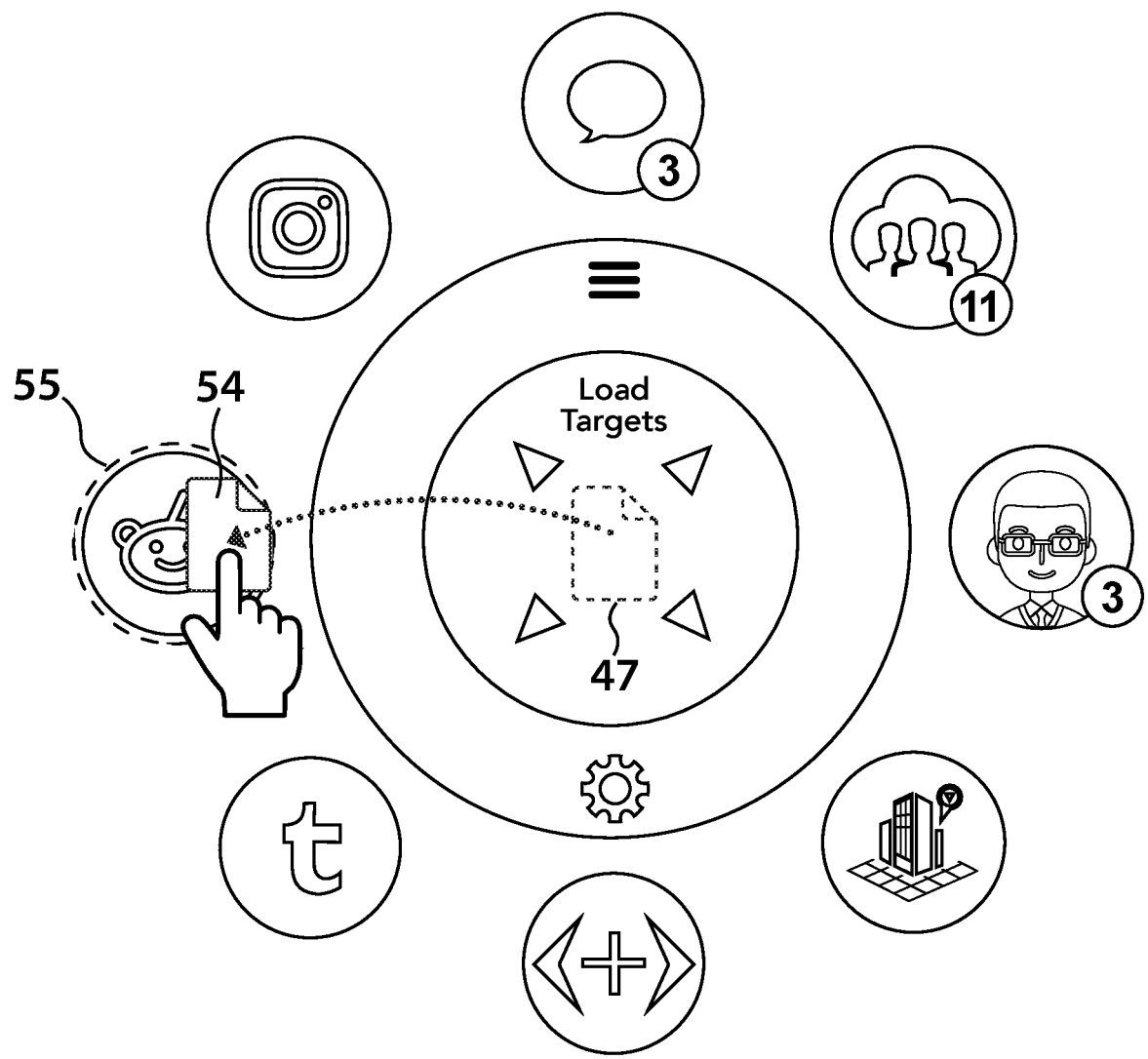
FIG. 10 depicts the content item being associated with a 4th target destination.

FIG. 10 depicts the loading of another target destination for the source content, after having executing a scrolling or paging action to display at least one of the next set of target icons. The source item icon, now represented in a new action 54, is picked up from the last-identified central position 47 and dragged to an additional target 55; the result being the additional target icon acquiring a highlight or other graphic change to confirm loading as a target. If option 53 had been used in the previous step (FIG. 9), the picking up step is unnecessary and the source icon can be immediately dragged to the additional target. If no other targets in this group are needed, control of the source icon can be released. If additional targets in another group are needed, the same procedure as previously described can be followed for any additional targets.

Figure 11:
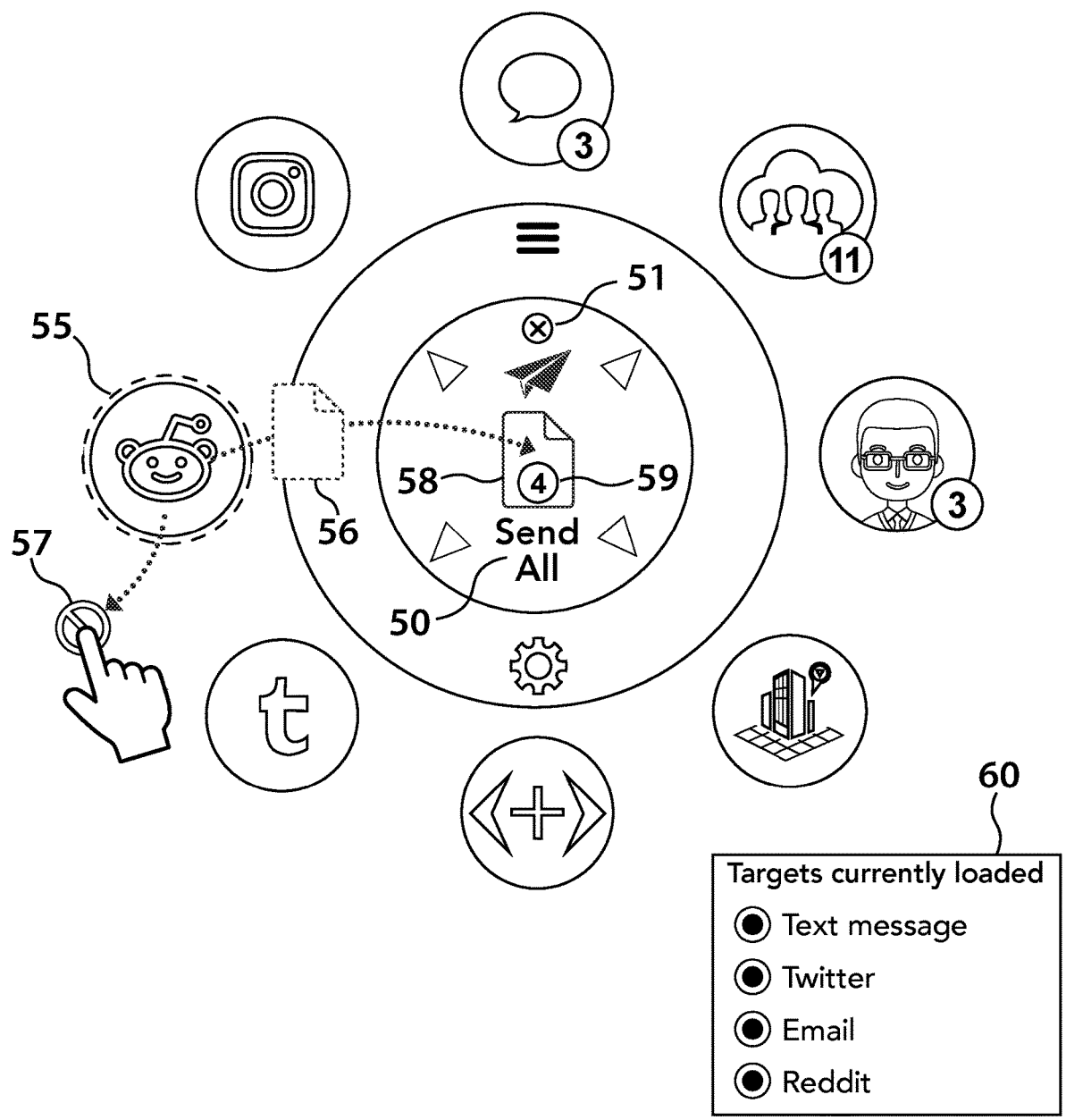
FIG. 11 depicts a $2^{nd}$ automatic return of the source item icon to its original position, similar to that in FIG. 8 but showing an updated total number of targets associated with the content item. The particular association of source and targets can now be processed by a "Send All" action. Also shown is an option for summarizing the loaded targets.

In FIG. 11 the selection of all desired associations of the source item with target destinations has been completed and control of the movable source icon has been released. The source icon is represented as the renumbered 56 because it is now in control of the system as it automatically returns to the central position, now numbered 58 as the final position following several previous motions. As described for FIG. 8, the automatic return of the icon to the central position is a result of releasing touch-contact control as implied at 57. The last group of targets accessed is still visible, and thus the last target 55 is shown by graphic emphasis as loaded. To confirm all previous actions, the source icon now displays a numeral "4" at 59, indicating a total of 4 targets loaded. As an optional feature, possibly selectable in a preferences menu, a pop-up window 60 could confirm identity of all targets selected. If implemented, it would appear at each and every point when control of the source icon has been released, as this would be interpreted by the system as possibly the completion of target selection. Such a window display could be at any position appropriate for the particular device's available screen area. At this point, activation of the "Send All" button or link at 50 as previously described in FIG. 9, will execute the transmission of the source content to all loaded targets. The source icon may also be "picked up" again to add more targets from this group or any other group of targets, navigated to by any of the alternate means previously described. Optionally, all targets may be canceled with button or link 51. As a system configuration issue, target selections could be automatically canceled by a timeout if not followed by a "Send All" action within predetermined timeframe. For purposes of this demonstration it is assumed the choice of targets has been completed and the intention is now to execute transmission. However there may be some additional information or modifications of the content that are needed to conform to requirements of the chosen targets, which are treated in the next step.

It is appropriate at this point to acknowledge that, with most or all types of destinations, all transmission actions to be executed must be enabled at the receiving end by a form of login and authentication, particularly with communications services where accounts are unique to individual users. As will be understood by those skilled in the art, on many devices the authentication for access to individual communications accounts may be addressed automatically by a universal authentication step for the device, often referred to as SSO (Single Sign-On). Optionally, in cases where logins are not allowed to be saved and automatically entered, a separate authentication step may be inserted in the process and that may be part of the sequence described in the next series of figures. A related point is that in some cases a user may wish to have more than one "identity" for some of the same services, and this could also be accommodated within an SSO framework. In the context of the embodiment, this could be implemented by having separate target destination icons associated with different identities having accounts with the same service.

In FIG. 12 through FIG. 15, a process is depicted wherein notification is displayed regarding any missing fields of information required for each of the target destinations, or any content parameters or limitations that must be followed before a successful transmission can take place.

Figure 12:
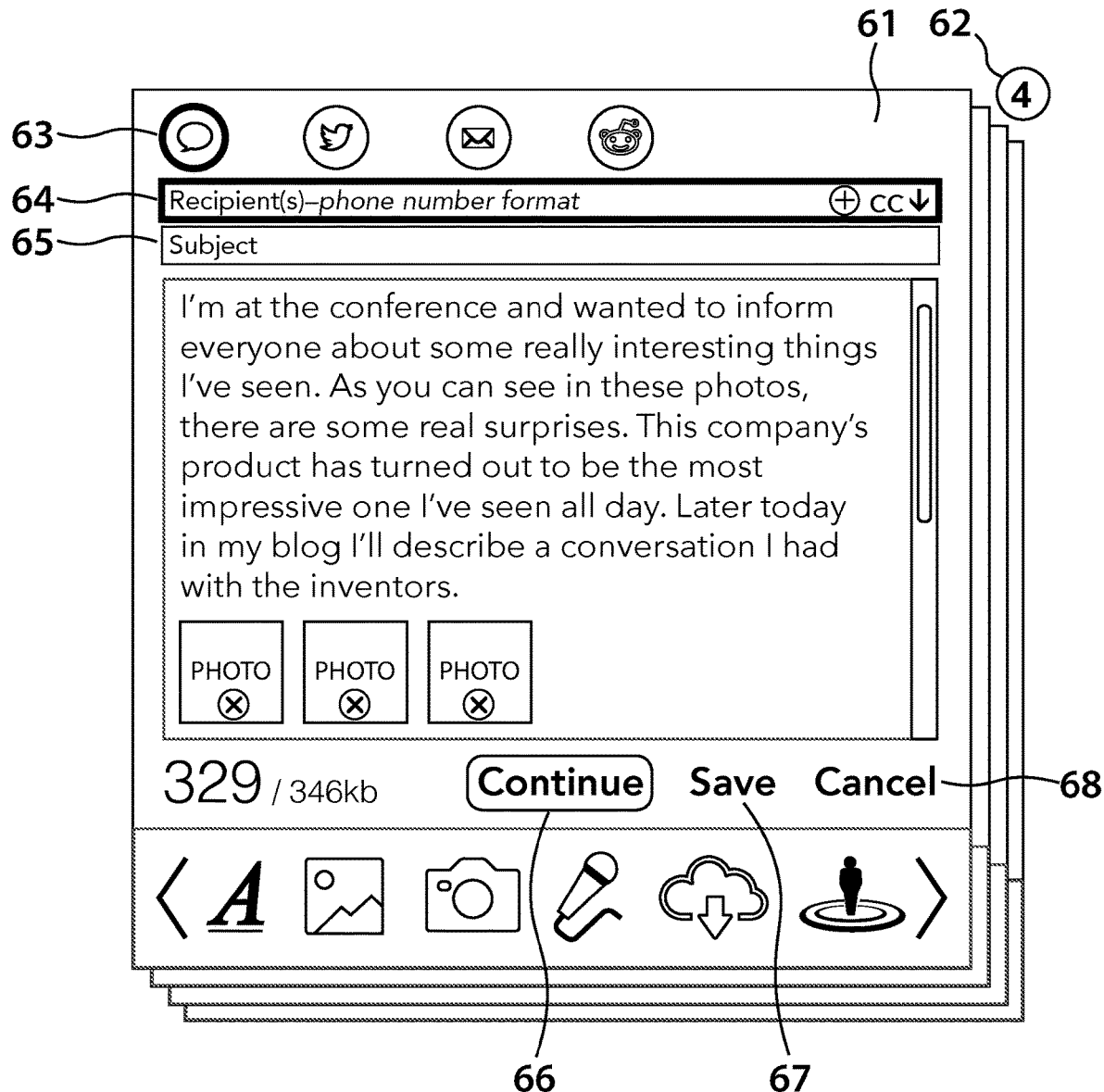
FIG. 12 to FIG. 15 depict a series of intermediate or "interceptor" screens, appearing in front of the main interface following a "Send All" action. These interceptor screens prompt for correction of the message for any missing but required information or to correct any parameters of the message that are outside allowable limits, such as total count of characters and spaces. Each of such intermediate prompting screens is unique to a target destination among the ones chosen.

In FIG. 12 are a "stacked" series of windows 61, displayed with a number "4" at 62 indicating issues to be resolved with all four targets chosen. Such windows may be referred to hereinafter as "interceptor windows" because they occur between a user's command to "Send All" and the actual execution, in order to prompt for correction of any missing or out-of-range parameters. At the top of the frontmost window is a row of icons representing the targets previously chosen, with the first one being graphically highlighted at 63. The highlighting indicates that this window relates only to the requirements of that particular target destination. A "Recipient(s)" field 64 is graphically highlighted, indicating that for this target it must contain at least one addressee. In this case the format of address required would be a phone number. A "Subject" field 65 is not highlighted because it is not actually required for this target destination, but is allowed and therefore optionally available. The required information having been provided, the process may proceed to the next step by activating a "Continue" button or link 66, or optionally may "Save" a draft with the button or link 67, or may "Cancel" this particular target destination with button or link 68. Optionally the system may be configured to automatically save the message as a draft, if for any reason no further input is received at this step. The subject of drafts is treated in the discussion of FIG. 21 through FIG. 23. Regardless of whether a Continue, Save, or Cancel action is taken, the result will be to hide this window and proceed to the next window, if any, in the stack of interceptor windows.

An additional point should be made about required fields and the type of information they contain: In the examples shown here, information has not been entered for "Recipient(s)" or for "Subject" when at the step represented in FIG. 3. or FIG. 4. If those fields had been completed earlier, "interceptor windows" would not necessarily appear following a "Send All" action shown at 50 in FIG. 11. Furthermore, if mixed contact information types had been entered, for example both email addresses and phone numbers, the system would ideally be configured to sort those out and deliver only the format of contact information appropriate to the target's requirements. For example, a phone number in the Recipients field would not be including when transmitting to an email address, and an email address would not be included when transmitting to a number for phone text. The methods for this sorting process are established and will be known to those skilled in the art.

Figure 13:
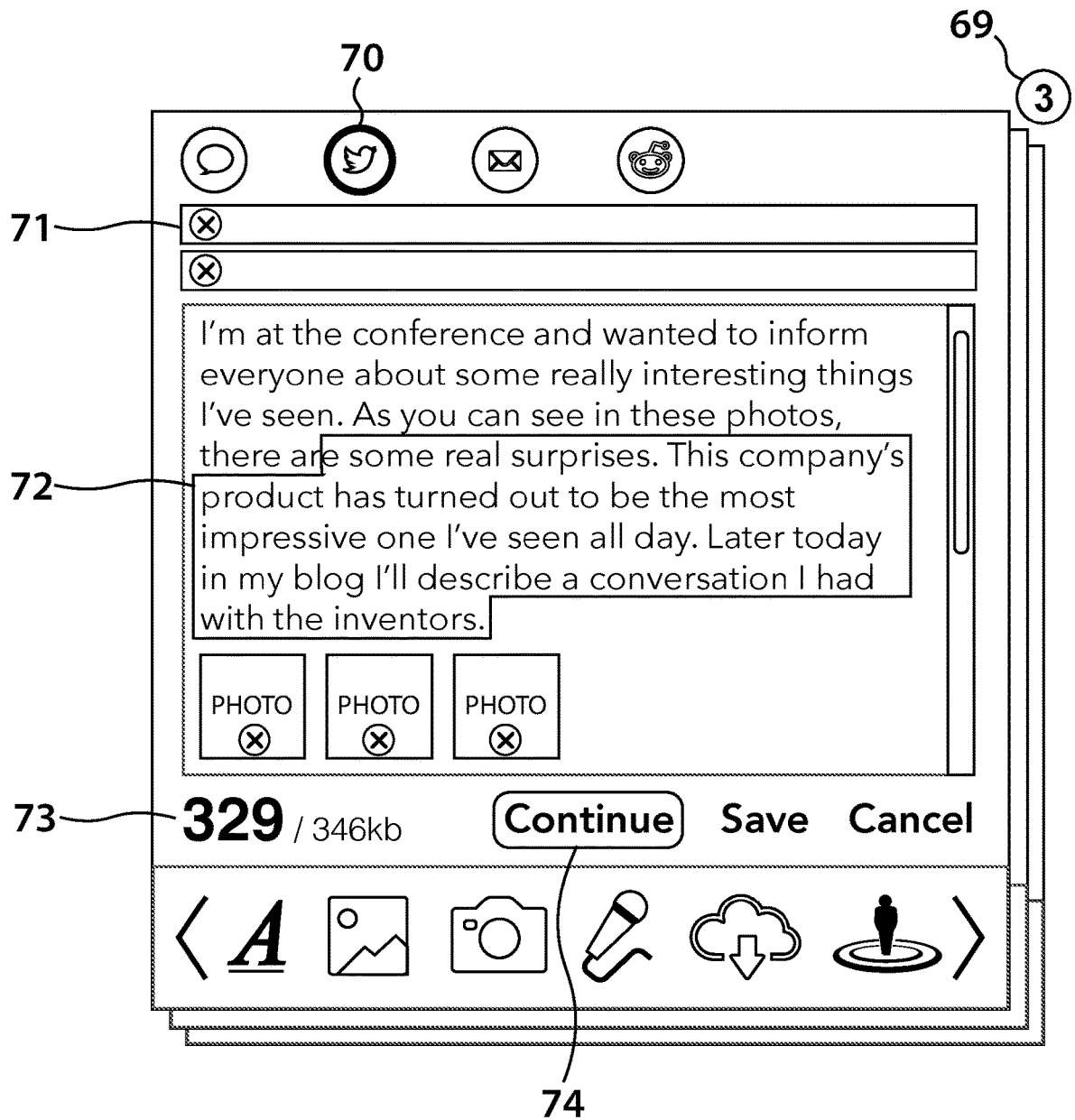

FIG. 13 depicts the second of the original four interceptor windows needing attention. Since the first window's requirements have been satisfied and the window dismissed, the remaining count at 69 is now "3." The highlighted icon at 70 shows the specific target to which this window applies. This target requires neither "Recipient(s) nor a "Subject," therefore the fields at 71 are indicated to be inactivated or optionally, do not display. However, this target type imposes a limitation on the count of total characters and spaces, and a form of graphic highlighting 72 displays the excess or over-limit text content. Possible treatments include changing the over-limit text to red, or superimposing a highlighting color. The notification could also include displaying a small pop-up message stating the nature of the limit. By activating the text area the device's keyboard will again be enabled, and the message may be shortened or rewritten as needed to satisfy the limit requirement. The characters and spaces count feature 73, previously described for FIG. 3, provides an aid for composing within this limit and is currently shown in a graphically enhanced form to emphasize that it is over the allowed limit. Any changes in the text or other content of this message will not affect the content of source messages associated with other targets. Once having provided the required information and having made any other required modifications to satisfy the target's requirements, the process may now proceed to the next step by activating a "Continue" button or link 74 specific to this window, or as described for FIG. 12 a "Save" or "Cancel" action may be executed for this particular target destination. In any of these cases, the result will be to hide this window and proceed to the next window, if any, in the stack of interceptor windows.

Figure 14:
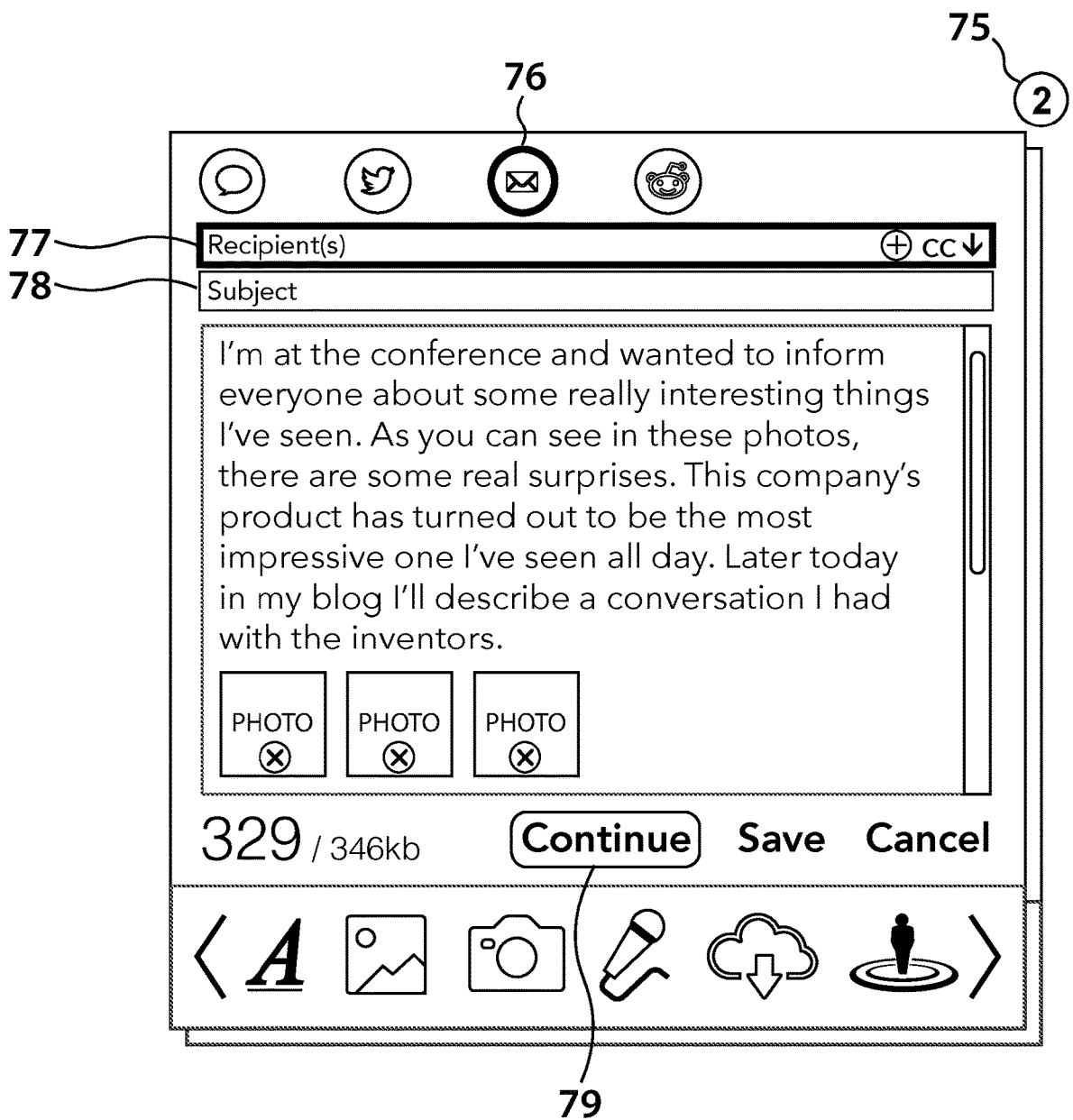

FIG. 14 depicts the third of the original four interceptor windows needing attention. Since the second window's requirements have been satisfied and the window dismissed, the remaining count at 75 is now "2." The highlighted icon at 76 shows the specific target to which this window applies. The only missing but required information is at least one recipient email address, therefore field 77 is graphically highlighted. The "Subject" field 78 is not required but optionally available. As noted in the description for FIG. 12, if these fields had been completed in the initial stage of source content preparation, and proper format of addresses was satisfied, no interceptor window would appear for this target. Furthermore as described for FIG. 12, if the contact information was mixed but contained at least one contact type conforming to the requirements of this target, the system would process the request using only the contact information type needed. Once the required information has been provided, the process may now proceed to the next step by activating the "Continue" button or link 79 specific to this window, or as described for FIG. 12 a "Save" or "Cancel" action may be executed for this particular target destination. In any of these cases, the result will be to hide this window and proceed to the next window, if any, in the stack of interceptor windows.

Figure 15:
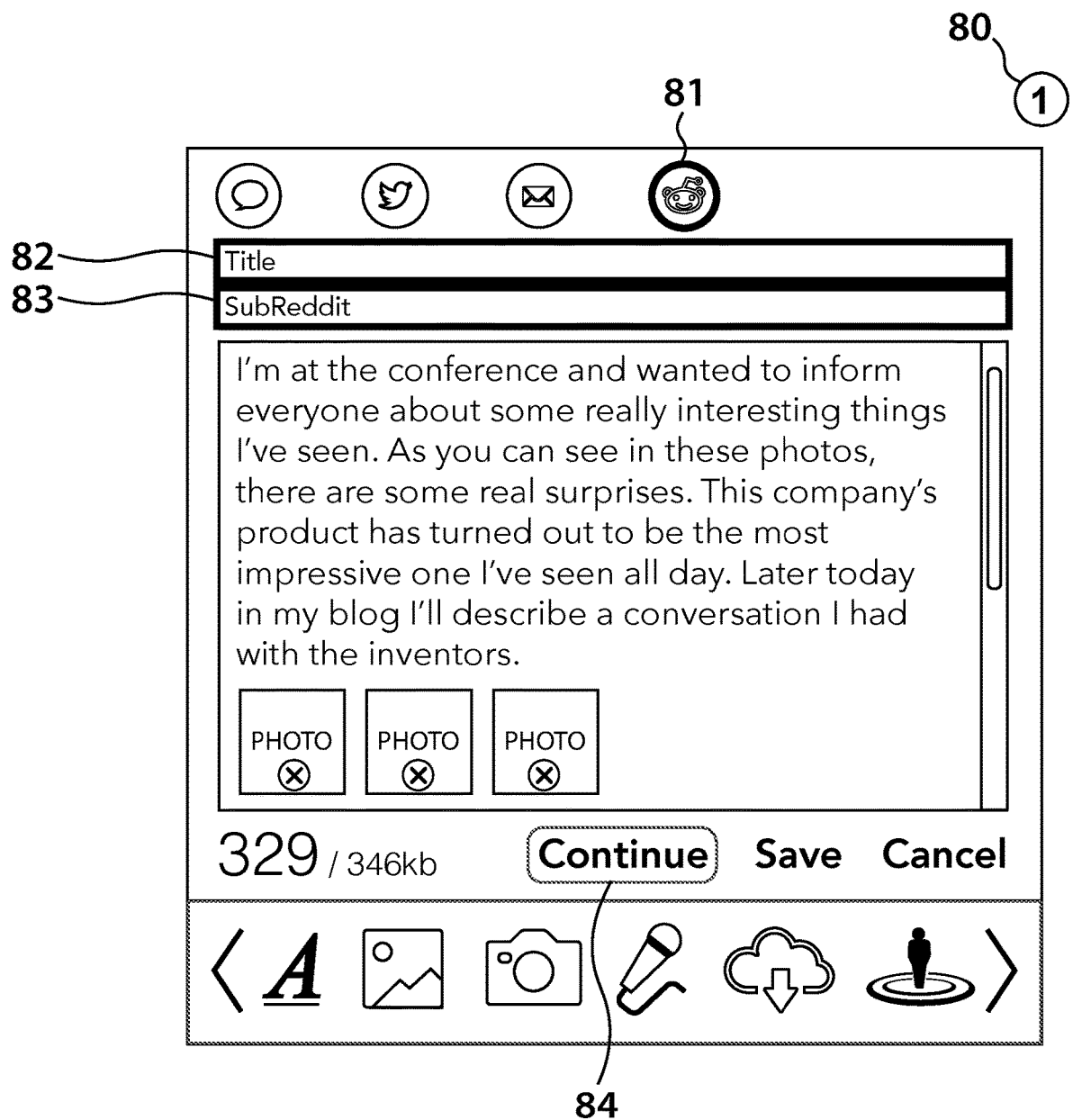

FIG. 15 depicts the fourth and final of the original four interceptor windows needing attention. Since the third window's requirements have been satisfied and the window dismissed, the remaining count at 80 is now "1." The highlighted icon at 81 shows the specific target to which this window applies. This target is used as an example of special cases where the target requires something quite different than the fields provided in the original window for input of source content. For this target, neither a "Recipient(s)" nor a "Subject" line are relevant; rather, the target requires a "Title" 82 and "SubReddit" 83 to be provided, the meaning of which will be understood by those who use this service. Since the target requires them, fields 82 and 83 are graphically highlighted. Once the required information has been provided, the process may now proceed to the next step by activating a "Continue" button or link 84 specific to this window, or as described for FIG. 12 a "Save" or "Cancel" action may be executed for this particular target destination. In any of these cases, the result will be to hide this window and proceed to the next window, if any, in the stack of interceptor windows. In this example there are no remaining interceptor windows, so the next step will be a confirmation that all items have been uploaded or transmitted to the intended targets. As the target's required information fields were not available in the default input interface, another conceivable variation is that such target-specific fields could be enabled in a Preferences menu as a new default. A more comprehensive option for satisfying this need is presented in the discussion of FIG. 5. It should be emphasized that when empty, metadata fields would simply be ignored when sending to a target that does not require them.

Whether each source and target association is actually sent at the moment of activation of the "Continue" button or link such as 84, assuming all requirements have been satisfied, or whether the transmission occurs simultaneously for all source-target associations only upon completion of the last in a group of interceptor windows, is not particularly relevant to the concept being presented and is left up to the engineering judgment of those skilled in the art.

In connection with this final step where transmission occurs is that, at this stage, it is quite conceivable within the bounds of the overall embodiment disclosure that a scheduled-transmission feature could be introduced. This would likely involve an intermediate window where the choice is made to send immediately or send at a specified date and time. Such a modification would be adding in functionality that is already characteristic of many "social media dashboard" or "platform" applications, but is an example of extending the overall concept for specific needs while retaining the core features of the embodiment.

Figure 17A:
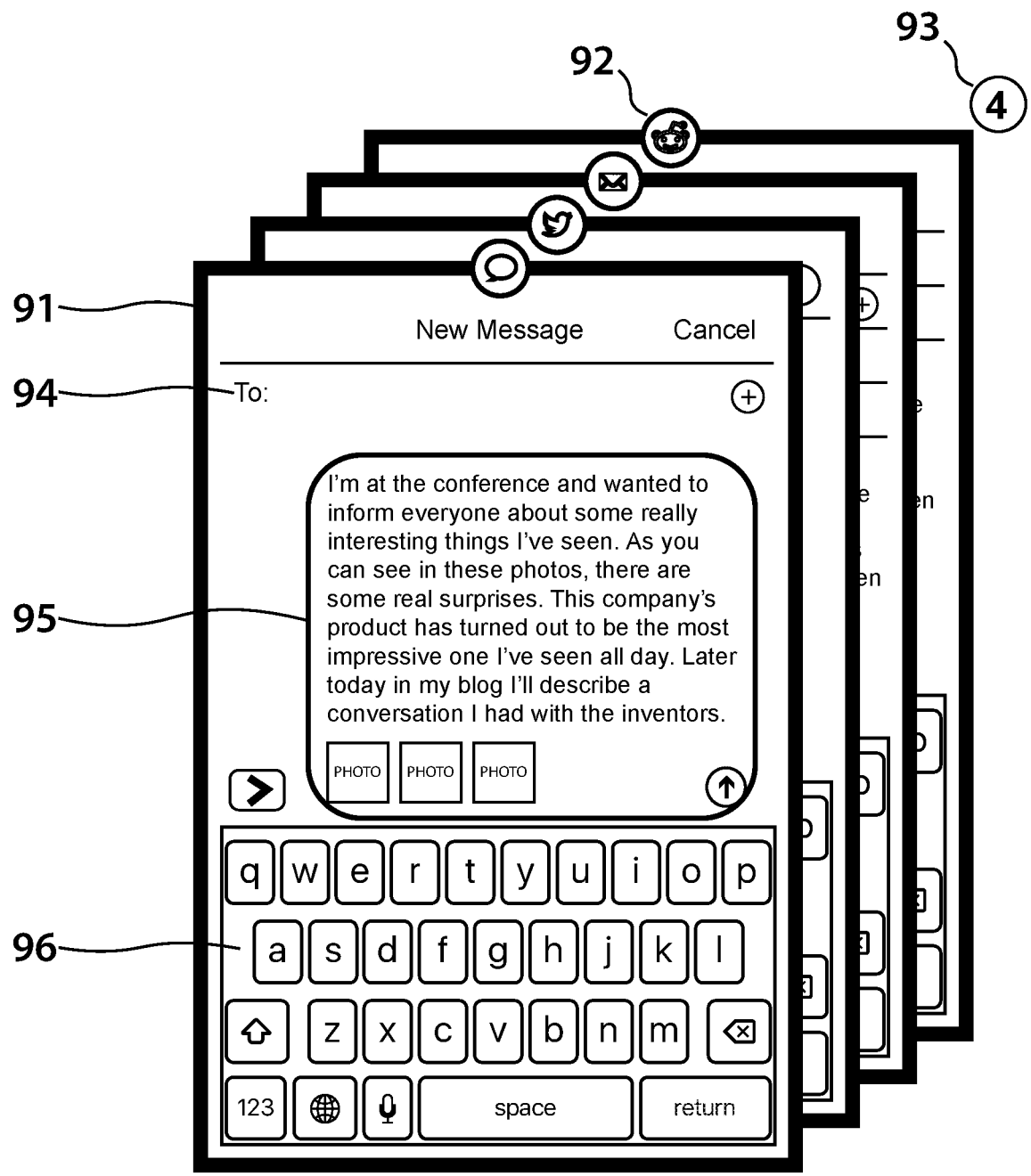
FIG. 17a presents one of multiple possible variations for how communication application windows could be displayed, after the applications have received input from the source content assembly interface, in a way that distinguishes them from other application windows that may also be opened on the device.
Figure 17B:
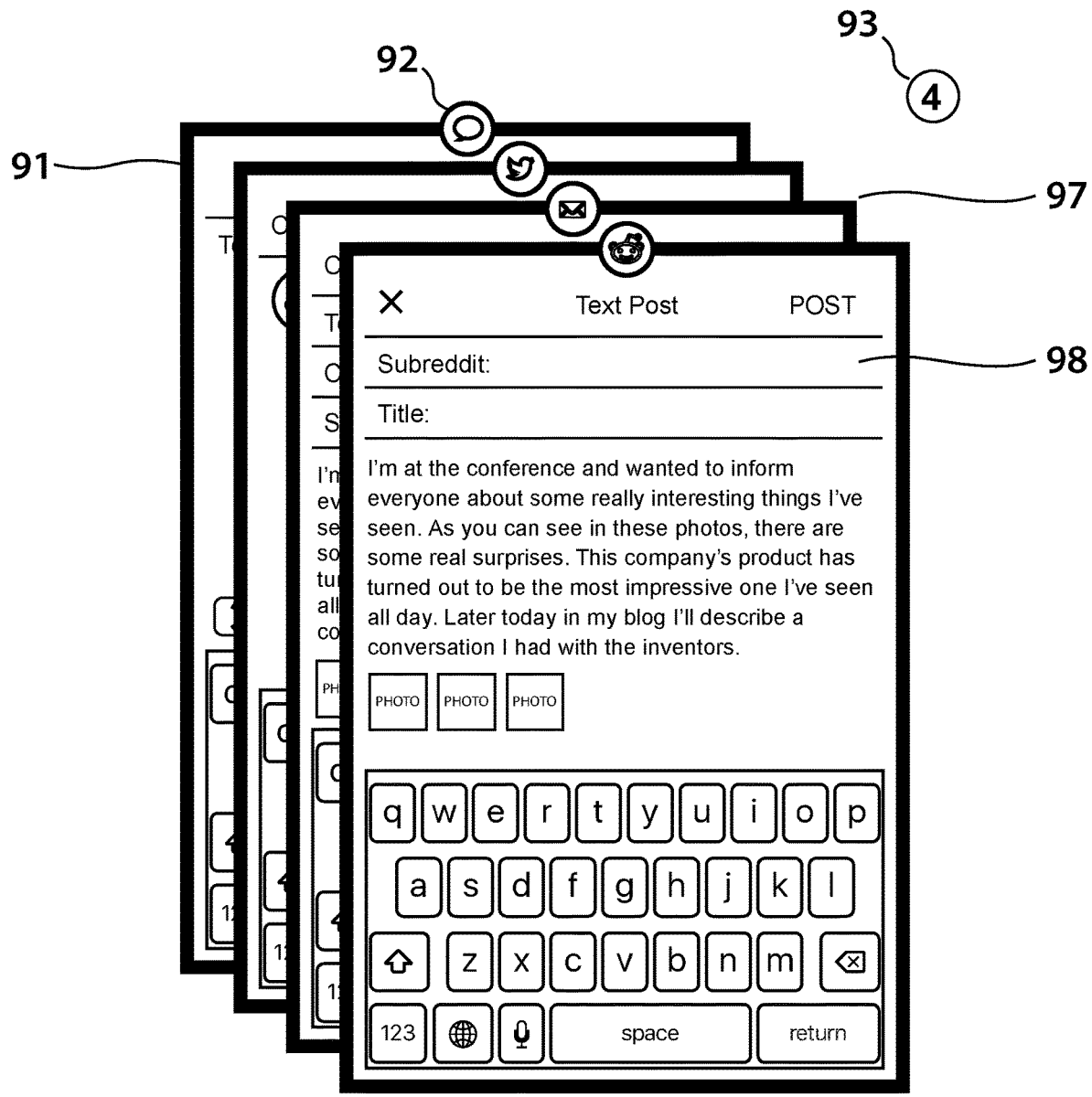
FIG. 17b presents the same application windows as in FIG. 17a, but in a reversed stacking order, suggesting they have been reviewed by successive selection thus bringing each one to the front in order of selection.
Figure 19:
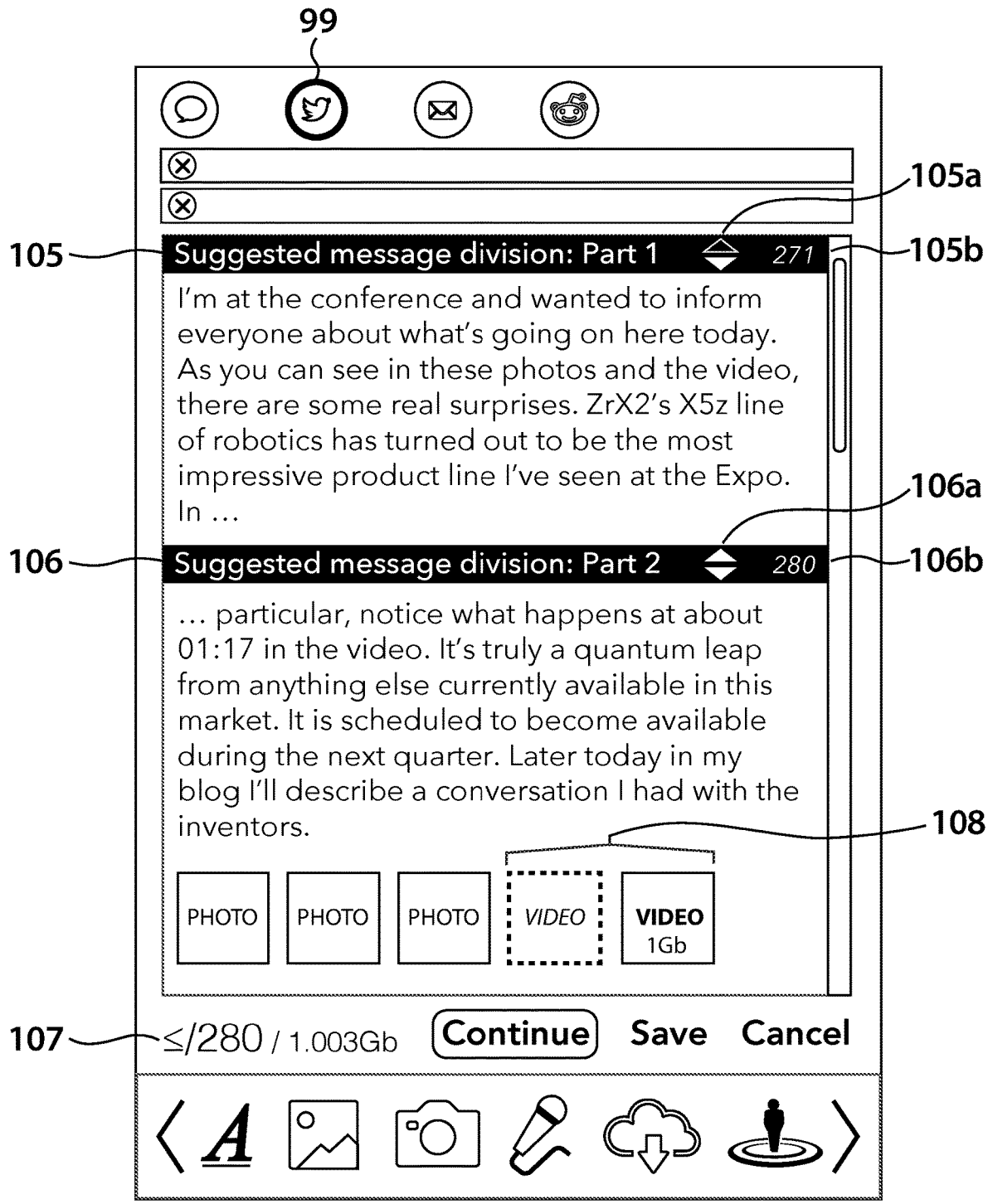
FIG. 19 depicts the system's suggested solutions to the over-limit content noted in FIG. 18. The message text has been divided into parts, each of which is within the target destination's limits. An attached file has been downsampled to a value within file size limits of the target destination.

FIG. 16 and continuing through FIG. 19, introduce features unique to this particular disclosure, which distinguish it from earlier versions of the invention. Depicted is an embodiment of a preference settings dialogue where options can be specified for how to handle content when it is not be compliant with destination-specific requirements or limitations of a target destination. The checkboxed option 85 bypasses any form of intervention in non-compliant content, and will result in the data from the source content assembly interface being input to appropriate fields of a communication application corresponding to a target destination, as represented in FIG. 17*a* and FIG. 17*b*. See those figures for the full explanation. The next option 86 is the entry point to various forms of automated or assisted intervention with non-compliant content. The various options below are suggested possibilities, but other embodiments could also be substituted. In actual implementation, the options may be a drop-down expansion displayed only upon selection of 86, but are shown fully here for ease of discussion. The options at 87 address text content exceeding allowable limits. They include allowing direct editing to bring text character and spaces count within limits; an option to automatically split the text into portions less than or equal to the limit value; an option to upload the entire content to a designated server, configured at 89; or option to make a case-by-case decision for each instance of such non-compliance. In the case of data such as image files exceeding allowable limits, or having an incompatible file type, options at 88 offer automatic downsampling and/or file type conversion to meet requirements; an option to upload the entire content to a designated server, configured at 89; or option to make a case-by-case decision for each instance of such non-compliance. The file downsampling and/or file type conversion option of 88 could conceivably involve another external service requiring linkage in a similar manner as in 89. An additional suggested option would be linkage of the designated server upload process with a URL shortening service, configured at 90.

FIG. 17*a* presents one of multiple possible variations for how communication application windows could be displayed as a result of activating option 85 in FIG. 16. It may also be configured as a "fall-back" default, if all other options fail to satisfy the destination-specific requirements for a particular set of content, before it can be transmitted without error. Instead of relying only upon the processes described for FIG. 3 through FIG. 15, the message data and any supplied addressing and categorizing data are input to the best-matched fields in the communications application corresponding to the chosen target destinations, immediately upon fully executing or launching the application. Then the successfully entered content is displayed in the manner native to that application, along with that application's particular way of bringing attention to what may be missing, or may be incompatible. Such issues can then be addressed case by case, followed by using that application's particular way to confirm a command to transmit.

A "stack" of 4 different application windows 91 is displayed, each with some form of identification such as a recognizable logo 92, to confirm the application. An optional numeral 93 confirms the total windows opened in this operation, if not otherwise obvious. Depending on the application, fields such as an addressee field 94, subject field or other required information fields are displayed. Depending on the behavior of particular applications, it may provide a visual prompt about input that is mandatory. The message body field 95 will again be particular to the application. An on-screen keypad 96 could be automatically displayed along with the application interface, or may appear upon activation of any text input field when entry or edit is initiated.

FIG. 17*b* presents the same application windows as in FIG. 17*a*, but in reversed stacking order 97, suggesting they have been reviewed by successive selection and thus bringing each one to the front in order of selection. The final application to respond to, for the service Reddit™, is now in front and requires two service-specific input fields 98 to be completed.

Discussion relevant to FIG. 17*a*-17*b*: Devices and their operating systems vary widely in how they treat the interface window displays for multiple applications that are launched and concurrently active. Some mobile devices including phones have a display mode which reveals all opened applications in some form of overlapping stack such as in FIG. 17*a*-17*b*, or as a linear series of windows that do not overlap. Other devices may not have a display mode revealing all opened applications. Essential to the implementation of this option in this disclosure is that the displayed application windows must be the default, native application windows, but also visually amended in some way to distinguish them from any other application windows already opened on the device. In the drawings, this is suggested by the superimposition of a bold outline around each window and by an icon at top center. In practice, the distinguishing characteristics may include use of color, possibly with a form of subtle looping animation to draw attention to those windows needing attention. The windows need to be perceived as the result of confirming the entered content in the content assembly interface as ready to transmit via the appropriate applications for each target destination. In the case of devices that do not have a display mode for simultaneously revealing all opened applications, a substitute form of display would be implemented so all relevant application interfaces could be easily identified. This could be an intermediate "review window" that keeps track of what application windows remain to be responded to. It should be noted that most uses of the disclosed interface system would not likely involve so many services and their applications as shown in these examples. When it is only one or two, the scenario is of course much simpler.

Figure 18:
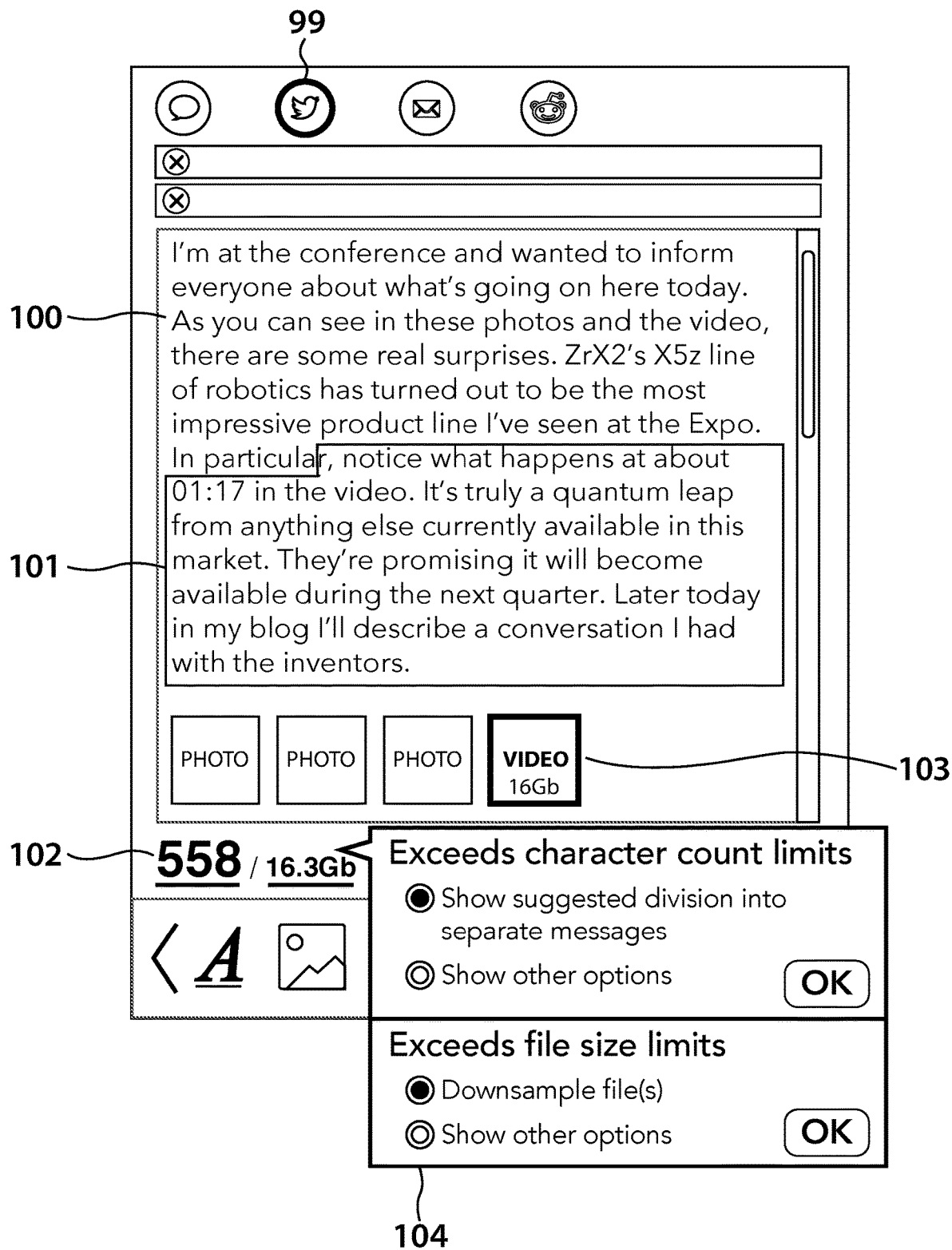
FIG. 18 depicts a variant of FIG. 13 in which two different types of non-compliant content have been identified; an over-limit text characters and spaces value, and attached files that exceed file size limits of the target destination.

FIG. 18 returns to the content assembly interface of FIG. 13, and depicts a variant thereof in which two different types of non-compliant content have been identified; an over-limit text characters and spaces value, and attached files that exceed file size limits of the target destination. The destination configuration icon 99 indicates the chosen target destination is Twitter™, but for this example it should be thought of generically as a service having both a text content limit and an attached file size limit. The text content 100 is longer in characters and spaces than the allowable maximum, as notified about in a form of highlighting 101 and as reported in statistics at 102. The message has 4 image media files attached, but one is a video file 103 and is highlighted as non-compliant due to excessive file size, with the actual size value optionally displayed. The file size issue is also warned about in statistics at 102. A pop-up prompting window 104 clarifies what items are non-compliant, and provides options for how to respond to them. The option chosen for the over-limit text is to divide into separate messages; for the over-limit attached file, it is to downsample the file to an acceptable size. The results of those actions are seen in FIG. 19.

FIG. 19 depicts the system's suggested solutions to the over-limit content noted in FIG. 18. The message text has been divided into parts, each of which is within the target destination's limits. The first part 105 of the divided message, labeled "Part 1," displays its character count of '271' at 105*b*. At 106 is "Part 2" of the divided message, displaying a character count of '280' at 106*b*. When displayed in this state, either part of the message could be manually edited. A suggested optional feature allows movement of words from one part to another by activating up and down arrows 105*a* for the first part, and 106*b* for the second part. At 105*a* there is only a down arrow available, since it is the message beginning. Since the character count for "Part 2" is already at the allowable maximum, moving words down from "Part 1," or activating the down arrow at 106*a* would generate a "Part 3."

Message statistics 107 indicate that no part of the divided message set exceeds the allowable limit of 280 characters and spaces. An attached file 108 has been downsampled to a value within file size limits of the target destination. The original file attachment is displayed with a dotted line boundary, suggesting it has been replaced; adjacent is the new smaller file with an indication of file size.

Figure 20:
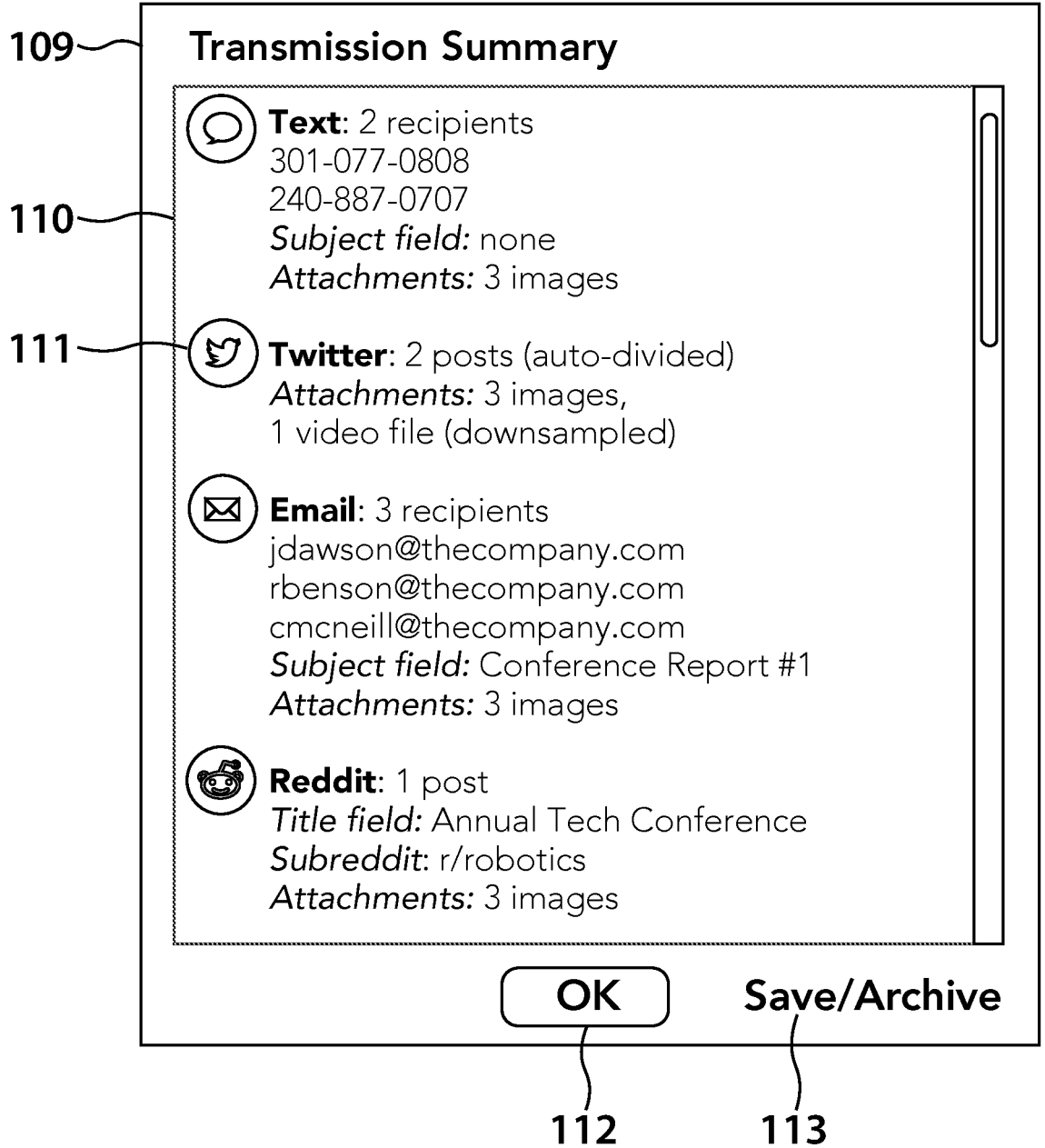
FIG. 20 depicts a message screen that appears after successful transmission of all source and target combinations, summarizing the result of each action.

FIG. 20 depicts an optional results report in an overlay window 109, in which a list 110 identifies all targets executed with a summary of information about each. The report is entitled "Transmission Summary" but may be titled variously as "Upload Summary," "Results Report," or any other title which adequately communicates the intention. The specific information shown in 109 is only a suggestion of possibly useful information and not a limitation on what information can feasibly be reported. In 111, relating it to the example described in FIG. 19, the report indicates that a message was divided into two separate messages or posts and included attachments of three image files and one video file that was downsampled. The summary could conceivably also report any source-target associations that were saved as drafts or canceled, this option being one of many that might be determined in a user preferences menu. Once the summary has been reviewed, the window may be dismissed with an "OK" button or link 112. A "Save/Archive" button or link 113 would allow the summary to be saved into a log, or to be sent to an email address. The "Save/Archive" function would have its own dialogue window, and upon completion of that process the Summary window would be dismissed with the "OK" button or link 112. With this window closed, the underlying main interface as shown in FIG. 1 would again be available.

Figure 21:
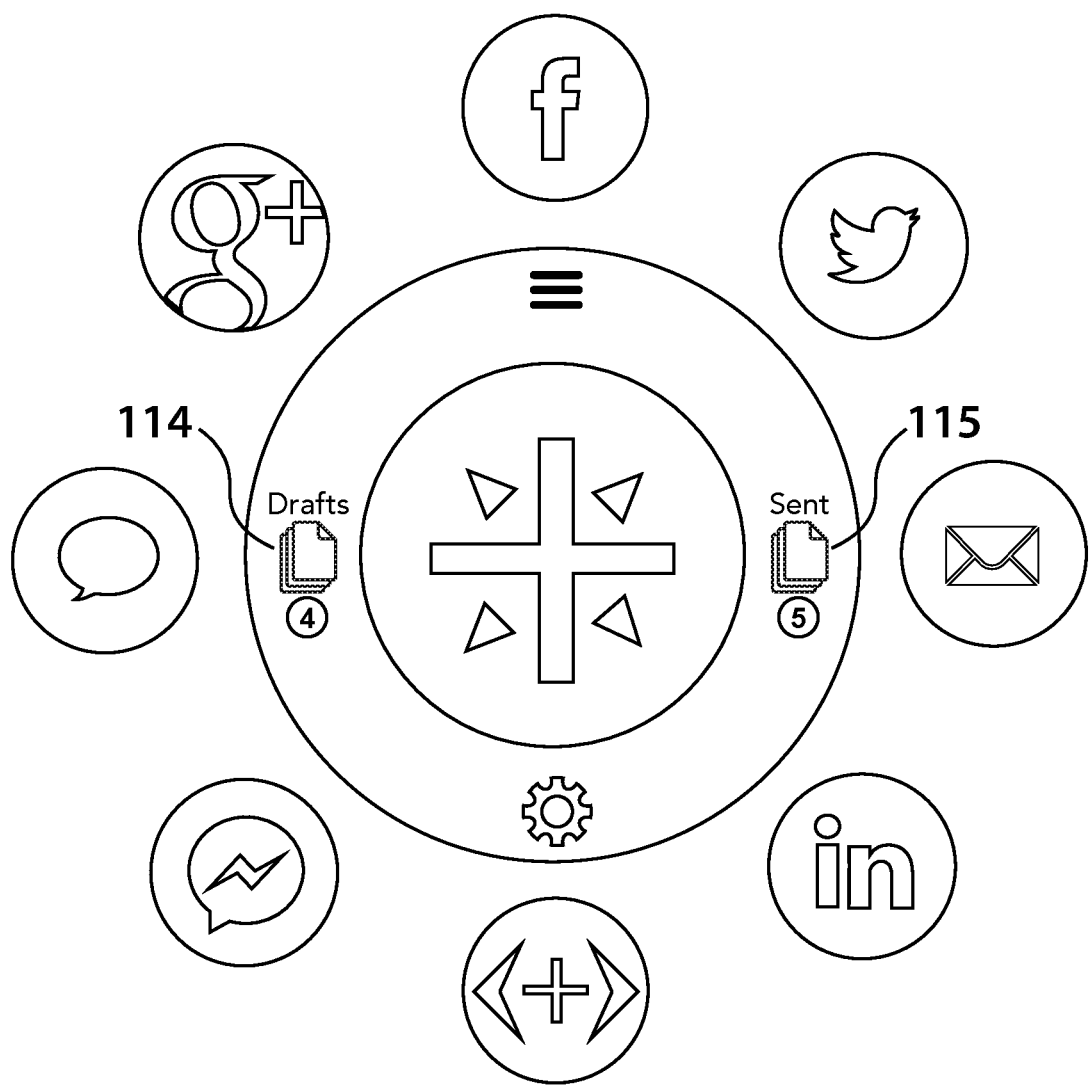
FIG. 21 depicts an option for displaying saved drafts of messages and successfully sent messages, representing all that were optionally saved, and offering the option to retrieve and view them. Drafts may be further edited for immediate or later transmission.

FIG. 21 depicts how "Drafts" and "Sent" features, as mentioned originally in the description of FIG. 3 and subsequently in descriptions for FIG. 12 through FIG. 15, might be displayed in the interface. In this embodiment, the "Drafts" display 114 and "Sent" display 115 include an encircled number indicating the number of items currently in each category. In this example, there are four "Drafts" items saved and five "Sent" items saved. A "drafts" and "sent" option may not be relevant in the case of option 85 of FIG. 16 (no intervention in message content compliance), because the independent applications, not this system, would have control over the message from that point forward.

Figure 22:
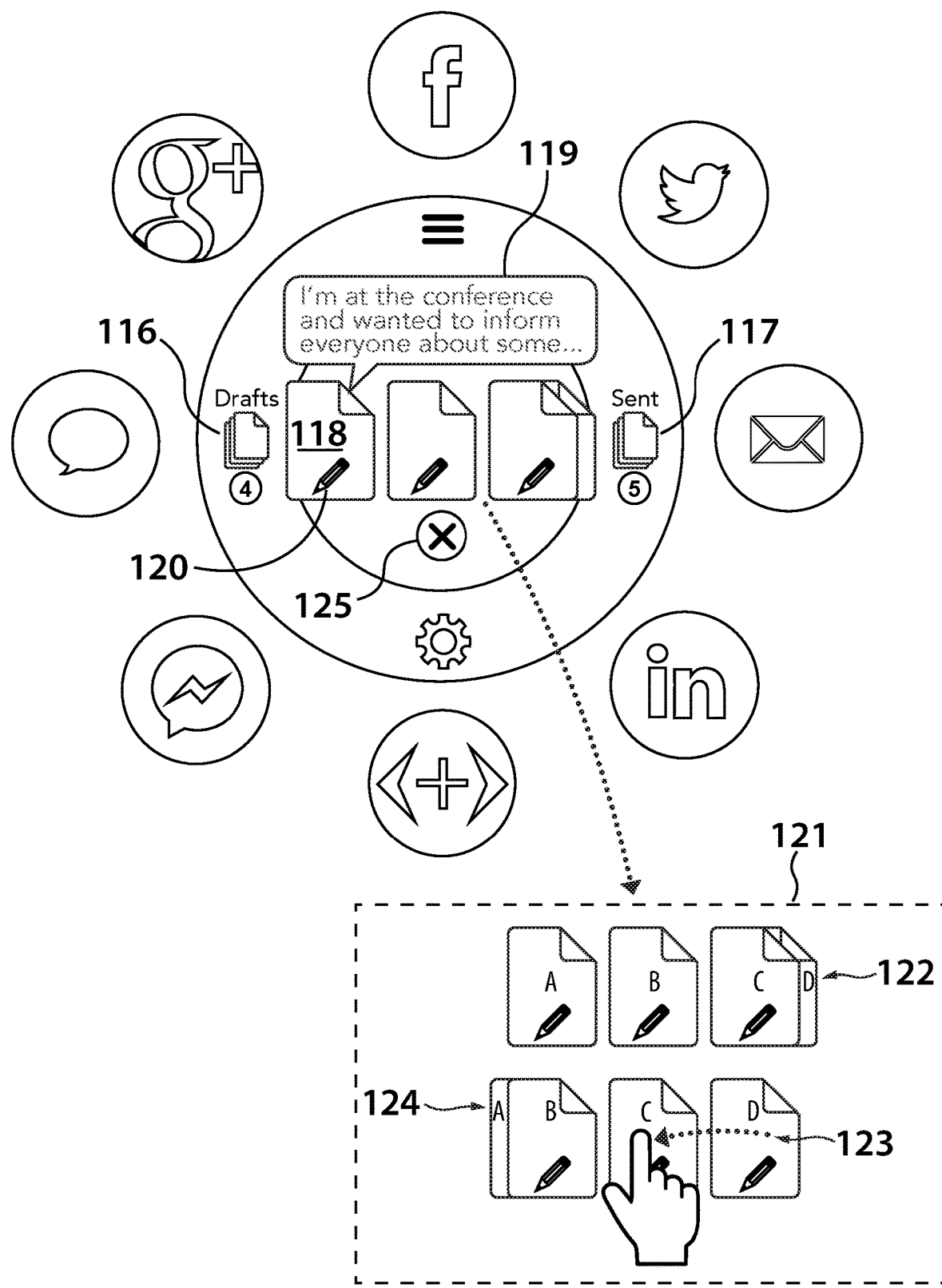
FIG. 22 depicts a group of message drafts that have been expanded, providing a display option for previewing a small sample of the content within. Individual drafts can be opened for further editing. Likewise the representation of sent messages can be similarly expanded and reviewed, but not edited as with unsent source content drafts.

FIG. 22 further elaborates on how the "Drafts" feature 114 and "Sent" feature 115 can be used. In this example the "Drafts" button or link 116 has been activated, resulting in an expanded display of icons 118 representing each item in this group. The expanded display could take a variety of forms and this one is presented as a suggestion. Another option is presented in FIG. 23. Regardless of layout, such a feature should have a way to preview information about each item in order to identify the message content, such as the temporary pop-up message 119 which displays the opening lines of the message. Furthermore it should have a link to open the message in order to make changes or verify all content. The pencil icon 120 is a common and established symbol indicating an option to edit. Activation of such an edit link would open the same content-creation interface as described in detail for FIG. 3 and FIG. 4. An expanded-detail inset 121 depicts how the expanded display of Drafts or Sent items could be manipulated for selected display. Within a group of icons 122 a limited number of icons can be displayed while others remained stacked, and a swiping action 123 allows access to additional icons; ones previously revealed then create a new stack 124 on the opposite side. The icon button 125 with an encircled "X" provides an option to cancel or close the current display of Drafts. An expanded display of items in the "Sent" stack 117 would work in a similar way; excepting that "Sent" items would not provide an option to edit.

Figure 23:
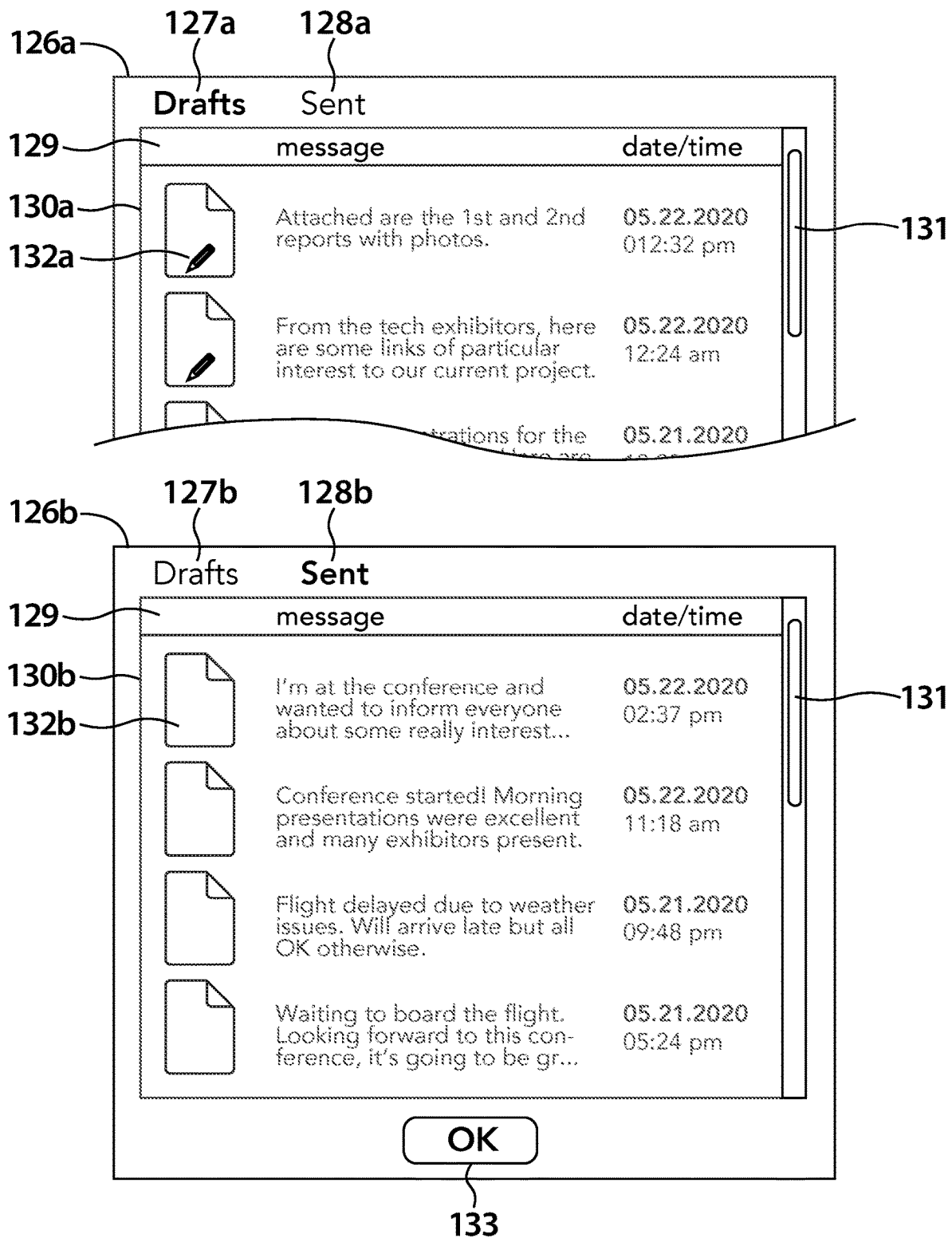
FIG. 23 shows an alternate method of displaying drafts and sent messages in an overlay window, providing a preview of message content, a time stamp for creation or last modification, and the option to open the full contents as described for FIG. 18.

FIG. 23 depicts an alternate method for how the "Drafts" feature 116 and "Sent" feature 117 of FIG. 22 could be implemented. Upon activation of the "Drafts" icon or button 116, a window 126*a* is opened, overlaying the main interface displaying links 116 and 117. The window provides access to both the list of Drafts and list of Sent items. In instance 126*a*, the Drafts icon or button 116 of FIG. 22 has been activated; hence the word "Drafts" at 127*a* is highlighted or otherwise distinguished from the adjacent word "Sent" at 128*a*. The labels 127*a* and 128*a* act as buttons, allowing display of either set of items while the window 126*a* is open. Column headings in area 129 identify the contents in list area 130*a* and provide an icon representing each item, a brief preview of message content, and a time stamp for the message's last modification. In cursor-control devices, list area 130*a* may display a vertical scrolling option 131 if the number of items exceeds available window depth; this would likely be omitted for touch-screen devices. In the "Drafts" list, icons representing each draft item can be activated to display the item in the original input window as shown in FIG. 3 and FIG. 4, thus allowing it to be edited further and then either transmitted or saved again. In instance 126*b* the "Sent" mode 128*b* has been activated, thus displaying only successfully sent items in list area 130*b* and displaying an icon 132*b* representing each sent item, along with a sample of contents and a time stamp which represents the time of transmission. As follows logically, items in the "Sent" list cannot be edited as in the "Drafts" list. To confirm that review of Drafts or Sent items is complete, an "OK" button 133 dismisses the window and the underlying main interface as shown in FIG. 21 is again available. When an item is sent to a service where it is a normal function to save copies of sent messages—notably in standard email—the email client app could still be saving such messages in its normal format, despite operating in coordination with the invention presented here. A user preferences setting could determine the limit for saving Sent items, either by a threshold of total number or by date in the time stamp.

Figure 24:
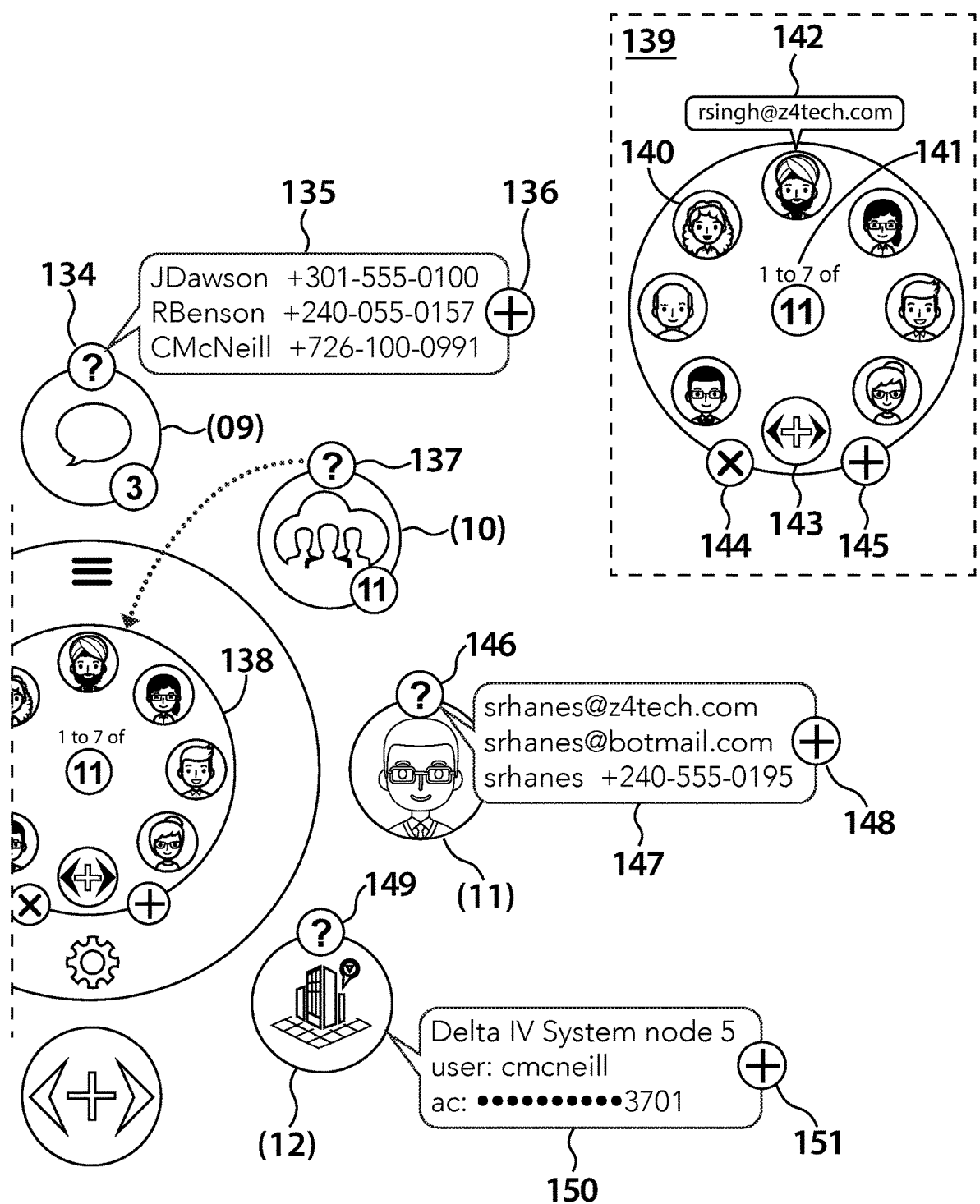
FIG. 24 provides details of three types of customized targets for multiple recipients and/or multiple means of contact, a customized target for a proprietary database, and different means for viewing and editing the details of each.
Figure 25B:
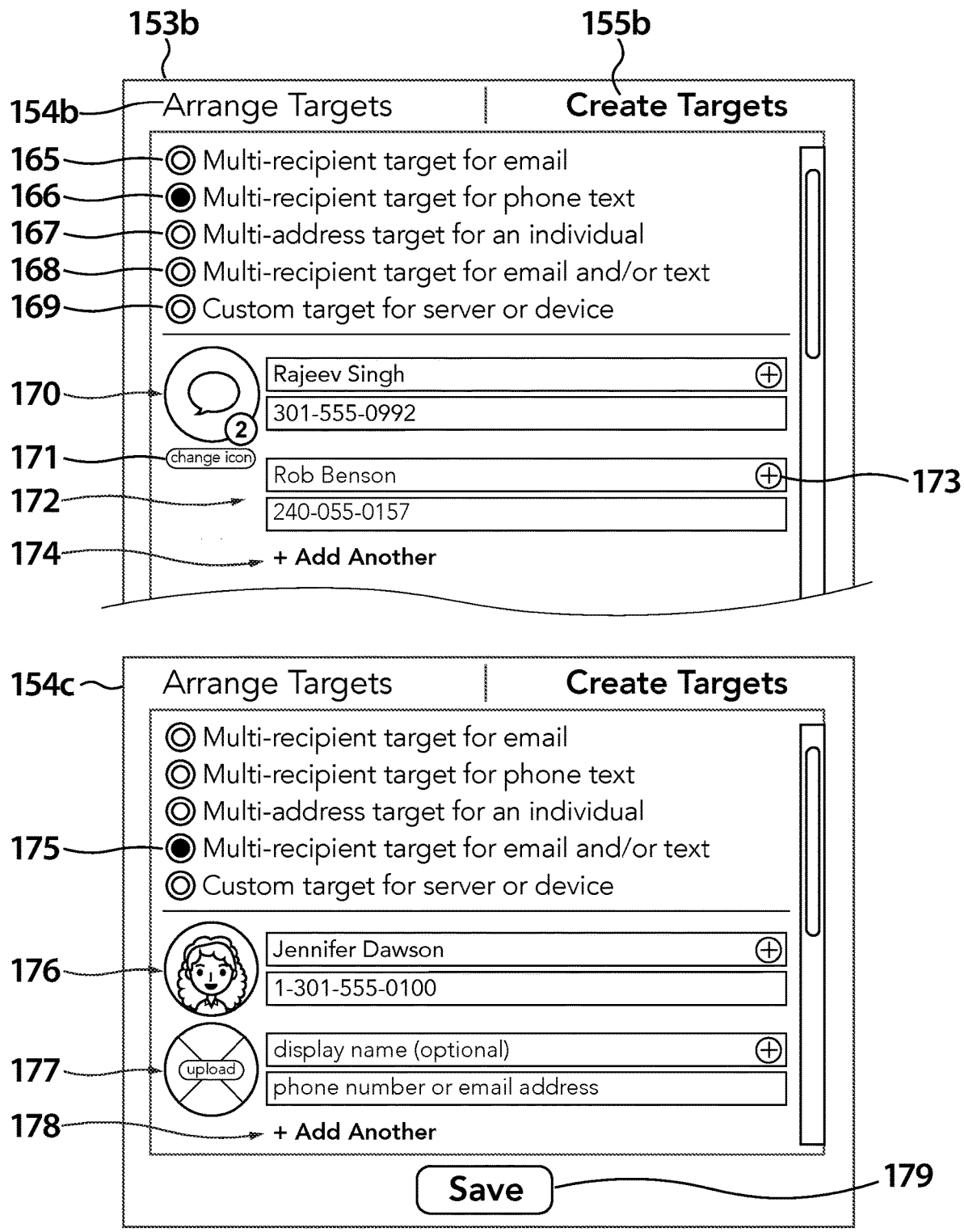

FIG. 24 provides expanded detail about the functioning of custom targets 09, 10, 11, and 12 in FIG. 2*b*, those figure details and labels being repeated in the current figure. The general concept for target icons 09, 10, and 11 is that a source item, when associated with one of such custom targets, will upon execution be transmitted to either multiple recipients or to multiple contact points for the same recipient, and is most relevant for groups of frequently contacted recipients. The concept is similar to the use of "contact groups" in traditional email applications, but accessed differently and with additional enhancements. Target icon 12 has a different type of customization as described below. Such custom targets would be created from a configuration menu feature within a main menu such as 03 in FIG. 1, and a detailed set of methods is shown and described in FIG. 25*b*.

At 09 is a text message target pre-configured for multiple recipients, having a button or link such as 134 which when activated will provide details of the target's address content as in 135; those contents can be edited by activation of a button or link such as 136.

The multi-recipient target 10 offers the option for all recipients in the group to be contacted by different types of addressing information, for example some with text messaging and others with email addresses. As with 09, the icon displays a button or link such as 137 which when activated will provide details of the target's content. The embodiment presented here suggests the expanded display could be positioned over the central circular area of the main interface as in 138. To enhance clarity with additional details, an expanded view is also shown as a boxed inset at 139. In the circular area is displayed graphic identification of recipients such as an avatar image 140 with adjacent images arranged in a semicircle. The identifying image might alternatively be a photo within the circular icon, or brief text such as initials representing the recipient. With some email and messaging services, a photo or other image associated with the recipient is a common feature and may be downloaded to this interface when the recipient is added to an address book. Within this display is a numeral confirming the number of recipients in the group and how many are displayed, such as the '1 to 7 of 11' at 141. A link is provided for previewing the contact information for each displayed member of the group, such as shown at 142. If the total number of recipients in the group is large and cannot be fully displayed as in this case, a button is provided for scrolling or paging to currently hidden members of the larger group, such as the button at 143. Note that this structure and function parallels that of the main interface's methods for displaying greater numbers of targets, therefore is logically consistent with it, serving as an aid to user recognition and understanding. As with the main interface display of target icons, this sub-display of specific recipients in a group could conceivably provide the option to target only a subset of the group by successively activating those recipients' icons while the sub-display 138 is open. However, the granularity of selection accuracy on smaller device screens may limit this option; displaying 138 at a larger relative size in such cases may circumvent that limitation. For example it could expand to temporarily cover the entire central area of the main interface, but would be dismissed upon completion of making selections within the group. Closing the expanded display is accomplished with a button or link such as 144. Finally, a link is provided for displaying and optionally editing the full details of the group such as the button or link 145. This would likely open a window with contents in a list format.

The third previously introduced example of a custom target is 11, a target configured for a single recipient but containing multiple contact addresses. The icon shown here uses an avatar image but alternatively could display a photo within the circular icon, or a text identification of the recipient. Activation of a button or link 146 displays the contents 147, and provides a link to display and edit contact information, such as button or link 148.

The fourth and final previously introduced example of a custom target is 12, representing a custom database or gateway to which reports and/or data could be transmitted. When activated, a button or link 149 displays identifying information 150 about the custom target, and provides a button or link 151 for viewing and editing details, or for configuring a new target of similar type. Configuration of such targets may include an IP address and server name, user ID, password or other access credentials. Such a custom target might also be configured to send data to a specific device, for example transfer by wireless connectivity to a device within functional range. It is also conceivable that this custom target type could be configured, as similar to target 10 discussed above, into groups of component sub-targets with differing specific details.

FIG. 25a and FIG. 25b show embodiments of possible configuration menus for managing target icons in the graphical user interface, including for how custom targets 09, 10, 11, and 12, most recently shown in FIG. 24, could be configured and managed. The depicted menus suggest means for adding target icons to the interface, rearranging icons within the interface, and configuring new types of custom target icons. The embodiments described here are suggestions only, and multiple embodiments are conceivable that would address the features and functions suggested here as desirable in the overall context of the invention. They are also not an exhaustive presentation of all possibly useful functions envisioned. The relative proportions and positions of elements have been adjusted to work better in these drawings for better clarity in identifying elements. An actual implementation would take into account the screen area of the device and other factors.

FIG. 25a shows a representation of the main interface 152 being used to demonstrate the first function, that of adding target icons to the interface and managing their display order. From either a Preferences or a Settings menu link in the main interface, a dual-purpose menu window 153a is displayed. The dual purposes of this menu are 154a "Arrange Targets," which is active by default and shown as selected, or 155a "Create Targets," which will be further shown in FIG. 25b. Below the described dual function links are rows and columns of target icons determined by the system to be of a compatible type for the interface, meaning they represent destinations to which data can be transmitted. Most of the icons represent installed applications, but a few are special instances that were created using the menu of FIG. 25a. In the first row 156, the left to right linear order of the icons matches the clockwise circular order of icons in the main interface. The activation of radio buttons such as 157 determine which target icons are displayed in the main interface. The icons with the checked radio buttons, including all in the top row plus one more in the second row, constitute the full set of icons currently displayed in this sample of the main interface. If the radio button of an additional unselected icon such as 158 is selected, that target icon will be moved to the next group or "page" of targets, for example as shown and described for FIG. 2b, because there is no additional space available in this group. Ideally the selection of an icon's radio button would immediately result in a duplicate of the icon being displayed in the main interface, and the selected icons would automatically sort in the "Arrange Targets" list array so as to maintain the correspondence of that linear order with clockwise circular order in the interface. Additionally there are two other means depicted whereby the order of target icons could be changed. An icon such as 159 when activated by touch contact on a touchscreen device, or alternatively by mouse-click on a cursor-controlled device, could display a pair of directional arrows such as the right-side arrow 160, thus indicating that the icon can be dragged to a new position which would result in changing the circular array order in the main interface. As a second method for adjusting the order, an icon such as 161 could be moved by drag-and-drop action 162 directly to the circular array of the interface, and if the moving icon 163 were brought within a predetermined critical distance, it would snap into one of the predetermined positions. In the particular case shown the circular array is already full, so the result would be for moved icon 163 to displace the last icon in the clockwise order of the array. The displaced icon would then shift to the next group or "page." An "OK" button 164 confirms and saves any changes made in target icon placement and sequence order.

In FIG. 25b the same menu window of FIG. 25a is shown as 153b, as it is now in a different mode where "Arrange Targets" 154b is deselected and "Create Targets" 155b is selected. As a result of the change of mode, the window displays completely different contents. A series of buttons are presented for choosing which type of custom target is to be created. The options include: 165, multi-recipient target for email; 166, multi-recipient target for phone text, corresponding to 09 of FIG. 24; 167, multi-address target for an individual, for example two email addresses and a phone number for a single individual, corresponding to 11 of FIG. 24; 168, multi-recipient target for email and/or text, corresponding to 10 of FIG. 24; and 169, custom target for server or device, corresponding to 12 of FIG. 24. In this example, "Multi-recipient target for phone text" 166 is selected. As a result of this selection, the fields displayed below are specific to configuration of this particular target type. A text message icon 170 is displayed, including a numeral indicating the current number of separate persons being addressed. A "change icon" button 171 allows upload of a custom substitution for the default text message icon. A second person's contact information 172 shows an address book lookup feature 173 that could aid in the creation of such groups. An "Add Another" link 174 allows more sets of contact information to be added to this group.

Another instance of the "Create Targets" menu is shown at 154c, wherein a group is being configured that corresponds with target 10 of FIG. 24. The "Multi-recipient target for email and/or text" option 175 is selected, resulting in display of appropriate entry fields below. One recipient 176 has been added as a phone number contact for text messaging, and a second recipient 177 awaits entry of information. In this case of this target type, each recipient can optionally have an associated photo image or avatar image, thus a button for the upload of an image is provided. Alternatively, the system may extract from address book information any existing image associated with the account. As a final alternative, the system could substitute a generic profile image. An "Add Another" link 178 is provided for adding the group, and a "Save" button 179 finalizes the process of creating the new target and would be required as a separate operation for each target creation.

Not shown in this embodiment of a custom target creation feature is an option for creating separate, special-purpose instances of existing targets associated with posting accounts; for example, a separate target for a social media account representing either a separate user identity, or to go to a subsection within the account rather than to the default posting destination for the account. Implementing such a feature could begin with choosing one of the targets as shown in window 153a of FIG. 25a, then choosing an option "Create custom instance." The process would then transfer to the Create Target menu examples of FIG. 25b, where fields for account access credentials and any relevant path information would be completed. Also not shown in this embodiment is an option for applying a display name to the custom icon; however this would be a relatively simple addition to include. As mentioned in the discussion of FIG. 01, the display of target names in the interface could be controlled in a Preferences or Settings menu. A note regarding the suggested address book lookup feature 173: Since address book entries may in some cases have multiple email addresses and phone numbers, an intermediate dialogue window may be required in order to choose which item is to be used in the target group.

Figure 26:
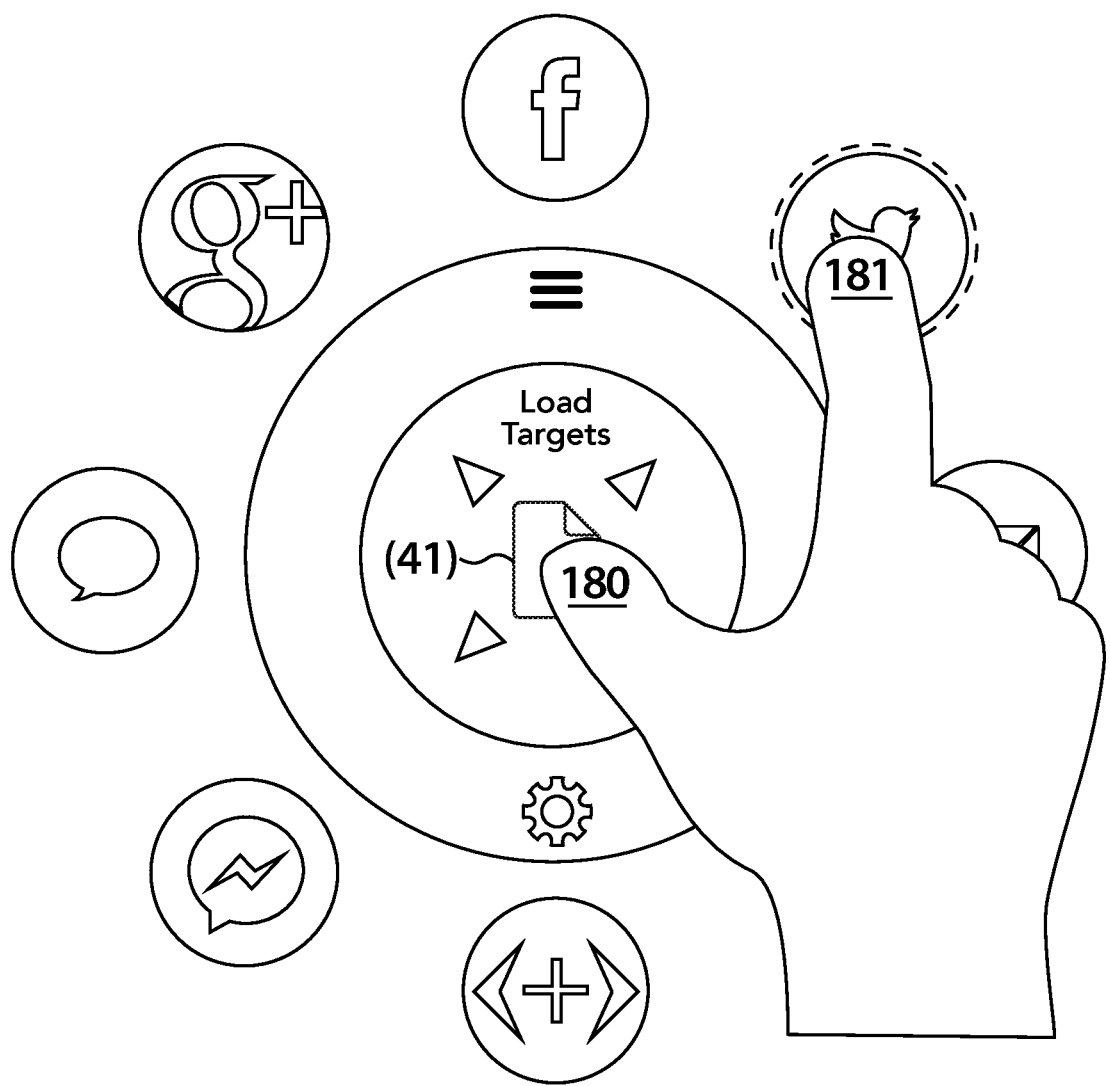
FIG. 26 depicts an alternate means of making associations of source and target, relevant for some touchscreen devices.

FIG. 26 expands upon the functions presented in FIG. 7 by depicting an alternate means of making associations between source item and targets. This method is only relevant to touchscreen devices. The source item 41 is activated for loading of targets by touching and holding the thumb 180 on the source icon; meanwhile or simultaneously, the forefinger 181 is touched and held on one of the targets for a short duration needed to confirm display of the graphic representation that it has been loaded. Using this method, any two fingers could be used, as would be understood by those skilled in the art and as consistent with established touchscreen functions, particularly on mobile devices. The criterion is only the simultaneous contact of two areas of the screen that coincide with locations of relevant icons. To add other targets, the process is repeated with the second finger 181 contacting other target icons while the first finger 180 remains in contact with the source item icon.

Figure 27:
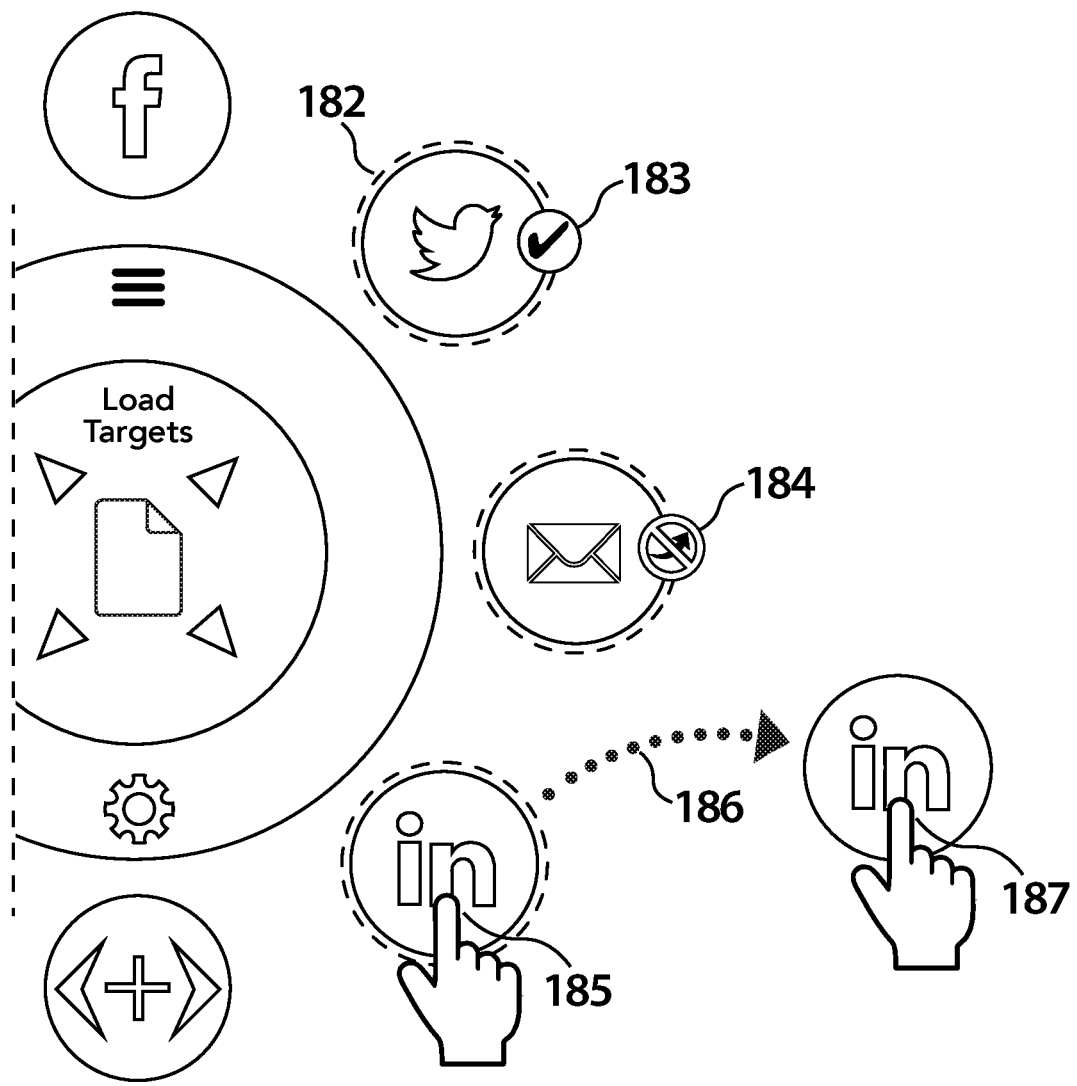
FIG. 27 depicts variations in how target icons could display a state of having been loaded, meaning an association with source content has occurred, and also suggesting means by which the association can be canceled.

FIG. 27 depicts several variations for how targets can be displayed as loaded, and closely associated with them are means by which the state of loaded can be canceled. The original suggested means for displaying a target as loaded was a form of highlight such as 182, represented here by a dashed circular border implying a color area expanding beyond the circumference of the target icon, or may be some other form of color change within the icon. Alternatively or additionally, a button or link such as 183 could also provide a button or link to cancel the state of being loaded, as well as confirming its stated of being loaded, by activating it as a button.

Another such button is suggested at 184, using a symbol implying the cancellation of upload. A possible usage of this concept would be as a hover state of icon button 184 in the case of cursor-control devices, meaning a cursor is positioned over it but there is no mouse click or its equivalent. The last demonstration is a method of canceling a target by touching and holding on the target icon 185, executing a swiping motion 186 to temporarily move the icon to a position 187 that is well outside its normal position, observing the disappearance of the "loaded" graphic indication (which may be any one of the means suggested above), then releasing the touch contact at which point the icon automatically returns to its original position as if attached by a spring. Upon return to the original position the condition of being loaded, regardless of how that was graphically displayed, has been canceled and the icon appears in its default state. As mention in the FIG. 8 description, the idea of icons being movable but being able to return to a default position in this suggested "spring-loaded" fashion is well established in the field of graphical user interfaces.

FIG. 28 depicts variations in layout of the basic components of the interface concept of this invention. These variations, although appearing somewhat different from the original embodiment, are nevertheless consistent with the concept and claims. It is not a comprehensive presentation of all possible variations that would still be consistent with the concept and claims. Presented are a semicircular array 188, positioned to one side of a device display and possibly advantageous for preserving screen area; an alternative ring-shaped layout 189 in which the targets are arranged in a square or rectangular shape; and a horizontal, single row layout 190 with a scrolling row of target icons, the scrolling accomplished by a left and right side buttons like 191, or else by a swiping action on some touchscreen devices. Further extending the idea of variations on the presented embodiment is that target icons need not be in the circular form shown and could alternately have a square shape.

Figure 29:
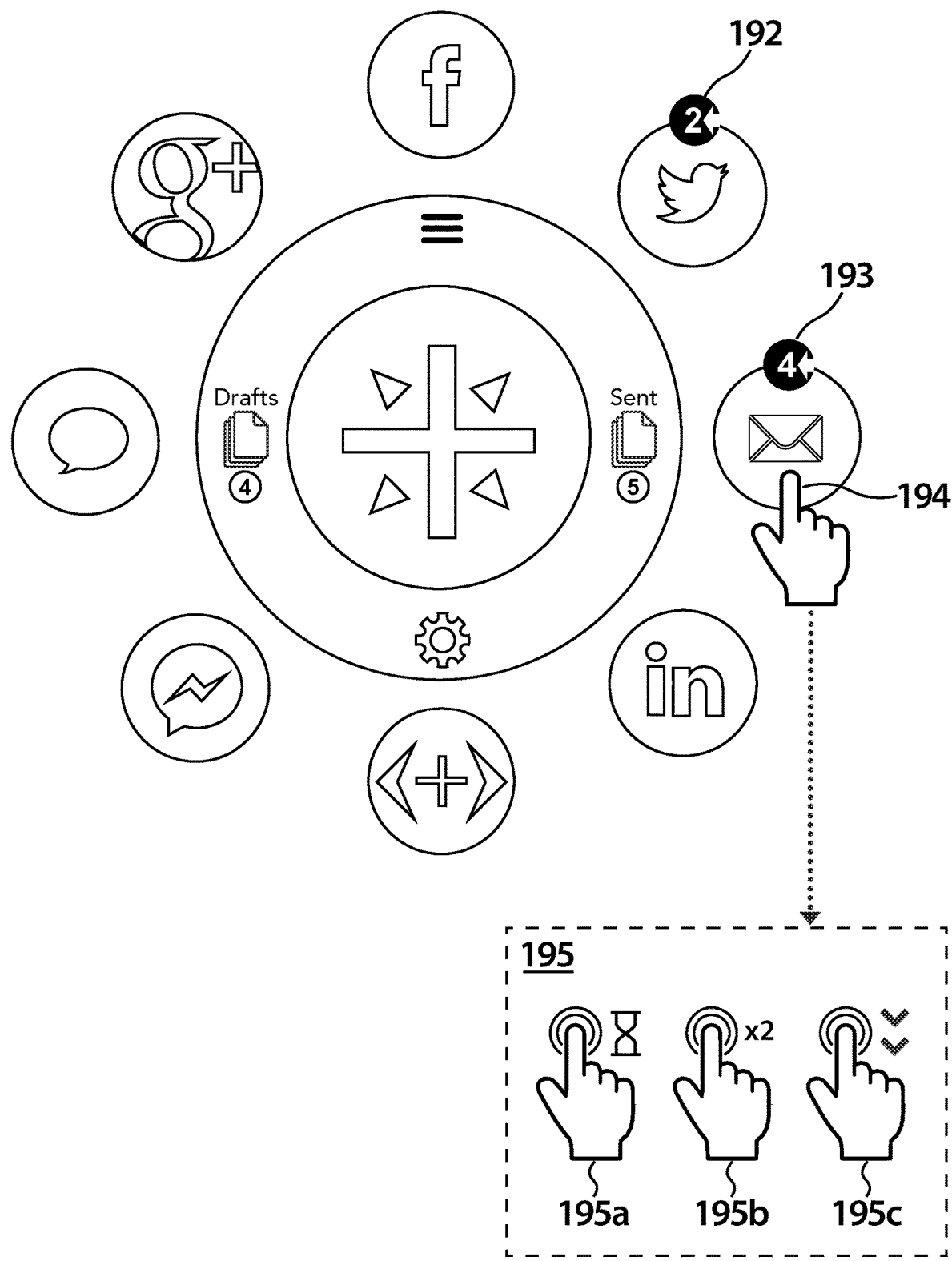
FIG. 29 depicts possible display options by which communications applications used as targets could report activity in response to recent transmissions made from the interface, and how the target icons in the interface could be used to launch the main application that handled the source upload.

FIG. 29 depicts suggestions for displaying post-transmission results of inter-application communication between targets in the interface and the applications that provide their functioning. For example, an email message is sent and a response is received; the user would ideally be informed of this without having to separately check the account. Also suggested are concepts for the use of target icons as an alternative launcher to open the applications that provide those functions. Thus the interface can serve as an alternative "desktop" or "dock" for launching frequently used applications, in addition to other default displays such as the rows and columns grid arrangement common on mobile devices.

Some background discussion: The invention's interface and method are primarily intended for posting of new content to at least one, or a plurality of targets. By their nature of common usage, with some target destinations (notably, text messaging, email and chat applications) there is a user expectation that posting may initiate a quick response and may call for engagement in an interactive session which preferably takes place in that dedicated application environment. Therefore the interface should provide two features to accommodate those factors: (a) a display of responses received from the most recent upload of source content to particular target destinations; and (b) capability to launch the associated application, if there is an intention to engage in an interactive session of two-way communication in that environment.

Returning to FIG. 29: An icon displaying a numeral "2" at 192 is indicating that since the most recent upload of source content to the adjacent target, there have been two direct responses or reactions recorded in the associated account. Similarly, an icon displaying numeral "4" at 193 indicates four responses to an email message sent in the most recent upload of source content. For demonstration purposes it will be assumed there is an intention to go directly to the email application to read responses and possibly to send additional related messages. Therefore a button or link should be available for directly launching the email application from this interface. Linking of components of this interface with other applications accessible from the device will be understood as a form of inter-application communication by those skilled in the art, accomplished by implementation of APIs. Assuming that such linking exists, there are multiple conceivable means for using the target icon as a button or link for launching the application, while avoiding conflict with other activation functions that are specific to the invention presented herein. For cursor-control devices it may be an alternate type of click such as right-clicking of a mouse button, or a mouse click combined with a modifier key. For touchscreen devices, some possible and currently established means are shown for a touch action 194 in the extended detail 195 and could include 195*a*, touching and holding for a specified brief time; 195*b*, tapping twice in quick succession; or 195*c*, utilizing the "force touch" or "3D touch" capability of some touchscreen devices, notably mobile devices, that can respond to varying degrees of touch pressure.

Figure 30:
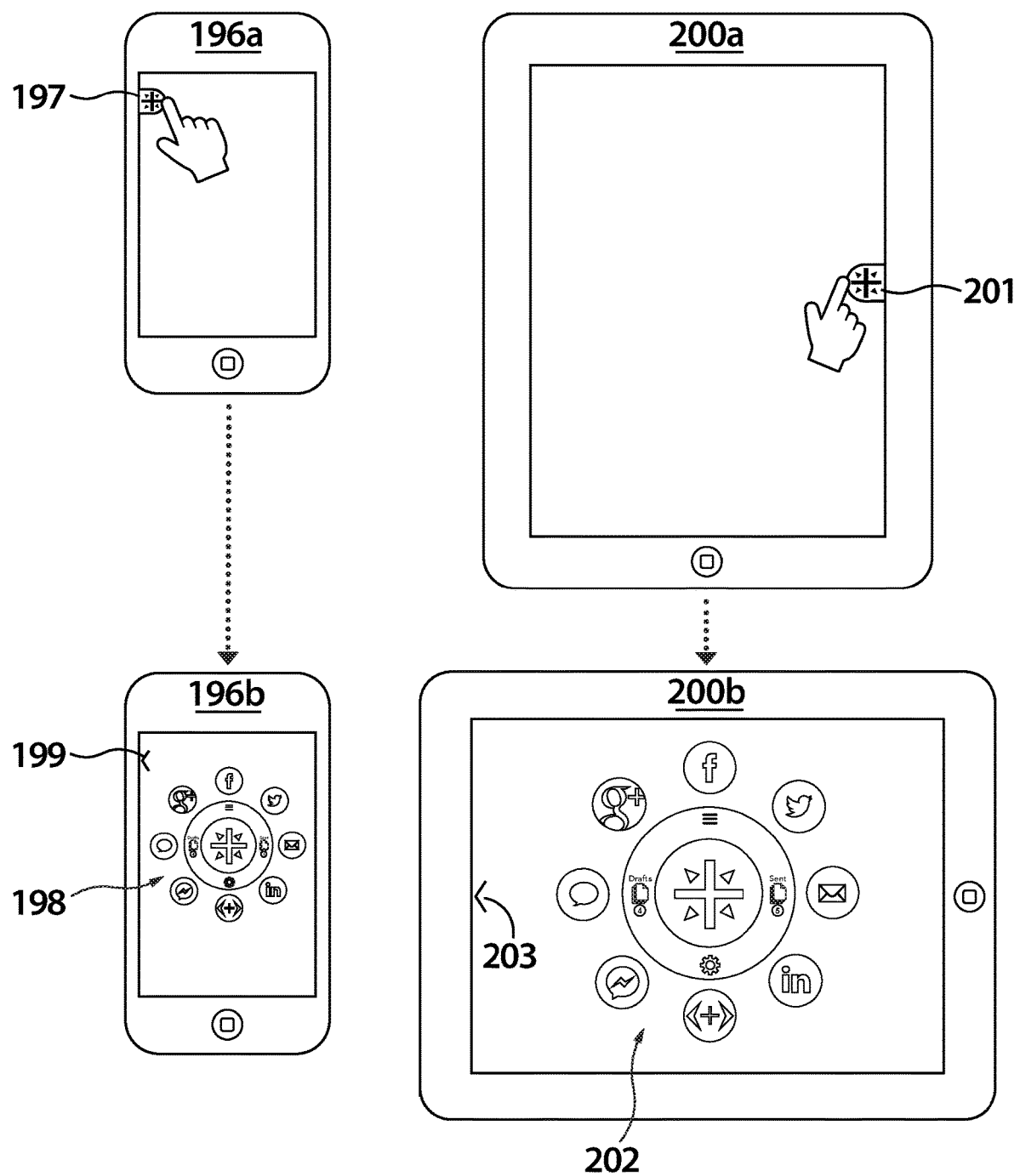
FIG. 30 depicts a suggestion for how the embodiment interface could be toggled as hidden or visible by means of a tab or button, and suggests how the interface may be displayed on screens of different sizes and orientations.

FIG. 30 depicts examples of how the entire interface of this invention may be alternately displayed or hidden by activation of a button or link designed so as not to interfere with the device's default display, nor interfere with other material being displayed. These examples use a mobile phone 196*a* and a tablet device 200*a*, however the methods would be equally applicable to other devices having different sizes or shapes of display or monitor screens. One such option is a tab-like icon 197 positioned at one edge of the device's display, using low-opacity coloration (partial transparency) so any material displayed on the screen underneath it is not significantly obscured. Upon activation of icon 197 the refreshed screen of device 196*a* is now shown as 196*b*, displaying interface 198. To hide the display, a button or link 199 is activated. The same principles are shown for a tablet device 200*a* with a button or link at 201 for showing the full interface 202 as seen in 200*b*. To show the display following activation, an alternate horizontal orientation of the device is shown as 200*b*, to emphasize that this display demonstration is not only for vertically oriented screens. Also, the horizontal orientation of 200*b* is similar enough to desktop monitors to approximately represent display appearance in that instance as well. As with 199 in 196*b*, button or link 203 is for hiding the interface. The show-interface and hide-interface buttons are shown in different positions in these examples only to emphasize that they could be placed in any position along the edge of the device display. Positioning could be a choice made in a Preferences menu, or the feature could allow drag-repositioning of the show/hide icon tab to the desired position.

Figure 31A:
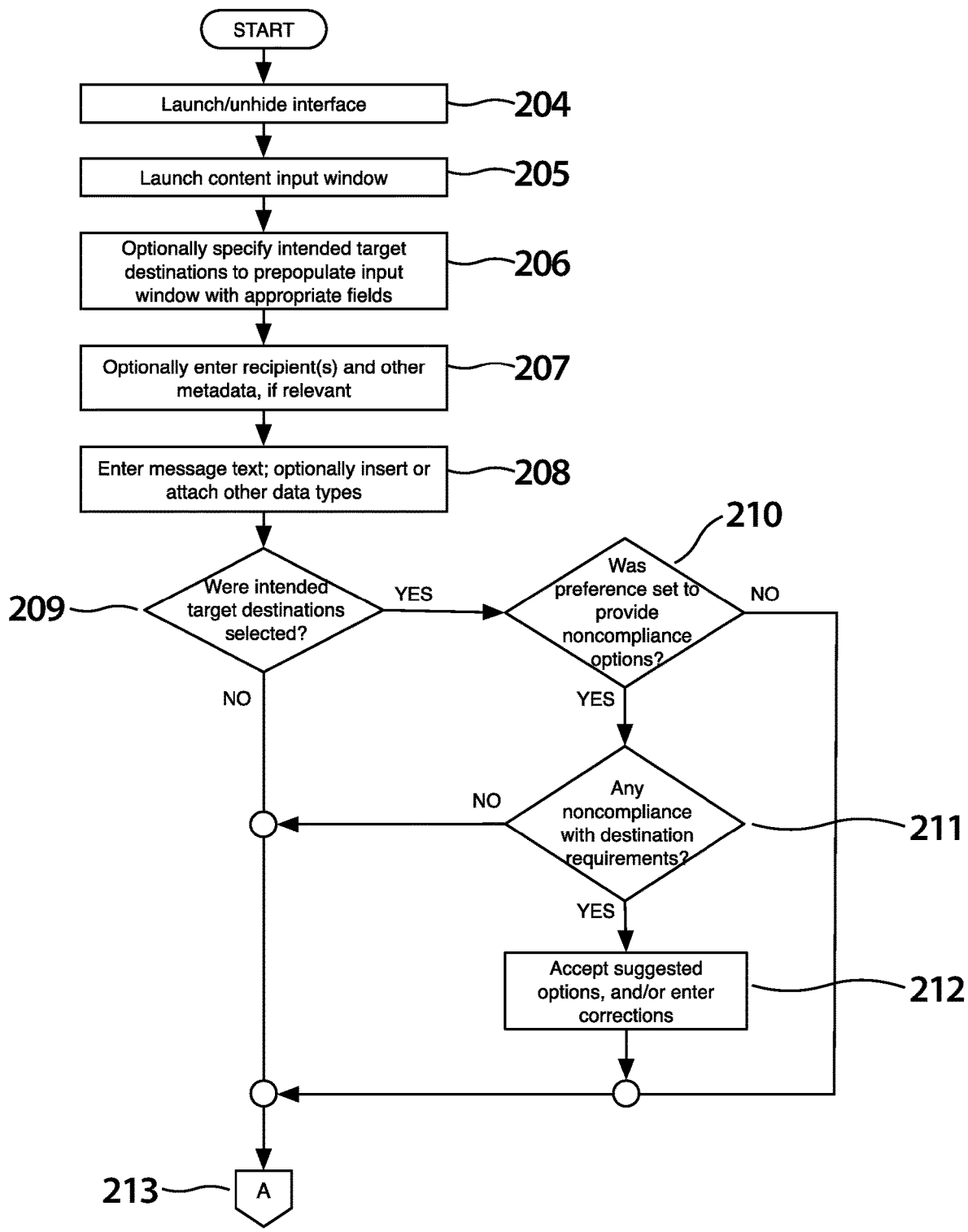
Figure 31B:
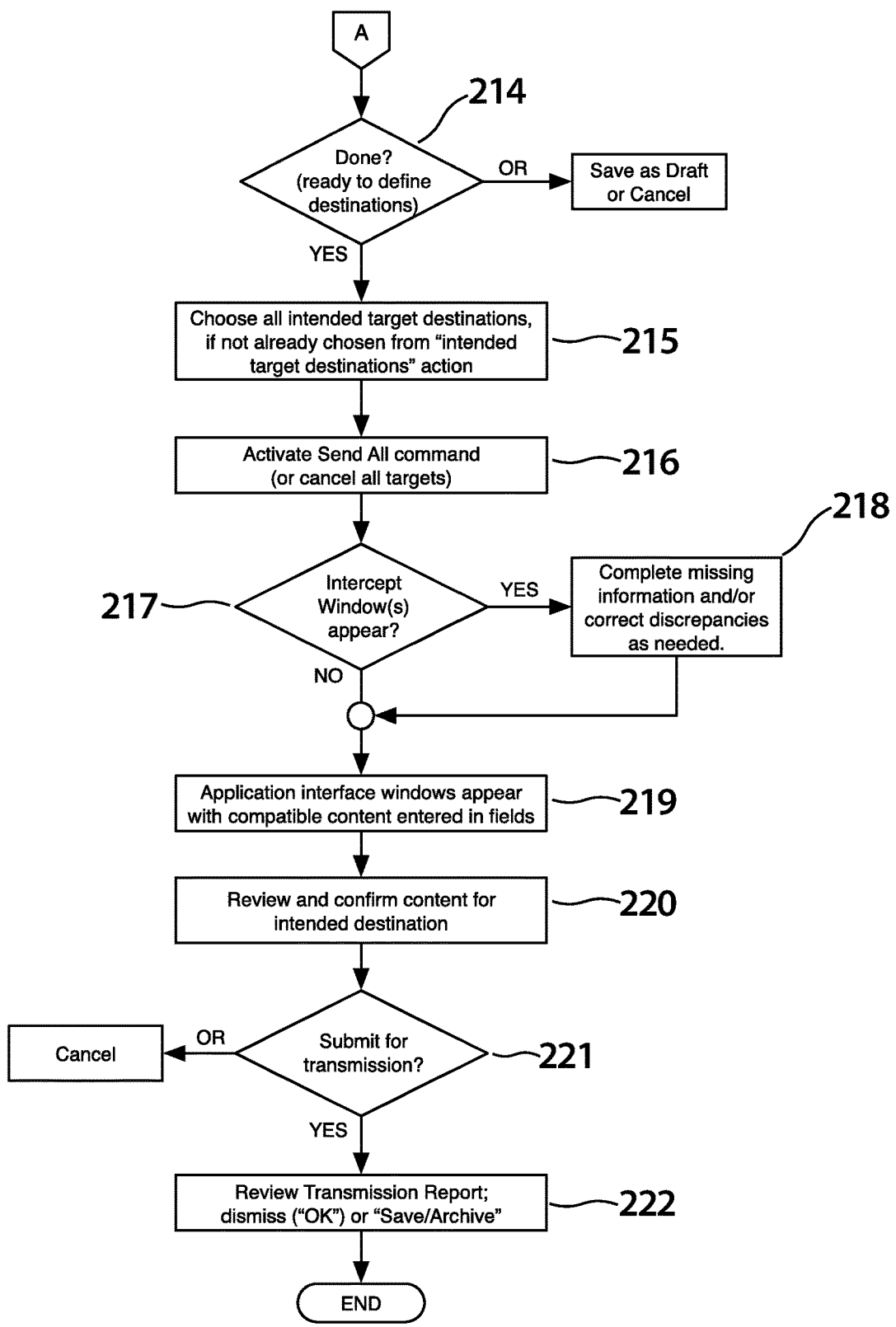

FIG. 31*a*-31*b* depict a process flow diagram providing an overview of the invention's functions from a user point of view, following a simplified path of exemplary usage but not including every possible variation. Step 204 represents the optional show/hide feature described for FIG. 30. Step 205 is the activation of button or link 01 of FIG. 1 resulting in the launching of the universal input window 16 of FIG. 3. Step 206 is the optional specification of intended targets, to establish appropriate metadata fields, as described for FIG. 5. Step 207 is the entry of recipient information and other message metadata as in 17 and 20 of FIG. 3. Step 208 is the entry of text, attachments, or other data in area 21 of FIG. 3. Step 209 is a binary test point, considering whether or not the option at 206 was chosen. If NO, the process proceeds to the next series of steps in FIG. 31*b*, indicated by the connector at 213. If YES, the process follows a series of other binary tests. The first is 210, regarding whether or not a user preference was set to provide automated or assisted resolution of non-compliance with destination specific requirements. If NO, the process proceeds to 213 and thus to the next steps in FIG. 31*b*. If YES, step 211 tests whether or non-compliance exists. If NO, the process proceeds to 213 and thus to the next steps in FIG. 31*b*. If YES, user either accepts suggested options and/or enters corrections or additional input, represented at 212, with the process then proceeding to 213 and thus to the steps of FIG. 31*b*.

In FIG. 31*b*, step 214 is the activation of "Done" button 27 of FIG. 3. An option to "Save" or "Cancel" is also shown, representing the action of buttons 28 and 29 of FIG. 3. Step 215 is the target selection process described for FIG. 7 through FIG. 10, and also suggesting the alternate method by which targets may be preselected at the earlier step 206, as described in detail for FIG. 5. Step 216 is the "Send All" action 50 of FIG. 9 or FIG. 11. Step 217 is the binary conditional appearance of intercept windows as described for FIG. 12 through FIG. 15. If NO, process proceeds to 219. If YES, then step 218 is the completion of required information highlighted in the intercept windows, followed by the activation of the "Continue" button 66 of FIG. 12, and any successive "Continue" buttons in other intercept windows. Step 219 is the appearance of modified displays of communications application windows, with content input to appropriate fields, as described for FIG. 17*a*. Step 220 represents review of that content, and also providing a final opportunity for case-by-case modification of message data. Step 221 represents activation of a function such as submit, send, transmit, or post in each application interface; or alternatively, the option to cancel. Step 222 is the review and acknowledge option of Transmission Summary window 109 of FIG. 20.

Figure 32A:
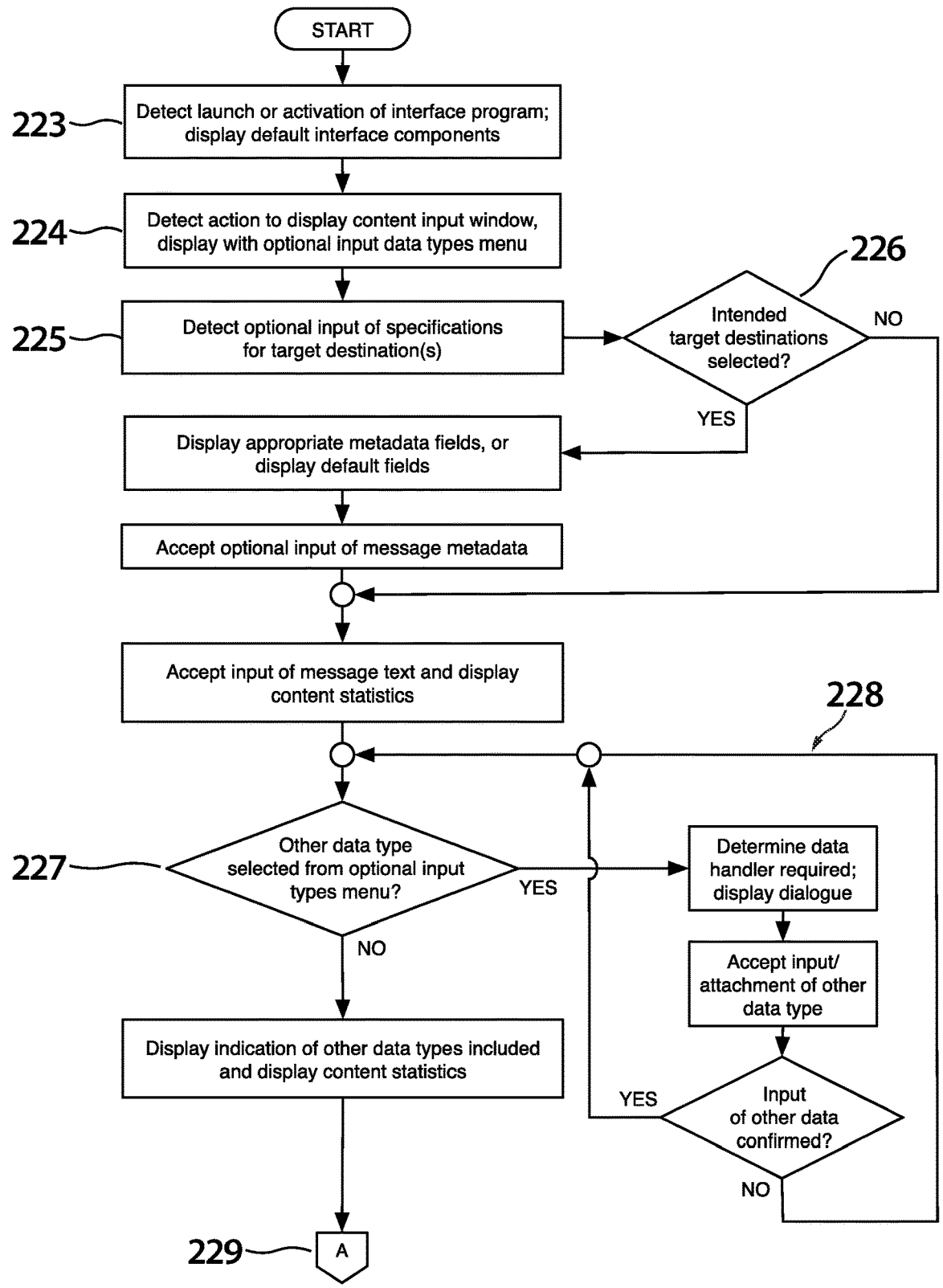
FIG. 32a, FIG. 32b, and FIG. 32c are the 3 parts of a process flow diagram providing an overview of the invention's functions from the computing device or system point of view.
Figure 32B:
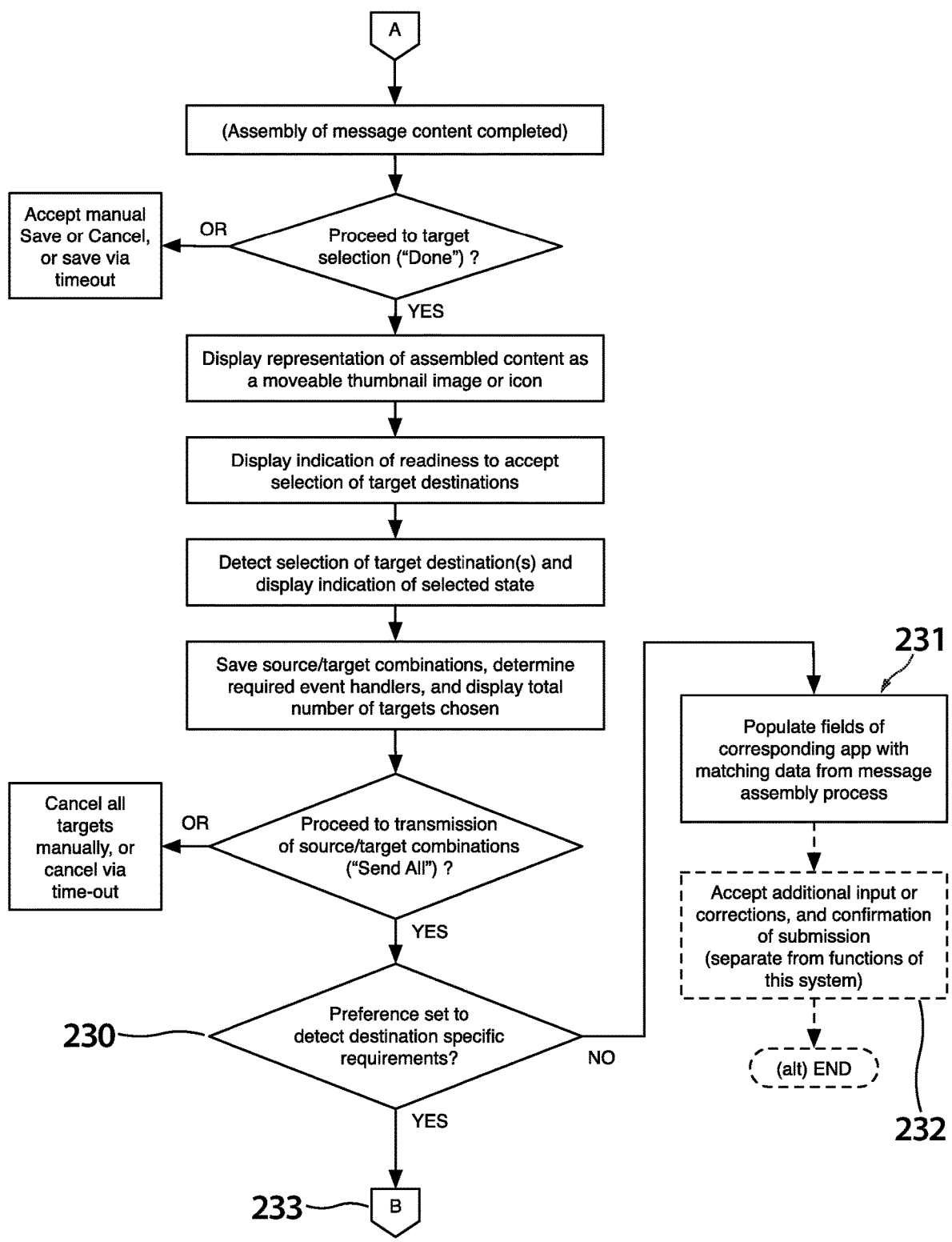
Figure 32C:
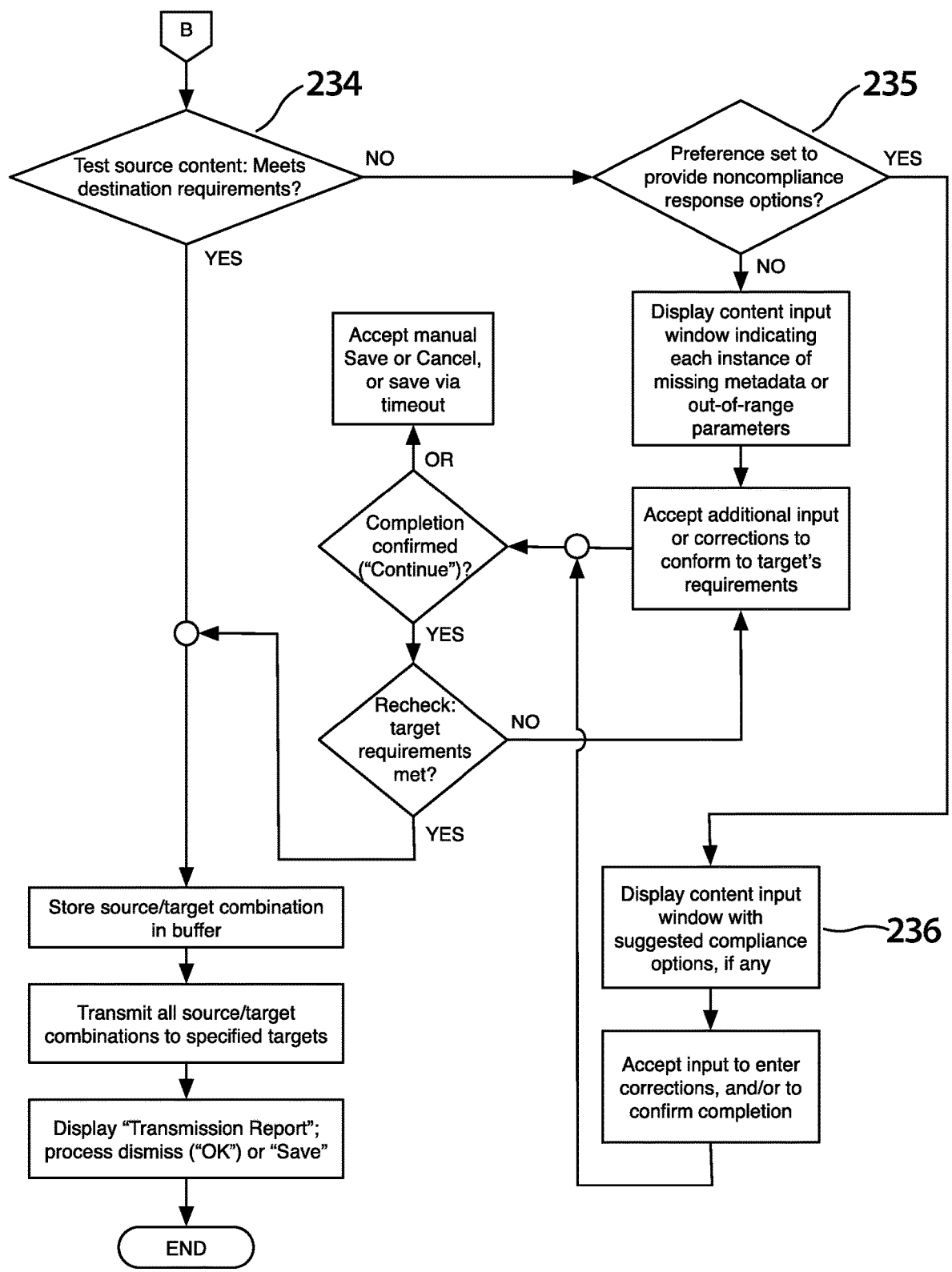

FIG. 32*a*-32*c* are a 3-part process flow diagram providing an overview of the invention's functions from the computing device point of view, with emphasis on procedural logic. Its intention is to suggest the top level of functions in a simplified exemplary usage and does not cover all suggested and optional functions described for FIG. 1 through FIG. 30 above. A few reference points to identify: Step 223 represents activation of the show/hide feature described for FIG. 30. Step 224 is the activation of button or link 01 of FIG. 1 resulting in the launching of the universal input window 16 of FIG. 3. Step 225 is the optional specification of intended targets, to establish appropriate metadata fields, as described for FIG. 5. Step 226 is the binary test point 209 of FIG. 31*a*, considering whether or not the optional choice was made. Step 227 is a binary test for the option to select one or more additional types of input from a range of data input types to be included in the source content, as described for FIG. 3. Step 228 represents a loop of sub-steps encompassing the processes involved with input acceptance and handling of various other data to be included, if so chosen at 227. The process continues in FIG. 32*b*, indicated by the connector at 229.

In FIG. 32*b*, step 230 is a binary test regarding the preference for whether or not the system should detect, report, and respond to source content that is non-compliant with destination specific requirements, and is the preference option in the description for FIG. 16. Step 231 represents the action taken in the case where option 85 of FIG. 16 was activated, resulting in source content being directly input to the appropriate fields of a communication application corresponding to the target destination. Step 232 represents user actions following 231, and is distinguished by dotted lines because it is a process outside control of the system disclosed herein.

In FIG. 32*c*, step 234 is a binary test for whether or not the source content meets destination specific requirements, according to what information is currently available to the system. Step 235 is a binary test for whether or not a preference is set to automatically provide options to correct, or assist in the correction of any non-compliance with destination specific requirements, and represents any choices made in connection with activation of option 85 of FIG. 16. Step 236 represents the display of system-generated options for resolving non-compliance, such as described for FIG. 19.

Example Uses

The following is a non-exhaustive list of possible types of content that can be created or assembled in the proposed interface, and examples of destinations for those content items. Due to the integrative nature of this embodiment, many of these can be combined in a single source content item and transmitted to multiple target destinations as long as the target destinations will accept the content data type.

a) Send a standard email with attachments to multiple recipients.
b) Send a phone-service text message to multiple recipients.
c) Post text, images, video, or other compatible content to multiple social media such as Facebook™, Twitter™, Instagram™, Reddit™, or others.
d) Post text, images, or other compatible media to one or more blogs.
e) Send a message to a workgroup collaboration Internet space, for example Basecamp™, Slack™, HipChat™, or others.
f) Post messages to a business communications platform or service such as Salesforce™, WhatsApp Business™, or others.
g) Send a documents or data to a proprietary upload portal, for example for news reporting, field technical reports, scientific measurement data reporting, or medical data sent to a health IT system.
h) Send a payment to an account, to an individual, or make a donation.
i) Execute a wireless transmission of files or messages to selected known devices within wireless connection range.
j) Send a document to cloud storage such as Dropbox™, Google Drive™; or to a storage device on a network, when the device being used has an appropriate connection.
k) Send a photo or text to a search engine to identify the source, such as the image search capability in Google™.
l) Using voice-to-text, speak a phrase or quote, then send the result to a search engine such as Google™ to search for meaning, origin, or other search results.
m) Send text, image of text, or recorded voice to a language translation application such as Google Translate™.
n) Send recorded sound or music to a music identification application such as SoundHound™, Shazam™, or others.
o) Send composed content or other documents to a printing device accessible wirelessly or by network connection.
p) Send GPS data and a map link to at least one recipient to provide device and user location.
q) Send measurement data from a mobile device connected to a peripheral device, along with GPS data to identify the location of the measurement.
r) Send a touchscreen-generated sketch via email, text, or social media.

Trademarked Names and Icons

The following trademarked names, logos, or icons are mentioned or displayed in this document and/or the associated drawings:

The Messenger™ trademark is the property of Facebook Inc.
The Google Plus™ trademark is the property of Google Inc., a subsidiary of Alphabet Inc.
The Facebook™ trademark is the property of Facebook Inc.
The Twitter™ trademark is the property of Twitter Inc.
The LinkedIn™ trademark is the property of LinkedIn Inc., a subsidiary of Microsoft Inc.
The Reddit™ trademark is the property of Reddit Inc.
The Instagram™ trademark is the property of Instagram Inc., a subsidiary of Facebook Inc.
The VKontakte™ trademark is the property of VKontakte Ltd.
The WeChat™ trademark is the property of Tencent Holdings Ltd.
The Basecamp™ trademark is the property of Basecamp Inc.
The Slack™ trademark is the property of Slack Technologies Inc.
The WordPress™ trademark is the property of WordPress Foundation.
The Google Drive™ trademark is the property of Google Inc., a subsidiary of Alphabet Inc.
The Dropbox™ trademark is the property of Dropbox Inc.
The Tumblr™ trademark is the property of Yahoo! Inc. (former); presently Oath Inc.
The Google Search™ trademark is the property of Google Inc., a subsidiary of Alphabet Inc.
The Google Translate™ trademark is the property of Google Inc., a subsidiary of Alphabet Inc.
The HipChat™ trademark is the property of Atlassian Inc.
The AddThis™ trademark is the property of AddThis Inc., a subsidiary of Oracle Inc.
The SoundHound™ trademark is the property of SoundHound Inc.
The Shazam™ trademark is the property of Shazam Ltd.
The Hootsuite™ trademark is the property of Hootsuite Media Inc.
The Everypost™ trademark is the property of EveryPost LLC.
The Buffer™ trademark is the property of Buffer Inc.
The Smart Post™ trademark is the property of Pyraego Inc.
The CoSchedule trademark is the property of CoSchedule LLC.
The Doubletap™ trademark is the property of Red Fox Ventures Inc.
The Social Stream™ trademark is the property of Devisd Pty Ltd.
The Pyxsee™ trademark is the property of Dayne Rusch.
The Salesforce™ trademark is the property of Salesforce.com Inc.
The WhatsApp Business™ trademark is the property of WhatsApp Inc.

The invention claimed is:

1. A method for using a graphical user interface in a computing device to assemble and select at least one of a plurality of digitally-controllable source content, and to associate the at least one source content with at least one of a plurality of selected target destinations for transmission thereto, the method comprising:

displaying in the graphical user interface a source content assembly interface;

accepting input within the source content assembly interface for assembling the at least one source content;

accepting input within the source content assembly interface to confirm that assembly of the at least one source content has been completed;

enabling a capability of the source content assembly interface wherein the at least one source content functions as a single selectable entity, generated and displayed upon confirmation of source content assembly completion, and representing the entire assembled source content;

displaying in the graphical user interface at least one target destination icon, comprising a selectable icon representing association of a communication function with the at least one target destination;

accepting input within the graphical user interface for associating the at least one assembled source content with the at least one target destination;

providing a first option, comprising intervention in the transfer of the at least one source content to the at least one target destination, in order to satisfy at least one destination-specific requirement, wherein the at least one destination-specific requirement to enable the association with the at least one target destination is stored in computer memory;

the at least one source content is validated against each of the at least one destination-specific requirements;

a validation result from said validating is generated;

the source content and the validation result for each of the at least one corresponding target destinations is stored in computer memory;

the validation result for each of the at least one source content associated with each of the corresponding at least one target destinations is obtained from computer memory;

in each instance where the validation result indicates failure to validate, a notification for each cause of failure is displayed;

editable fields enabling entry of information for correcting any discrepancies with the destination-specific requirements in each such cause of failure are displayed;

input of updated information in the editable fields is accepted, where such updated information corresponds to the destination-specific requirements;

input for confirming an association with the at least one target destination is accepted;

the transmission of the at least one assembled and validated source content with the corresponding at least one target destination is established;

the results of the established transmission of the at least one assembled source content with the at least one target destination is stored in computer memory;

at least one detail of a result is displayed;

providing a second option, comprising transfer of the source content directly to compatible data entry fields of an application capable of connecting to a communications service on a network, wherein said application corresponds to the at least one target destination;

said application has activation and interaction access available from the computing device;

a graphic variant of the native application interface of each of said applications is displayed, in which the variant of said application interface is visually amended and clearly distinguished from the application's native interface, and distinguished from any other application interface visible on the computing device.

2. The method of claim 1, wherein upon confirmation of completion of assembly, the source content is displayed as a source content icon representing the entire source content, and enabled to be selected for establishing an association with the at least one target destination.

3. The method of claim 2, wherein the source content icon is displayed as visually and temporally co-occurring with the at least one target destination icon.

4. The method of claim 1, wherein the target destination icons, when existing in multiple, are displayed as an array on a circular, elliptical, arc, or rectilinear path, wherein the distance between any two adjacent of said icons along said path is within 50 to 200 percent of the equivalently-measured distance between any other two adjacent of said icons;

the distance between any one of said icons and the logical center of the circle, ellipse, arc, or rectilinear path is within the range of 25 to 400 percent of the equivalently-measured distance for any other of said icons.

5. The method of claim 4, wherein the source content icon is located within the logical boundaries of the circular, elliptical, arc, or rectilinear array of the target destination icons.

6. The method of claim 1, wherein the target destination icons when existing in quantity such that not all are displayed simultaneously, are stored in memory and can be made visible or hidden by invoking a target icon navigation function by, inclusively, either of direct selection of a button or link activating said target icon navigation function, causing display of additional of said previously hidden icons, or causing the hiding of said previously visible icons;

dragging of the source content icon over a button or link activating said target icon navigation function, causing display of additional of said previously hidden icons, or causing the hiding of said previously visible icons.

7. The method of claim 1, wherein the source content is text, and wherein upon validation failure of the source content when compared against a known destination-specific requirement which defines maximum allowable text content, the method is configured to resolve over-limit text content by dividing said content into multiple segments, with each segment being compatible with said destination-specific requirement, and formatting each of said segments for delivery as separate and successive messages and displaying the full content of said segments simultaneously and adjacently in the interface;

enabling an interactive function for modifying how said text content is distributed between said adjacent segments;

accepting input to transmit said separate and successive messages to the target destination.

8. The method of claim 1, wherein the source content assembly interface is enabled to display at least one of a plurality of destination configuration icons, wherein such icons represent the same target destinations as the target destination icons they visually resemble so as to unambiguously correlate with by design or text identification;

are visually non-identical to, visually and spatially separated from, and unambiguously distinguished from said target destination icons;

when selected, establish a temporary but cancellable selection of the corresponding target destination as an association of the at least one source content with the selected target destination application;

when selected, enable display of input fields corresponding to information needed to satisfy the destination-specific requirements.

9. The method of claim 8, wherein all actions of selection are accomplished by detecting a means of user input selected from the group consisting of:
   a) selection in a touchscreen display, comprising detection of haptic input, touch points, variable-force touch, or gestures;
   b) selection in a touchscreen display, comprising detection of haptic input, touch points, variable-force touch, and gestures combined with drag-and-drop or drag-and-hover of the source content icon over the one or more target destination icons and optionally activating the target icon navigation function;
   c) selection of icons by a moving cursor, comprising detection of click actions;
   d) selection of icons by a moving cursor, comprising detection of click actions combined with drag-and-drop or drag-and-hover of the source content icon over the one or more target destination icons and optionally activating the target icon navigation function;
   e) selection of icons by audio command;
   f) selection of icons by eye-tracking control;
   g) selection of icons by keyboard commands or other assistive technology;
   h) combinations of any elements comprising those set forth in (a)-(g), inclusive.

10. The method of claim 1, wherein the at least one target destination icons are not displayed, and the communication function associated with the at least one target destination, plus the association therewith of the source content, can be established by audio command.

11. The method of claim 1, wherein the at least one target destination icon is an alias, the direct activation of which executes a transmission function of a communications subsystem of the computing device.

12. The method of claim 1, wherein the at least one target destination icon is an alias, the direct activation of which executes an application enabling access to the at least one corresponding target destination, and wherein such application is capable of connecting with a communications service or data submission portal on a network.

13. The method of claim 1, wherein the range of source content types available for input into the source content assembly interface is selected from the group consisting of:
   a) text input by the user by any means available on the device;
   b) data from the media acquisition capabilities of the computing device, including but not limited to image, video, and audio recording functions;
   c) data stored in the memory of the device;
   d) data from internal sensory capabilities of the device, including but not limited to location information and motion sensing;
   e) data from specialized sensing or data input and handling capabilities available by connection to a peripheral device;
   f) graphic images created by touchscreen drawing or use of a stylus on a compatible display;
   g) data stored in any external location to which the device has access by network connection;
   h) content displayed on the device via other applications;
   i) combinations of any elements comprising those set forth in (a)-(h), inclusive.

14. The method of claim 1, wherein the at least one target destination is a user configurable instance, wherein the target destination represented by the target destination icon is preconfigured with all required connection information, and wherein said configurable instance and its icon can be saved for subsequent usage.

15. The method of claim 14, further comprising the creation of the target destination icon as a customized instance representing a communication service application, wherein the target destination is preconfigured for communication with one or more specific recipients to create a recipient icon, the addressing options being selected from the group consisting of:
   a) a single recipient addressed in one type of communications service;
   b) a single recipient addressed in at least two types of communications services;
   c) a plurality of recipients addressed within the same type of communications service;
   d) a plurality of recipients addressed in at least two types of communications services;
   e) combinations of any elements comprising those set forth in (a)-(d), inclusive.

16. The method of claim 1, wherein the entire graphical user interface described therein is displayed by superimposition over other screen content of the computing device and enabled to be hidden or revealed by input to any option selected from the group consisting of:
   a) a button or link region within the computing device's display area;
   b) alternative touchscreen input, such as variable force touch or multiple tap;
   c) detection and processing of an audio command;
   d) combinations of any elements comprising those set forth in (a)-(c), inclusive.

17. A system for using a graphical user interface in a computing device to assemble and select at least one of a plurality of types of source content, and to execute transmission of the source content to at least one of a plurality of network destinations, the system comprising a processor interconnected with a memory component, a form of internal data storage, a display, an input device or input component, and a communication subsystem configured to:
   display in the graphical user interface a source content assembly interface;
   accept input within the source content assembly interface for assembling the at least one source content;
   accept input within the source content assembly interface to confirm that assembly of the at least one source content has been completed;
   enable a capability of the source content assembly interface wherein the at least one source content functions as a single selectable entity, generated and displayed upon confirmation of source content assembly completion, and representing the entire assembled source content;
   display in the graphical user interface at least one target destination icon, comprising a selectable icon representing association of a communication function with the at least one target destination;

accept input within the graphical user interface for associating the at least one assembled source content with the at least one target destination;

provide a first option, comprising intervention in the transfer of the at least one source content to the at least one target destination, in order to satisfy at least one destination-specific requirement, wherein the at least one destination-specific requirement to enable the association with the at least one target destination is stored in computer memory;

the at least one source content is validated against each of the at least one destination-specific requirements;

a validation result from said validating is generated;

the source content and the validation result for each of the at least one corresponding target destinations is stored in computer memory;

the validation result for each of the at least one source content associated with each of the corresponding at least one target destinations is obtained from computer memory;

in each instance where the validation result indicates failure to validate, a notification for each cause of failure is displayed;

editable fields enabling entry of information for correcting any discrepancies with the destination-specific requirements in each such cause of failure are displayed;

input of updated information in the editable fields is accepted, where such updated information corresponds to the destination-specific requirements;

input for confirming an association with the at least one target destination is accepted;

the transmission of the at least one assembled and validated source content with the corresponding at least one target destination is established;

the results of the established transmission of the at least one assembled source content with the at least one target destination is stored in computer memory;

at least one detail of a result is displayed;

provide a second option, comprising transfer of the source content directly to compatible data entry fields of an application capable of connecting to a communications service on a network, wherein said application corresponds to the at least one target destination;

said application has activation and interaction access available from the computing device;

a graphic variant of the native application interface of each of said applications is displayed, in which the variant of said application interface is visually amended and clearly distinguished from the application's native interface, and distinguished from any other application interface visible on the computing device.

18. The system of claim 17, wherein upon confirmation of completion of assembly, the source content is displayed as a source content icon representing the entire source content, and enabled to be selected for establishing an association with the at least one target destination.

19. The system of claim 18, wherein the source content icon is displayed as visually and temporally co-occurring with the at least one target destination icon.

20. The system of claim 17, wherein the target destination icons, when existing in multiple, are displayed as an array on a circular, elliptical, arc, or rectilinear path, wherein the distance between any two adjacent of said icons along said path is within 50 to 200 percent of the equivalently-measured distance between any other two adjacent of said icons;

the distance between any one of said icons and the logical center of the circle, ellipse, arc, or rectilinear path is within the range of 25 to 400 percent of the equivalently-measured distance for any other of said icons.

21. The system of claim 20, wherein the source content icon is located within the logical boundaries of the circular, elliptical, arc, or rectilinear array of the target destination icons.

22. The system of claim 17, wherein the target destination icons when existing in quantity such that not all are displayed simultaneously, are stored in memory and can be made visible or hidden by invoking a target icon navigation function by, inclusively, either of direct selection of a button or link activating said target icon navigation function, causing display of additional of said previously hidden icons, or causing the hiding of said previously visible icons;

dragging of the source content icon over a button or link activating said target icon navigation function, causing display of additional of said previously hidden icons, or causing the hiding of said previously visible icons.

23. The system of claim 17, wherein the source content is text, and wherein upon validation failure of the source content when compared against a known destination-specific requirement which defines maximum allowable text content, the system is configured to resolve over-limit text content by dividing said content into multiple segments, with each segment being compatible with said destination-specific requirement, and formatting each of said segments for delivery as separate and successive messages and displaying simultaneously and adjacently in the interface;

enabling an interactive function for modifying how said text content is distributed between said adjacent segments;

accepting input to transmit said separate and successive messages to the target destination.

24. The system of claim 17, wherein the source content assembly interface is enabled to display at least one of a plurality of destination configuration icons, wherein such icons represent the same target destinations as the target destination icons they visually resemble so as to unambiguously correlate with by design or text identification;

are visually non-identical to, visually and spatially separated from, and unambiguously distinguished from said target destination icons;

when selected, establish a temporary but cancellable selection of the corresponding target destination as an association of the at least one source content with the selected target destination application;

when selected, enable display of input fields corresponding to information needed to satisfy the destination-specific requirements.

25. The system of claim 24, wherein all actions of selection are accomplished by detecting a means of user input selected from the group consisting of:

a) selection in a touchscreen display, comprising detection of haptic input, touch points, variable-force touch, or gestures;

b) selection in a touchscreen display, comprising detection of haptic input, touch points, variable-force touch, and gestures combined with drag-and-drop or drag-and-hover of the source content icon over the one or more target destination icons and optionally activating the target icon navigation function;

c) selection of icons by a moving cursor, comprising detection of click actions;
d) selection of icons by a moving cursor, comprising detection of click actions combined with drag-and-drop or drag-and-hover of the source content icon over the one or more target destination icons and optionally activating the target icon navigation function;
e) selection of icons by audio command;
f) selection of icons by eye-tracking control;
g) selection of icons by keyboard commands or other assistive technology;
h) combinations of any elements comprising those set forth in (a)-(g), inclusive.

26. The system of claim 17, wherein the at least one target destination icons are not displayed, and the communication function associated with the at least one target destination, plus the association therewith of the source content, can be established by audio command.

27. The system of claim 17, wherein the at least one target destination icon is an alias, the direct activation of which executes a transmission function of a communications subsystem of the computing device.

28. The system of claim 17, wherein the at least one target destination icon is an alias, the direct activation of which executes an application enabling access to the at least one corresponding target destination, and wherein such application is capable of connecting with a communications service or data submission portal on a network.

29. The system of claim 17, wherein the range of source content types available for input into the source content assembly interface is selected from the group consisting of:
    a) text input by the user by any means available on the device;
    b) data from the media acquisition capabilities of the computing device, including but not limited to image, video, and audio recording functions;
    c) data stored in the memory of the device;
    d) data from internal sensory capabilities of the device, including but not limited to location information and motion sensing;
    e) data from specialized sensing or data input and handling capabilities available by connection to a peripheral device;
    f) graphic images created by touchscreen drawing or use of a stylus on a compatible display;
    g) data stored in any external location to which the device has access by network connection;
    h) content displayed on the device via other applications;
    i) combinations of any elements comprising those set forth in (a)-(h), inclusive.

30. The system of claim 17, wherein the at least one target destination is a user configurable instance, wherein the target destination represented by the target destination icon is preconfigured with all required connection information, and wherein said configurable instance and its icon can be saved for subsequent usage.

31. The system of claim 17, further comprising the creation of the target destination icon as a customized instance representing a communication service application, wherein the target destination is preconfigured for communication with one or more specific recipients to create a recipient icon, the addressing options being selected from the group consisting of:
    a) a single recipient addressed in one type of communications service;
    b) a single recipient addressed in at least two types of communications services;
    c) a plurality of recipients addressed within the same type of communications service;
    d) a plurality of recipients addressed in at least two types of communications services;
    e) combinations of any elements comprising those set forth in (a)-(d), inclusive.

32. The system of claim 17, wherein the entire graphical user interface described therein is displayed by superimposition over other screen content of the computing device and enabled to be hidden or revealed by input to any option selected from the group consisting of:
    a) a button or link region within the computing device's display area;
    b) alternative touchscreen input, such as variable force touch or multiple tap;
    c) detection and processing of an audio command;
    d) combinations of any elements comprising those set forth in (a)-(c), inclusive.

33. A computer program product, comprising a non-transitory computer usable medium having a computer readable program code, which when executed will implement a graphical user interface in a computing device to assemble and select at least one of a plurality of digitally-controllable source content, and to associate the at least one source content with at least one of a plurality of selected target destinations for transmission thereto, the implementation comprising:
    displaying in the graphical user interface a source content assembly interface;
    accepting input within the source content assembly interface for assembling the at least one source content;
    accepting input within the source content assembly interface to confirm that assembly of the at least one source content has been completed;
    enabling a capability of the source content assembly interface wherein the at least one source content functions as a single selectable entity, generated and displayed upon confirmation of source content assembly completion, and representing the entire assembled source content;
    displaying in the graphical user interface at least one target destination icon, comprising a selectable icon representing association of a communication function with the at least one target destination;
    accepting input within the graphical user interface for associating the at least one assembled source content with the at least one target destination;
    providing a first option, comprising intervention in the transfer of the at least one source content to the at least one target destination, in order to satisfy at least one destination-specific requirement, wherein
    the at least one destination-specific requirement to enable the association with the at least one target destination is stored in computer memory;
    the at least one source content is validated against each of the at least one destination-specific requirements;
    a validation result from said validating is generated;
    the source content and the validation result for each of the at least one corresponding target destinations is stored in computer memory;
    the validation result for each of the at least one source content associated with each of the corresponding at least one target destinations is obtained from computer memory;
    in each instance where the validation result indicates failure to validate, a notification for each cause of failure is displayed;

editable fields enabling entry of information for correcting any discrepancies with the destination-specific requirements in each such cause of failure are displayed;

input of updated information in the editable fields is accepted, where such updated information corresponds to the destination-specific requirements;

input for confirming an association with the at least one target destination is accepted;

the transmission of the at least one assembled and validated source content with the corresponding at least one target destination is established;

the results of the established transmission of the at least one assembled source content with the at least one target destination is stored in computer memory;

at least one detail of a result is displayed;

providing a second option, comprising transfer of the source content directly to compatible data entry fields of an application capable of connecting to a communications service on a network, wherein said application corresponds to the at least one target destination;

said application has activation and interaction access available from the computing device;

a graphic variant of the native application interface of each of said applications is displayed, in which the variant of said application interface is visually amended and clearly distinguished from the application's native interface, and distinguished from any other application interface visible on the computing device.

34. The computer program product of claim 33, wherein upon confirmation of completion of assembly, the source content is displayed as a source content icon representing the entire source content, and enabled to be selected for establishing an association with the at least one target destination.

35. The computer program product of claim 34, wherein the source content icon is displayed as visually and temporally co-occurring with the at least one target destination icon.

36. The computer program product of claim 33, wherein the target destination icons, when existing in multiple, are displayed as an array on a circular, elliptical, arc, or rectilinear path, wherein the distance between any two adjacent of said icons along said path is within 50 to 200 percent of the equivalently-measured distance between any other two adjacent of said icons;

the distance between any one of said icons and the logical center of the circle, ellipse, arc, or rectilinear path is within the range of 25 to 400 percent of the equivalently-measured distance for any other of said icons.

37. The computer program product of claim 36, wherein the source content icon is located within the logical boundaries of the circular, elliptical, arc, or rectilinear array of the target destination icons.

38. The computer program product of claim 33, wherein the target destination icons when existing in quantity such that not all are displayed simultaneously, are stored in memory and can be made visible or hidden by invoking a target icon navigation function by, inclusively, either of direct selection of a button or link activating said target icon navigation function, causing display of additional of said previously hidden icons, or causing the hiding of said previously visible icons;

dragging of the source content icon over a button or link activating said target icon navigation function, causing display of additional of said previously hidden icons, or causing the hiding of said previously visible icons.

39. The computer program product of claim 33, wherein the source content is text, and wherein upon validation failure of the source content when compared against a known destination-specific requirement which defines maximum allowable text content, the computer program product is configured to resolve over-limit text content by dividing said content into multiple segments, with each segment being compatible with said destination-specific requirement, and formatting each of said segments for delivery as separate and successive messages and displaying simultaneously and adjacently in the interface;

enabling an interactive function for modifying how said text content is distributed between said adjacent segments;

accepting input to transmit said separate and successive messages to the target destination.

40. The computer program product of claim 33, wherein the source content assembly interface is enabled to display at least one of a plurality of destination configuration icons, wherein such icons represent the same target destinations as the target destination icons they visually resemble so as to unambiguously correlate with by design or text identification;

are visually non-identical to, visually and spatially separated from, and unambiguously distinguished from said target destination icons;

when selected, establish a temporary but cancellable selection of the corresponding target destination as an association of the at least one source content with the selected target destination application;

when selected, enable display of input fields corresponding to information needed to satisfy the destination-specific requirements.

41. The computer program product of claim 40, wherein all actions of selection are accomplished by detecting a means of user input selected from the group consisting of:

a) selection in a touchscreen display, comprising detection of haptic input, touch points, variable-force touch, or gestures;

b) selection in a touchscreen display, comprising detection of haptic input, touch points, variable-force touch, and gestures combined with drag-and-drop or drag-and-hover of the source content icon over the one or more target destination icons and optionally activating the target icon navigation function;

c) selection of icons by a moving cursor, comprising detection of click actions;

d) selection of icons by a moving cursor, comprising detection of click actions combined with drag-and-drop or drag-and-hover of the source content icon over the one or more target destination icons and optionally activating the target icon navigation function;

e) selection of icons by audio command;

f) selection of icons by eye-tracking control;

g) selection of icons by keyboard commands or other assistive technology;

h) combinations of any elements comprising those set forth in (a)-(g), inclusive.

42. The computer program product of claim 33, wherein the at least one target destination icons are not displayed, and the communication function associated with the at least one target destination, plus the association therewith of the source content, can be established by audio command.

43. The computer program product of claim 33, wherein the at least one target destination icon is an alias, the direct activation of which executes a transmission function of a communications subsystem of the computing device.

44. The computer program product of claim 33, wherein the at least one target destination icon is an alias, the direct activation of which executes an application enabling access to the at least one corresponding target destination, and wherein such application is capable of connecting with a communications service or data submission portal on a network.

45. The computer program product of claim 33, wherein the range of source content types available for input into the source content assembly interface is selected from the group consisting of:
   a) text input by the user by any means available on the device;
   b) data from the media acquisition capabilities of the computing device, including but not limited to image, video, and audio recording functions;
   c) data stored in the memory of the device;
   d) data from internal sensory capabilities of the device, including but not limited to location information and motion sensing;
   e) data from specialized sensing or data input and handling capabilities available by connection to a peripheral device;
   f) graphic images created by touchscreen drawing or use of a stylus on a compatible display;
   g) data stored in any external location to which the device has access by network connection;
   h) content displayed on the device via other applications;
   i) combinations of any elements comprising those set forth in (a)-(h), inclusive.

46. The computer program product of claim 33, wherein the at least one target destination is a user configurable instance, wherein the target destination represented by the target destination icon is preconfigured with all required connection information, and wherein said configurable instance and its icon can be saved for subsequent usage.

47. The computer program product of claim 46, further comprising the creation of the target destination icon as a customized instance representing a communication service application, wherein the target destination is preconfigured for communication with one or more specific recipients to create a recipient icon, the addressing options being selected from the group consisting of:
   a) a single recipient addressed in one type of communications service;
   b) a single recipient addressed in at least two types of communications services;
   c) a plurality of recipients addressed within the same type of communications service;
   d) a plurality of recipients addressed in at least two types of communications services;
   e) combinations of any elements comprising those set forth in (a)-(d), inclusive.

48. The computer program product of claim 33, wherein the entire graphical user interface described therein is displayed by superimposition over other screen content of the computing device and enabled to be hidden or revealed by input to any option selected from the group consisting of:
   a) a button or link region within the computing device's display area;
   b) alternative touchscreen input, such as variable force touch or multiple tap;
   c) detection and processing of an audio command;
   d) combinations of any elements comprising those set forth in (a)-(c), inclusive.

* * * * *